United States Patent
Hopley et al.

(10) Patent No.: US 12,448,441 B2
(45) Date of Patent: Oct. 21, 2025

(54) ZIP12 ANTIBODY

(71) Applicant: IP2IPO Innovations Limited, London (GB)

(72) Inventors: Stephanie Hopley, Cambridge (GB); Martin Wilkins, London (GB); Lan Zhao, London (GB)

(73) Assignee: IP2IPO INNOVATIONS LIMITED, London (GB)

( * ) Notice: Subject to any disclaimer, the term of this patent is extended or adjusted under 35 U.S.C. 154(b) by 0 days.

(21) Appl. No.: 18/989,629

(22) Filed: Dec. 20, 2024

(65) Prior Publication Data

US 2025/0282862 A1    Sep. 11, 2025

Related U.S. Application Data

(63) Continuation of application No. 18/848,398, filed as application No. PCT/US2023/050726 on Mar. 22, 2023.

(30) Foreign Application Priority Data

Mar. 22, 2022 (GB) ..................... 2204023

(51) Int. Cl.
*C07K 16/28* (2006.01)
*A61K 39/00* (2006.01)
*A61P 9/12* (2006.01)

(52) U.S. Cl.
CPC ............... *C07K 16/28* (2013.01); *A61P 9/12* (2018.01); *A61K 2039/505* (2013.01); *C07K 2317/33* (2013.01); *C07K 2317/77* (2013.01); *C07K 2317/92* (2013.01)

(58) Field of Classification Search
None
See application file for complete search history.

(56) References Cited

FOREIGN PATENT DOCUMENTS

WO    WO 2017/017446 A1    2/2017
WO    WO 2022/064216 A1    3/2022

OTHER PUBLICATIONS

International Search Report and the Written Opinion of PCT/GB2023/050726 mailed Aug. 3, 2023; 31 pages.
Patents Act 1977: Search Report under Section 17(5) for the Application No. GB2204023.2 dated Sep. 16, 2022; 5 pages.
Anonymous: "Product Datasheet SLC39A12 Antibody NBP2-93599-0.1ml", www.novus.bio, May 31, 2020 (May 31, 2020), pp. 1-3, XP055869163, retrieved from the Internet: URL:https://www.novusbio.com/PDFs5/NBP2-93599-0.1ml.pdf [retrieved on Dec. 3, 2021].
Anonymous: "Anti-ZIP-12 antibody ab106570", www.abcam.com, Dec. 3, 2021, pp. 1-3, XP055869213, Retrieved from the Internet: URL:https://www.abcam.com/zip-12-antibody-ab106570.pdf [retrieved on Dec. 3, 2021].
Caldas et al., "Humanization of the anti-CD18 antibody 6.7: an unexpected effect of a framework residue in binding to antigen.", Molecular Immunology, vol. 39, No. 15, May 1, 2003, pp. 941-952, XP55025334, DOI: 10.1016/S0161-5890(03)00022-1.
Chowanadisai et al., "Neurulation and neurite extension require the zinc transporter ZIP12 (slc39a12)", Proceedings of the National Academy of Sciences, vol. 110, No. 24, Jun. 11, 2013, pp. 9903-9908, XP93050044, ISSN: 0027-8424, DOI: 10.1073/pnas.1222142110.
Du et al., "Molecular basis of recognition of human osteopontin by 23C3, a potential therapeutic antibody for treatment of rheumatoid arthritis", Journal of Molecular Biology, Academic Press, United Kingdom, vol. 382, No. 4, Oct. 17, 2008, pp. 835-842; DOI: 10.1016/J.JMB.2008.07.075.
Kunik et al., "Structural Consensus among Antibodies Defines the Antigen Binding Site", Plos Computational Biology, vol. 8, No. 2, Feb. 23, 2012, p. e1002388, XP055123186, DOI: 10.1371/journal.pcbi.1002388.
Panka et al., "variable region framework differences result in decreased or increased affinity of variant antidigoxin antibodies", Proceedings of The National Academy of Sciences, National Academy of Sciences, vol. 85, No. 9, May 1, 1988, pp. 3080-3084, XP000611718, ISSN: 0027-8424, DOI: 10.1073/PNAS.85.9.3080.
Xiang, Jianhua et al., "Modification in framework region I results in a decreased affinity of chimeric anti-TAG72 antibody", Molecular Immunology, Pergamon, GB, vol. 28, No. 1/2, Jan. 1, 1991, pp. 141-148.
Zhao et al., "The zinc transporter ZIP12 regulates the pulmonary vascular response to chronic hypoxia", Nature (London), vol. 524, No. 7565, Aug. 20, 2015, pp. 356-360; DOI: 10.1038/nature14620.

*Primary Examiner* — Ruixiang Li
(74) *Attorney, Agent, or Firm* — Squire Patton Boggs (US) LLP

(57) ABSTRACT

The invention relates to ZIP12 antibodies. The invention extends to compositions comprising the antibodies, including pharmaceutical compositions and kits. The invention also extends to methods of making and using the antibodies, for example in therapy and diagnosis of hypoxia-related diseases, such as pulmonary hypertension and cancer.

6 Claims, 19 Drawing Sheets

Specification includes a Sequence Listing.

Figure 1

| SIDE-CHAIN CHEMISTRY | | SELECTED | |
|---|---|---|---|
| SMALL | A | | |
| NUCLEOPHILIC | S | H | |
| HYDROPHOBIC | L | P | |
| AROMATIC | Y | | |
| ACIDIC | D | | |
| AMIDE | Q | | |
| BASIC | K | | |

Rajpal et al, 2005

Heavy Variable (SEQ ID No: 11)

QVQLVESGGGVVQPGRSLRLSCAASGFTFSDYGMHWVRQAPGKGLERVAVISYDGSNKYYADSVKGRFTISRDNSKNTLYLQMNSLRAEDTAVYYCARWDSYAMDYWGQGTTVTVSS

Light Variable (SEQ ID No: 12)

DIVLTQSPDSLAVSLGERATINCRASKSVSTSGYSYMHWYCQRPGQPPKLLIYLASNLESGVPDRFSGSGSGTDFTLTISSLQAEDVAVYYCQHSREVPYTFGGGTKVEIKR

Figure 6

| Sample | Kinetic Chi² (RU²) | ka (1/Ms) | kd (1/s) | *KD (M) | Rmax (RU) | **Theo Rmax (RU) |
|---|---|---|---|---|---|---|
| H3_W99H_L1 | 0.63 | 9.34E+04 | 4.98E-05 | 5.33E-10 | 24.6 | 38.6 |
| H3_W99H_L2 | 1.38 | 8.43E+04 | 3.98E-05 | 4.72E-10 | 32.8 | 53.6 |
| H3_W99H_VL-par | 0.80 | 9.7E+04 | 4.67E-05 | 4.81E-10 | 29.1 | 46.7 |
| H2_T56H_L1 | 0.07 | 2.64E+04 | 3.45E-05 | 1.30E-09 | 17.4 | 36.4 |
| H2_T57H_L1 | 0.23 | 4.44E+04 | 3.30E-05 | 7.43E-10 | 19.4 | 35.5 |
| H2_Y60K_L1 | 0.09 | 3.86E+04 | 3.70E-05 | 9.57E-10 | 16.8 | 35.5 |
| H2_T63Y_L1 | 0.10 | 2.96E+04 | 3.16E-05 | 1.07E-09 | 16.0 | 33.0 |
| H2_K65P_L1 | 0.04 | 2.88E+04 | 3.08E-05 | 1.07E-09 | 13.2 | 28.4 |
| H2_G66Q_L1 | 0.17 | 3.46E+04 | 3.34E-05 | 9.68E-10 | 19.4 | 37.6 |
| H3_M105P_L1 | 0.03 | 2.81E+04 | 4.35E-05 | 1.55E-09 | 11.9 | 29.0 |
| 51B12_VH_L1 | 0.09 | 2.93E+04 | 2.83E-05 | 9.63E-10 | 18.0 | 37.6 |
| H2_T56H_L2 | 0.04 | 2.32E+04 | 3.74E-05 | 1.61E-09 | 14.2 | 34.5 |
| H2_T57H_L2 | 0.16 | 3.86E+04 | 3.78E-05 | 9.80E-10 | 17.9 | 38.6 |
| H2_Y60K_L2 | 0.08 | 3.65E+04 | 4.04E-05 | 1.11E-09 | 14.0 | 33.6 |
| H2_T63Y_L2 | 0.05 | 2.67E+04 | 3.06E-05 | 1.15E-09 | 17.1 | 39.4 |
| H3_M105P_VL-par | 0.05 | 2.47E+04 | 4.03E-05 | 1.63E-09 | 16.0 | 36.9 |
| H2_K65P_L2 | 0.07 | 2.33E+04 | 2.62E-05 | 1.13E-09 | 16.6 | 38.4 |
| H2_G66Q_L2 | 0.09 | 2.91E+04 | 3.42E-05 | 1.17E-09 | 19.5 | 40.3 |
| H3_M105P_L2 | 0.07 | 2.15E+04 | 4.14E-05 | 1.93E-09 | 17.0 | 41.1 |
| 51B12_VH_L2 | 0.07 | 2.56E+04 | 2.86E-05 | 1.12E-09 | 19.0 | 43.7 |
| H2_T56H_VL-par | 0.08 | 2.62E+04 | 3.38E-05 | 1.29E-09 | 17.7 | 38.9 |
| H2_T57H_VL-par | 0.12 | 4.39E+04 | 3.47E-05 | 7.91E-10 | 20.0 | 41.2 |
| H2_Y60K_VL-par | 0.09 | 3.67E+04 | 4.01E-05 | 1.09E-09 | 17.7 | 42.1 |
| H2_T63Y_VL-par | 0.05 | 2.96E+04 | 3.04E-05 | 1.03E-09 | 17.6 | 39.4 |
| H2_K65P_VL-par | 0.03 | 2.70E+04 | 2.92E-05 | 1.08E-09 | 14.4 | 32.0 |
| H2_G66Q_VL-par | 0.10 | 3.44E+04 | 3.72E-05 | 1.08E-09 | 18.9 | 36.9 |

Figure 7

| Sample | Lot number | Kinetic Chi² (RU²) | ka (1/Ms) | kd (1/s) | *KD (M) | Rmax (RU) | **Theo Rmax (RU) | ****% Activity |
|---|---|---|---|---|---|---|---|---|
| 51B12_VH_VL-par | 210850 | 0.09 | 2.75E+04 | 2.99722E-05 | 1.0918E-09 | 21.0 | 47.1 | 44.7 |
| H2_T57H_VL-par | 210843 | 0.19 | 4.16E+04 | 3.29668E-05 | 7.9187E-10 | 21.9 | 43.9 | 49.9 |
| H2_G66Q_VL-par | 210847 | 0.17 | 3.36E+04 | 2.78417E-05 | 8.2967E-10 | 20.2 | 40.9 | 49.4 |
| H2_T56H_VL-par | 210842 | 0.08 | 2.56E+04 | 1.51463E-05 | 5.9102E-10 | 18.3 | 64.8 | 28.3 |
| H2_Y60K_VL-par | 210844 | 0.26 | 3.94E+04 | 3.26E-05 | 8.29E-10 | 21.7 | 51.7 | 42.0 |
| H2_T57H_L1 | 210825 | 0.08 | 4.31E+04 | 4.18194E-05 | 9.7128E-10 | 18.1 | 40.1 | 45.1 |
| H2_T63Y_VL-par | 210845 | 0.14 | 2.89E+04 | 2.50677E-05 | 8.6822E-10 | 18.5 | 36.5 | 50.7 |
| H2_Y60K_L1 | 210826 | 0.04 | 3.72E+04 | 2.24819E-05 | 6.0363E-10 | 16.1 | 39.2 | 41.1 |
| H2_G66Q_L2 | 210838 | 0.07 | 3.00E+04 | 3.58812E-05 | 1.1977E-09 | 19.2 | 36.6 | 52.4 |
| H3_W99H_L1 | 210830 | 0.64 | 9.99E+04 | 3.14E-05 | 3.14E-10 | 27.1 | 49.8 | 54.4 |
| H2_T63Y_L1 | 210827 | 0.05 | 2.75E+04 | 3.67727E-05 | +1.3351E-09 | 14.7 | 32.7 | 45.0 |
| H3_W99H_L2 | 210839 | 0.31 | 9.31E+04 | 3.16E-05 | +3.39E-10 | 27.6 | 54.1 | 51.0 |
| H3_W99H_VL-par | 210848 | 0.38 | 1.02E+05 | 3.29E-05 | +3.22E-10 | 29.6 | 55.0 | 53.8 |

Figure 9A

| Antibody | CDR-H1 | CDR-H2 | CDR-H3 | CDR-L1 | CDR-L2 | CDR-L3 | VH | VL |
|---|---|---|---|---|---|---|---|---|
| 51B12 parent antibody | DYGMH [SEQ ID No: 5] | YISSGGTTIYYA DTVKG [SEQ ID No: 6] | WTNLYAMDY [SEQ ID No: 7] | RASKSVSTGY SYMH [SEQ ID No: 8] | LASNLES [SEQ ID No: 9] | QHSREVPYT [SEQ ID No: 10] | QVQLVESGGGVVQPGRSL RLSCAASGFTFSDYGMHW VRQAPGKGLEWVAYISSG GTTIYYADTVKGRFTISR DNSKNTLYLQMNSLRAED TAVYYCARWTNLYAMDYW GQGTTVTVSS [SEQ ID No: 11] | DIVLTQSPDSLAVSLGER ATINCRASKSVSTGYSY MHWYQQKPGQPPKFLIYL ASNLESGVPDRFSGSGSG TDFTLTISSLQAEDVAVY YCQHSREVPYTFGGGTKV EIKR [SEQ ID No: 12] |

Figure 9B

| Antibody | CDR-H1 | CDR-H2 | CDR-H3 | CDR-L1 | CDR-L2 | CDR-L3 | VH | VL |
|---|---|---|---|---|---|---|---|---|
| H3_W99H_ L1 | DYGMH [SEQ ID No: 13] | YISSGGTTIYYA DTVKG [SEQ ID No: 14] | HTNLYAMDY [SEQ ID No: 15] | RASKSVSTGY SYMH [SEQ ID No: 16] | LASNLES [SEQ ID No: 17] | QHSREVPYT [SEQ ID No: 18] | QVQLVESGGGVVQPGRSL RLSCAASGFTFSDYGMHW VRQAPGKGLEWVAYISSG GTTIYYADTVKGRFTISR DNSKNTLYLQMNSLRAED TAVYYCARHTNLYAMDYW GQGTTVTVSS [SEQ ID No: 19] | DIVLTQSPDSLAVSLGER ATINCRASKSVSTGYSY MHWYQQKPGQPPKFLIYL ASNLESGVPDRFSGSGSG TDFTLTISSLQAEDVAVY YCQHSREVPYTFGGGTKV EIKR [SEQ ID No: 20] |
| H3_W99H_ L2 | DYGMH [SEQ ID No: 21] | YISSGGTTIYYA DTVKG [SEQ ID No: 22] | HTNLYAMDY [SEQ ID No: 23] | RASKSVSTGY SYMH [SEQ ID No: 24] | LASNKES [SEQ ID No: 25] | QHSREVPYT [SEQ ID No: 26] | QVQLVESGGGVVQPGRSL RLSCAASGFTFSDYGMHW VRQAPGKGLEWVAYISSG GTTIYYADTVKGRFTISR DNSKNTLYLQMNSLRAED TAVYYCARHTNLYAMDYW GQGTTVTVSS [SEQ ID No: 27] | DIVLTQSPDSLAVSLGER ATINCRASKSVSTGYSY MHWYQQKPGQPPKFLIYL ASNKESGVPDRFSGSGSG TDFTLTISSLQAEDVAVY YCQHSREVPYTFGGGTKV EIKR [SEQ ID No: 28] |

Figure 9B (cont'd)

| Antibody | CDR-H1 | CDR-H2 | CDR-H3 | CDR-L1 | CDR-L2 | CDR-L3 | VH | VL |
|---|---|---|---|---|---|---|---|---|
| H3_W99H_VL-par | DYGMH [SEQ ID No: 29] | YISSGGTHIYYA DTVKG [SEQ ID No: 30] | HTNLYAMDY [SEQ ID No: 31] | RASKSVSTGY SYMH [SEQ ID No: 32] | LASNLES [SEQ ID No: 33] | QHSREVPYT [SEQ ID No: 34] | QVQLVESGGGVVQPGRSL RLSCAASGFTFSDYGMHW VRQAPGKGLEWVAYISSG GTHIYYADTVKGRFTISR DNSKNTLYLQMNSLRAED TAVYYCARHTNLYAMDYW GQGTTVTVSS [SEQ ID No: 35] | DIVLTQSPDSLAVSLGER ATINCRASKSVSTGYSY MHWYQQKPGQPPKFLIYL ASNLESGVPDRFSGSGSG TDFTLTISSLQAEDVAVY YCQHSREVPYTFGGGTKV EIKR [SEQ ID No: 36] |
| H2_T56H_L1 | DYGMH [SEQ ID No: 37] | YISSGGHTIYYA DTVKG [SEQ ID No: 38] | WTNLYAMDY [SEQ ID No: 39] | RASKSVSTQGY SYMH [SEQ ID No: 40] | LASNLES [SEQ ID No: 41] | QHSREVPYT [SEQ ID No: 42] | QVQLVESGGGVVQPGRSL RLSCAASGFTFSDYGMHW VRQAPGKGLEWVAYISSG GHTIYYADTVKGRFTISR DNSKNTLYLQMNSLRAED TAVYYCARWTNLYAMDYW GQGTTVTVSS [SEQ ID No: 43] | DIVLTQSPDSLAVSLGER ATINCRASKSVSTQGYSY MHWYQQKPGQPPKFLIYL ASNLESGVPDRFSGSGSG TDFTLTISSLQAEDVAVY YCQHSREVPYTFGGGTKV EIKR [SEQ ID No: 44] |
| H2_T57H_L1 | DYGMH [SEQ ID No: 45] | YISSGGTHIYYA DTVKG [SEQ ID No: 46] | WTNLYAMDY [SEQ ID No: 47] | RASKSVSTQGY SYMH [SEQ ID No: 48] | LASNLES [SEQ ID No: 49] | QHSREVPYT [SEQ ID No: 50] | QVQLVESGGGVVQPGRSL RLSCAASGFTFSDYGMHW VRQAPGKGLEWVAYISSG GTHIYYADTVKGRFTISR DNSKNTLYLQMNSLRAED TAVYYCARWTNLYAMDYW GQGTTVTVSS [SEQ ID No: 51] | DIVLTQSPDSLAVSLGER ATINCRASKSVSTQGYSY MHWYQQKPGQPPKFLIYL ASNLESGVPDRFSGSGSG TDFTLTISSLQAEDVAVY YCQHSREVPYTFGGGTKV EIKR [SEQ ID No: 52] |
| H2_Y60K_L1 | DYGMH [SEQ ID No: 53] | YISSGGTTIYKA DTVKG [SEQ ID No: 54] | WTNLYAMDY [SEQ ID No: 55] | RASKSVSTQGY SYMH [SEQ ID No: 56] | LASNLES [SEQ ID No: 57] | QHSREVPYT [SEQ ID No: 58] | QVQLVESGGGVVQPGRSL RLSCAASGFTFSDYGMHW VRQAPGKGLEWVAYISSG GTTIYKADTVKGRFTISR DNSKNTLYLQMNSLRAED TAVYYCARWTNLYAMDYW GQGTTVTVSS [SEQ ID No: 59] | DIVLTQSPDSLAVSLGER ATINCRASKSVSTQGYSY MHWYQQKPGQPPKFLIYL ASNLESGVPDRFSGSGSG TDFTLTISSLQAEDVAVY YCQHSREVPYTFGGGTKV EIKR [SEQ ID No: 60] |

Figure 9B (cont'd)

| Antibody | CDR-H1 | CDR-H2 | CDR-H3 | CDR-L1 | CDR-L2 | CDR-L3 | VH | VL |
|---|---|---|---|---|---|---|---|---|
| H2_T63Y_L1 | DYGMH [SEQ ID No: 61] | YISSGGTTIYYA DYVKG [SEQ ID No: 62] | WTNLYAMDY [SEQ ID No: 63] | RASKSVSTQGY SYMH [SEQ ID No: 64] | LASNLES [SEQ ID No: 65] | QHSREVPYT [SEQ ID No: 66] | QVQLVESGGGVVQPGRSL RLSCAASGFTFSDYGMHW VRQAPGKGLEWVAYISSG GTTIYYADYVKGRFTISR DNSKNTLYLQMNSLRAED TAVYYCARWTNLYAMDYW GQGTTVTVSS [SEQ ID No: 67] | DIVLTQSPDSLAVSLGER ATINCRASKSVSTQGYSY MHWYQQKPGQPPKFLIYL ASNLESGVPDRFSGSSSG TDFTLTISSLQAEDVAVY YCQHSREVPYTFGGGTKV EIKR [SEQ ID No: 68] |
| H2_K65P_L1 | DYGMH [SEQ ID No: 69] | YISSGGTTIYYA DTVPG [SEQ ID No: 70] | WTNLYAMDY [SEQ ID No: 71] | RASKSVSTQGY SYMH [SEQ ID No: 72] | LASNLES [SEQ ID No: 73] | QHSREVPYT [SEQ ID No: 74] | QVQLVESGGGVVQPGRSL RLSCAASGFTFSDYGMHW VRQAPGKGLEWVAYISSG GTTIYYADTVPGRFTISR DNSKNTLYLQMNSLRAED TAVYYCARWTNLYAMDYW GQGTTVTVSS [SEQ ID No: 75] | DIVLTQSPDSLAVSLGER ATINCRASKSVSTQGYSY MHWYQQKPGQPPKFLIYL ASNLESGVPDRFSGSSSG TDFTLTISSLQAEDVAVY YCQHSREVPYTFGGGTKV EIKR [SEQ ID No: 76] |
| H2_G66Q_L1 | DYGMH [SEQ ID No: 77] | YISSGGTTIYYA DTVKQ [SEQ ID No: 78] | WTNLYAMDY [SEQ ID No: 79] | RASKSVSTQGY SYMH [SEQ ID No: 80] | LASNLES [SEQ ID No: 81] | QHSREVPYT [SEQ ID No: 82] | QVQLVESGGGVVQPGRSL RLSCAASGFTFSDYGMHW VRQAPGKGLEWVAYISSG GTTIYYADTVKQRFTISR DNSKNTLYLQMNSLRAED TAVYYCARWTNLYAMDYW GQGTTVTVSS [SEQ ID No: 83] | DIVLTQSPDSLAVSLGER ATINCRASKSVSTQGYSY MHWYQQKPGQPPKFLIYL ASNLESGVPDRFSGSSSG TDFTLTISSLQAEDVAVY YCQHSREVPYTFGGGTKV EIKR [SEQ ID No: 84] |
| H3_M105P_L1 | DYGMH [SEQ ID No: 85] | YISSGGTTIYYA DTVKG [SEQ ID No: 86] | WTNLYAPDY [SEQ ID No: 87] | RASKSVSTQGY SYMH [SEQ ID No: 88] | LASNLES [SEQ ID No: 89] | QHSREVPYT [SEQ ID No: 90] | QVQLVESGGGVVQPGRSL RLSCAASGFTFSDYGMHW VRQAPGKGLEWVAYISSG GTTIYYADTVKGRFTISR DNSKNTLYLQMNSLRAED TAVYYCARWTNLYAPDYW GQGTTVTVSS [SEQ ID No: 91] | DIVLTQSPDSLAVSLGER ATINCRASKSVSTQGYSY MHWYQQKPGQPPKFLIYL ASNLESGVPDRFSGSSSG TDFTLTISSLQAEDVAVY YCQHSREVPYTFGGGTKV EIKR [SEQ ID No: 92] |

Figure 9B (cont'd)

| Antibody | CDR-H1 | CDR-H2 | CDR-H3 | CDR-L1 | CDR-L2 | CDR-L3 | VH | VL |
|---|---|---|---|---|---|---|---|---|
| 51B12_VH_L1 | DYGMH [SEQ ID No: 93] | YISSGGTTIYYA DTVKG [SEQ ID No: 94] | WTNLYAMDY [SEQ ID No: 95] | RASKSVSTQGY SYMH [SEQ ID No: 96] | LASNLES [SEQ ID No: 97] | QHSREVPYT [SEQ ID No: 98] | QVQLVESGGGVVQPGRSL RLSCAASGFTFSDYGMHW VRQAPGKGLEWVAYISSG GTTIYYADTVKGRFTISR DNSKNTLILQMNSLRAED TAVYYCARWTNLYAMDYW GQGTTVTVSS [SEQ ID No: 99] | DIVLTQSPDSLAVSLGER ATINCRASKSVSTQGYSY MHWYQQKPGQPPKFLIYL ASNLESGVPDRFSGSGSG TDFTLTISSLQAEDVAVY YCQHSREVPYTFGGGTKV EIKR [SEQ ID No: 100] |
| H2_T56H_L2 | DYGMH [SEQ ID No: 101] | YISSGGHTIYYA DTVKG [SEQ ID No: 102] | WTNLYAMDY [SEQ ID No: 103] | RASKSVSTSGY SYMH [SEQ ID No: 104] | LASNKES [SEQ ID No: 105] | QHSREVPYT [SEQ ID No: 106] | QVQLVESGGGVVQPGRSL RLSCAASGFTFSDYGMHW VRQAPGKGLEWVAYISSG GHTIYYADTVKGRFTISR DNSKNTLILQMNSLRAED TAVYYCARWTNLYAMDYW GQGTTVTVSS [SEQ ID No: 107] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 108] |
| H2_T57H_L2 | DYGMH [SEQ ID No: 109] | YISSGGTHIYYA DTVKG [SEQ ID No: 110] | WTNLYAMDY [SEQ ID No: 111] | RASKSVSTSGY SYMH [SEQ ID No: 112] | LASNKES [SEQ ID No: 113] | QHSREVPYT [SEQ ID No: 114] | QVQLVESGGGVVQPGRSL RLSCAASGFTFSDYGMHW VRQAPGKGLEWVAYISSG GTHIYYADTVKGRFTISR DNSKNTLILQMNSLRAED TAVYYCARWTNLYAMDYW GQGTTVTVSS [SEQ ID No: 115] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 116] |
| H2_Y60K_L2 | DYGMH [SEQ ID No: 117] | YISSGGTTIYKA DTVKG [SEQ ID No: 118] | WTNLYAMDY [SEQ ID No: 119] | RASKSVSTSGY SYMH [SEQ ID No: 120] | LASNKES [SEQ ID No: 121] | QHSREVPYT [SEQ ID No: 122] | QVQLVESGGGVVQPGRSL RLSCAASGFTFSDYGMHW VRQAPGKGLEWVAYISSG GTTIYKADTVKGRFTISR DNSKNTLILQMNSLRAED TAVYYCARWTNLYAMDYW GQGTTVTVSS [SEQ ID No: 123] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 124] |

Figure 9B (cont'd)

| Antibody | CDR-H1 | CDR-H2 | CDR-H3 | CDR-L1 | CDR-L2 | CDR-L3 | VH | VL |
|---|---|---|---|---|---|---|---|---|
| H2_T63Y_L2 | DYGMH [SEQ ID No: 125] | YISSGGTTIYYA DYVKG [SEQ ID No: 126] | WTNLYAMDY [SEQ ID No: 127] | RASKSVSTSGY SYMH [SEQ ID No: 128] | LASNKES [SEQ ID No: 129] | QHSREVPYT [SEQ ID No: 130] | QVQLVESGGGVVQPGRSL RLSCAASGFTFSDYGMHW VRQAPGKGLEWVAYISSG GTTIYYADYVKGRFTISR DNSKNTLYLQMNSLRAED TAVYYCARWTNLYAMDYW GQGTTVTVSS [SEQ ID No: 131] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 132] |
| H3_M105P_VL-par | DYGMH [SEQ ID No: 133] | YISSGGTTIYYA DYVKG [SEQ ID No: 134] | WTNLYAPDY [SEQ ID No: 135] | RASKSVSTSGY SYMH [SEQ ID No: 136] | LASNLES [SEQ ID No: 137] | QHSREVPYT [SEQ ID No: 138] | QVQLVESGGGVVQPGRSL RLSCAASGFTFSDYGMHW VRQAPGKGLEWVAYISSG GTTIYYADYVKGRFTISR DNSKNTLYLQMNSLRAED TAVYYCARWTNLYAPDYW GQGTTVTVSS [SEQ ID No: 139] | DIVLTQSPDSLAVSLGER ATINCRASKSVSTSGYSY MHWYQQKPGQPPKFLIYL ASNLESGVPDRFSGSGSG TDFTLTISSLQAEDVAVY YCQHSREVPYTFGGGTKV EIKR [SEQ ID No: 140] |
| H2_K65P_L2 | DYGMH [SEQ ID No: 141] | YISSGGTTIYYA DYVPG [SEQ ID No: 142] | WTNLYAMDY [SEQ ID No: 143] | RASKSVSTSGY SYMH [SEQ ID No: 144] | LASNKES [SEQ ID No: 145] | QHSREVPYT [SEQ ID No: 146] | QVQLVESGGGVVQPGRSL RLSCAASGFTFSDYGMHW VRQAPGKGLEWVAYISSG GTTIYYADYVPGRFTISR DNSKNTLYLQMNSLRAED TAVYYCARWTNLYAMDYW GQGTTVTVSS [SEQ ID No: 147] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 148] |
| H2_G66Q_L2 | DYGMH [SEQ ID No: 149] | YISSGGTTIYYA DTVKQ [SEQ ID No: 150] | WTNLYAMDY [SEQ ID No: 151] | RASKSVSTSGY SYMH [SEQ ID No: 152] | LASNKES [SEQ ID No: 153] | QHSREVPYT [SEQ ID No: 154] | QVQLVESGGGVVQPGRSL RLSCAASGFTFSDYGMHW VRQAPGKGLEWVAYISSG GTTIYYADTVKQRFTISR DNSKNTLYLQMNSLRAED TAVYYCARWTNLYAMDYW GQGTTVTVSS [SEQ ID No: 155] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 156] |

Figure 9B (cont'd)

| Antibody | CDR-H1 | CDR-H2 | CDR-H3 | CDR-L1 | CDR-L2 | CDR-L3 | VH | VL |
|---|---|---|---|---|---|---|---|---|
| H3_M105P_L2 | DYGMH [SEQ ID No: 157] | YISSGGTTIYYA DTVKG [SEQ ID No: 158] | WTNLYAPDY [SEQ ID No: 159] | RASKSVSTSGY SYMH [SEQ ID No: 160] | LASNKES [SEQ ID No: 161] | QHSREVPYT [SEQ ID No: 162] | QVQLVESGGGVVQPGRSL RLSCAASGFTFSDYGMHW VRQAPGKGLEWVAYISSG GTTIYYADTVKGRFTISR DNSKNTLYLQMNSLRAED TAVYYCARWTNLYAPDYW GQGTTVTVSS [SEQ ID No: 163] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 164] |
| 51B12_VH_L2 | DYGMH [SEQ ID No: 165] | YISSGGTTIYYA DTVKG [SEQ ID No: 166] | WTNLYAMDY [SEQ ID No: 167] | RASKSVSTSGY SYMH [SEQ ID No: 168] | LASNKES [SEQ ID No: 169] | QHSREVPYT [SEQ ID No: 170] | QVQLVESGGGVVQPGRSL RLSCAASGFTFSDYGMHW VRQAPGKGLEWVAYISSG GTTIYYADTVKGRFTISR DNSKNTLYLQMNSLRAED TAVYYCARWTNLYAMDYW GQGTTVTVSS [SEQ ID No: 171] | DIVLTQSPDSLAVSLGER ATINCRASKSVSTSGYSY MHWYQQKPGQPPKFLIYL ASNKESGVPDRFSGSGSG TDFTLTISSLQAEDVAVY YCQHSREVPYTFGGGTKV EIKR [SEQ ID No: 172] |
| H2_T56H_V L-par | DYGMH [SEQ ID No: 173] | YISSGGHTIYYA DTVKG [SEQ ID No: 174] | WTNLYAMDY [SEQ ID No: 175] | RASKSVSTSGY SYMH [SEQ ID No: 176] | LASNLES [SEQ ID No: 177] | QHSREVPYT [SEQ ID No: 178] | QVQLVESGGGVVQPGRSL RLSCAASGFTFSDYGMHW VRQAPGKGLEWVAYISSG GHTIYYADTVKGRFTISR DNSKNTLYLQMNSLRAED TAVYYCARWTNLYAMDYW GQGTTVTVSS [SEQ ID No: 179] | DIVLTQSPDSLAVSLGER ATINCRASKSVSTSGYSY MHWYQQKPGQPPKFLIYL ASNLESGVPDRFSGSGSG TDFTLTISSLQAEDVAVY YCQHSREVPYTFGGGTKV EIKR [SEQ ID No: 180] |
| H2_T57H_V L-par | DYGMH [SEQ ID No: 181] | YISSGGTHIYYA DTVKG [SEQ ID No: 182] | WTNLYAMDY [SEQ ID No: 183] | RASKSVSTSGY SYMH [SEQ ID No: 184] | LASNLES [SEQ ID No: 185] | QHSREVPYT [SEQ ID No: 186] | QVQLVESGGGVVQPGRSL RLSCAASGFTFSDYGMHW VRQAPGKGLEWVAYISSG GTHIYYADTVKGRFTISR DNSKNTLYLQMNSLRAED TAVYYCARWTNLYAMDYW GQGTTVTVSS [SEQ ID No: 187] | DIVLTQSPDSLAVSLGER ATINCRASKSVSTSGYSY MHWYQQKPGQPPKFLIYL ASNLESGVPDRFSGSGSG TDFTLTISSLQAEDVAVY YCQHSREVPYTFGGGTKV EIKR [SEQ ID No: 188] |

Figure 9B (cont'd)

| Antibody | CDR-H1 | CDR-H2 | CDR-H3 | CDR-L1 | CDR-L2 | CDR-L3 | VH | VL |
|---|---|---|---|---|---|---|---|---|
| H2_Y60K_VL-par | DYGMH [SEQ ID No: 189] | YISSGGTTIYYA DTVKG [SEQ ID No: 190] | WTNLYAMDY [SEQ ID No: 191] | RASKSVSTSGY SYMH [SEQ ID No: 192] | LASNLES [SEQ ID No: 193] | QHSREVPYT [SEQ ID No: 194] | QVQLVESGGGVVQPGRSL RLSCAASGFTFSDYGMHW VRQAPGKGLEWVAYISSG GTTIYKADTVKGRFTISR DNSKNTLYLQMNSLRAED TAVYYCAWTNLYAMDYW GQGTTVTVSS [SEQ ID No: 195] | DIVLTQSPDSLAVSLGER ATINCRASKSVSTSGYSY MHWYQQKPGQPPKFLIYL ASNLESGVPDRFSGSGSG TDFTLTISSLQAEDVAVY YCQHSREVPYTFGGGTKV EIKR [SEQ ID No: 196] |
| H2_T63Y_VL-par | DYGMH [SEQ ID No: 197] | YISSGGTTIYYA DYVKG [SEQ ID No: 198] | WTNLYAMDY [SEQ ID No: 199] | RASKSVSTSGY SYMH [SEQ ID No: 200] | LASNLES [SEQ ID No: 201] | QHSREVPYT [SEQ ID No: 202] | QVQLVESGGGVVQPGRSL RLSCAASGFTFSDYGMHW VRQAPGKGLEWVAYISSG GTTIYYADYVKGRFTISR DNSKNTLYLQMNSLRAED TAVYYCAWTNLYAMDYW GQGTTVTVSS [SEQ ID No: 203] | DIVLTQSPDSLAVSLGER ATINCRASKSVSTSGYSY MHWYQQKPGQPPKFLIYL ASNLESGVPDRFSGSGSG TDFTLTISSLQAEDVAVY YCQHSREVPYTFGGGTKV EIKR [SEQ ID No: 204] |
| H2_K65P_VL-par | DYGMH [SEQ ID No: 205] | YISSGGTTIYYA DTVPG [SEQ ID No: 206] | WTNLYAMDY [SEQ ID No: 207] | RASKSVSTSGY SYMH [SEQ ID No: 208] | LASNLES [SEQ ID No: 209] | QHSREVPYT [SEQ ID No: 210] | QVQLVESGGGVVQPGRSL RLSCAASGFTFSDYGMHW VRQAPGKGLEWVAYISSG GTTIYYADTVPGRFTISR DNSKNTLYLQMNSLRAED TAVYYCAWTNLYAMDYW GQGTTVTVSS [SEQ ID No: 211] | DIVLTQSPDSLAVSLGER ATINCRASKSVSTSGYSY MHWYQQKPGQPPKFLIYL ASNLESGVPDRFSGSGSG TDFTLTISSLQAEDVAVY YCQHSREVPYTFGGGTKV EIKR [SEQ ID No: 212] |
| H2_G66Q_VL-par | DYGMH [SEQ ID No: 213] | YISSGGTTIYYA DTVKQ [SEQ ID No: 214] | WTNLYAMDY [SEQ ID No: 215] | RASKSVSTSGY SYMH [SEQ ID No: 216] | LASNLES [SEQ ID No: 217] | QHSREVPYT [SEQ ID No: 218] | QVQLVESGGGVVQPGRSL RLSCAASGFTFSDYGMHW VRQAPGKGLEWVAYISSG GTTIYYADTVKQRFTISR DNSKNTLYLQMNSLRAED TAVYYCAWTNLYAMDYW GQGTTVTVSS [SEQ ID No: 219] | DIVLTQSPDSLAVSLGER ATINCRASKSVSTSGYSY MHWYQQKPGQPPKFLIYL ASNLESGVPDRFSGSGSG TDFTLTISSLQAEDVAVY YCQHSREVPYTFGGGTKV EIKR [SEQ ID No: 220] |

Figure 10C

| Sample | ka (1/Ms) | kd (1/s) | KD (M) |
|---|---|---|---|
| Human ZIP12 ECD | $6.49 \times 10^4$ | $2.61 \times 10^{-4}$ | $4.02 \times 10^{-9}$ |
| Cynomolgus monkey ZIP12 ECD | $3.46 \times 10^4$ | $2.18 \times 10^{-4}$ | $6.31 \times 10^{-9}$ |
| Porcine ZIP12 ECD | No binding | No binding | No binding |
| Canine ZIP12 ECD | No binding | No binding | No binding |

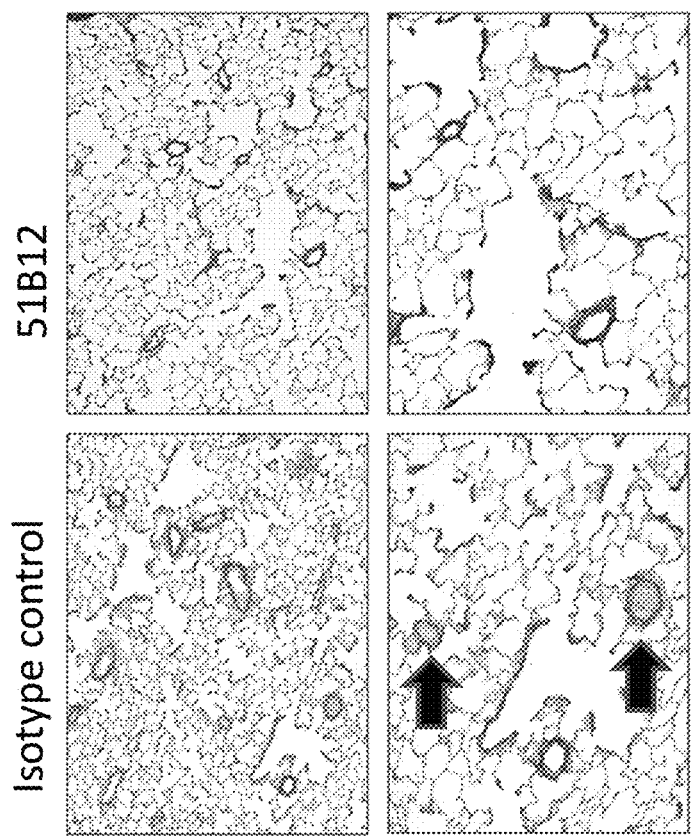
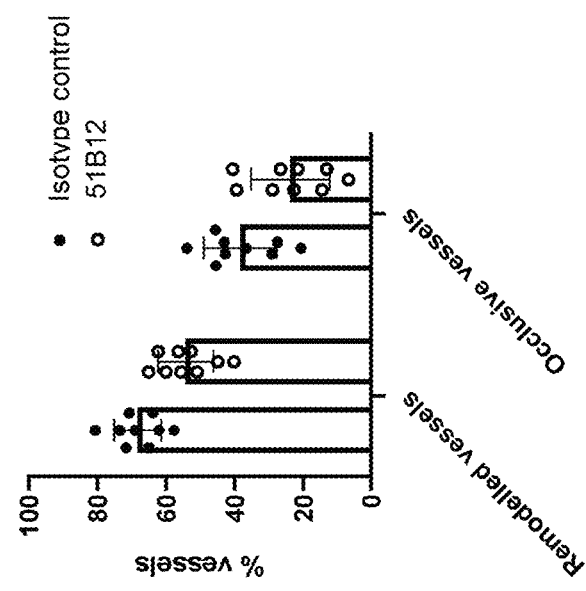
Figure 14 A
Figure 14 B

ZIP12 ANTIBODY

This application is a continuation of U.S. application Ser. No. 18/848,398 filed Dec. 10, 2024, which is the U.S. national stage of International Application No. PCT/GB2023/050726, filed Mar. 22, 2023, which claims the benefit of GB Application No. 2204023.2, filed Mar. 22, 2022, the contents of which are hereby incorporated by reference in their entireties.

REFERENCE TO ELECTRONIC SEQUENCE LISTING

The application contains a Sequence Listing which has been submitted electronically in .XML format via EFS-Web and is hereby incorporated by reference in its entirety. Said .XML copy, created on Dec. 20, 2024, is named "019236_00045_2024-12-20_Sequence_Listing.xml" and is 271,972 bytes in size. The sequence listing contained in this .XML file is part of the specification and is hereby incorporated by reference in its entirety.

The invention relates to ZIP12 antibodies. The invention extends to compositions comprising the antibodies, including pharmaceutical compositions and kits. The invention also extends to methods of making and using the antibodies, for example in therapy and diagnosis of hypoxia-related diseases, such as pulmonary hypertension and cancer.

Pulmonary hypertension (PH) is a pathological condition characterised by elevated pulmonary artery pressure and structurally remodelled pulmonary vessels. The current treatments for pulmonary hypertension centre on the pharmacological manipulation of signalling mechanisms used by vasoactive factors and have limited therapeutic benefit. There exists a significant unmet medical need for new therapeutics and diagnostics for this potentially lethal condition.

The typical response of the adult mammalian pulmonary circulation to a low oxygen environment is vasoconstriction and structural remodelling of pulmonary arterioles, leading to chronic elevation of pulmonary artery pressure (pulmonary hypertension) and right ventricular hypertrophy. Some mammals, however, exhibit genetic resistance to hypoxia-induced pulmonary hypertension (WILKINS, M. R. et al., Pathophysiology and treatment of high-altitude pulmonary vascular disease. Circulation. 2015, 131, 582-590; ZHAO, L. et al., Right ventricular hypertrophy secondary to pulmonary hypertension is linked to rat chromosome 17: evaluation of cardiac ryanodine Ryr2 receptor as a candidate. Circulation. 2001, 103, 442-447; RHODES, J., Comparative physiology of hypoxic pulmonary hypertension: historical clues from brisket disease. Journal of applied physiology. 2005, 98, 1092-1100). The inventors have previously reported that the Fisher 344 (F344) rat strain is resistant to hypoxia-induced pulmonary hypertension compared to the Wistar Kyoto (WKY) strain (ZHAO, L. et al., Right ventricular hypertrophy secondary to pulmonary hypertension is linked to rat chromosome 17: evaluation of cardiac ryanodine Ryr2 receptor as a candidate. Circulation. 2001, 103, 442-447). However, the cause of this resistance has never been identified.

The inventors have also previously utilised a congenic breeding program and comparative genomics to exploit this variation in the rat and have identified the gene, Slc39a12, as a major regulator of hypoxia-induced pulmonary vascular remodelling. Slc39a12 encodes the zinc transporter, ZIP12. They found that ZIP12 expression is increased in many cell types, including endothelial, smooth muscle and interstitial cells, in the remodelled pulmonary arterioles of rats, cows and humans susceptible to hypoxia-induced pulmonary hypertension. The inventors have shown that ZIP12 expression in pulmonary vascular smooth muscle cells is hypoxia-dependent and that targeted inhibition of ZIP12 inhibits the rise in intracellular labile zinc in hypoxia-exposed pulmonary vascular smooth muscle cells and their proliferation in culture. The inventors have also previously demonstrated that genetic disruption of ZIP12 expression attenuates the development of pulmonary hypertension in rats housed in a hypoxic atmosphere. However, to date no specific treatment is available for targeting ZIP12 protein, which the inventors believe may provide for an improved means of treating pulmonary hypertension. Furthermore, diagnosis of pulmonary hypertension often requires invasive procedures, such as right heart catheterisation and echocardiograms. Thus, identification of new markers of pulmonary hypertension that could be measured through a simple and less invasive procedure is also desirable.

The inventors hypothesized that ZIP12 inhibition could prevent hypoxia-induced Pulmonary Vascular Smooth Muscle Cells (PVSMC) proliferation in vitro and pulmonary angiogenesis ex vivo. This identifies ZIP12 as a potential new therapeutic target for the treatment of the underlying disease mechanisms of pulmonary hypertension, which has led to the inventor's further work in developing antibodies that are capable of targeting the extracellular domain of ZIP12 to inhibit its function. The anti-ZIP12 activity of these antibodies means that they are useful as therapeutic agents in their own right, and may be used in the treatment, amelioration or prevention of any hypoxia-induced or hypoxia-associated condition, and in particular, though not exclusively, pulmonary hypertension.

Accordingly, in a first aspect of the invention, there is provided an antibody or antigen-binding fragment thereof which specifically binds to an extracellular domain of ZIP12, and recognises an epitope comprising or consisting of ADLLQVLSAGDHPPHNHSRS (SEQ ID No: 252), or a variant or fragment thereof, or preferably, an epitope comprising or consisting of LLQVLSAGDHPPHNHSRS (SEQ ID No:1), or a variant or fragment thereof.

In another aspect, there is provided an antibody or antigen-binding fragment thereof which specifically binds to an extracellular domain of ZIP12, and recognises an epitope comprising or consisting of LLQVLSAGDHPPHNHSRS (SEQ ID No: 1), or a variant or fragment thereof.

As shown in the examples (and shown in FIG. 8), the inventors have identified a novel epitope on the extracellular region or domain of the ZIP12 protein as being key to its function and have therefore developed antibodies that are capable of binding to, and inhibiting, ZIP12 function.

For example, as shown in FIG. 9b, the inventors have developed a large number of antibodies that they have demonstrated specifically target this extracellular epitope and which inhibit ZIP12 function.

Preferably, the antibody or antigen binding fragment thereof of the invention is capable of inhibiting ZIP12 function. Preferably, the antibody or antigen binding fragment thereof of the invention is capable of inhibiting ZIP12 function such that the rise in intracellular labile zinc in hypoxia-exposed pulmonary vascular smooth muscle cells and their proliferation in culture is inhibited.

The epitope may be provided herein as SEQ ID No: 252:
ADLLQVLSAGDHPPHNHSRS
 [SEQ ID No: 252]
Preferably, the epitope may be provided herein as SEQ ID No: 1, as follows:
LLQVLSAGDHPPHNHSRS
 [SEQ ID No: 1]
As illustrated in FIG. 10C, the inventors identified that the sequence ADLLQ (SEQ ID No: 253), was a common motif found in several of the candidate epitopes.

Preferably, therefore, the epitope may be provided herein as SEQ ID No: 253, as follows:
ADLLQ
 [SEQ ID No: 253]
Accordingly, in one embodiment, the antibody or antigen binding fragment thereof recognises an epitope comprising or consisting of ADLLQ (SEQ ID No: 253), or a variant or fragment thereof.

In one embodiment, ZIP12 may be represented by Genbank ID No: NP-001138667, which is provided herein as SEQ ID No: 2, as follows:

[SEQ ID No: 2]
MCFRTKLSVSWVPLFLLLSRVFSTETDKPSAQDSRSRGSSGQPADLLQVL

SAGDHPPHNHSRSLIKTLLEKTGCPRRRNGMQGDCNLCFEPDALLLIAGG

NFEDQLREEVVQRVSLLLLYYIIHQEEICSSKLNMSNKEYKFYLHSLLSL

RQDEDSSFLSQNETEDILAFTRQYFDTSQSQCMETKTLQKKSGIVSSEGA

NESTLPQLAAMIITLSLQGVCLGQGNLPSPDYFTEYIFSSLNRTNTLRLS

ELDQLLNTLWTRSTCIKNEKIHQFQRKQNNIITHDQDYSNFSSSMEKESE

DGPVSWDQTCFSARQLVEIFLQKGLSLISKEDFKQMSPGIIQQLLSCSCH

LPKDQQAKLPPTTLEKYGYSTVAVTLLTLGSMLGTALVLFHSCEENYRLI

LQLFVGLAVGTLSGDALLHLIPQVLGLHKQEAPEFGHFHESKGHIWKLMG

LIGGIHGFFLIEKCFILLVSPNDKQGLSLVNGHVGHSHHLALNSELSDQA

GRGKSASTIQLKSPEDSQAAEMPIGSMTASNRKCKAISLLAIMILVGDSL

HNFADGLAIGAAFSSSSESGVTTTIAILCHEIPHEMGDFAVLLSSGLSMK

TAILMNFISSLTAFMGLYIGLSVSADPCVQDWIFTVTAGMFLYLSLVEML

PEMTHVQTQRPWMMFLLQNFGLILGWLSLLLLAIYEQNIKI

The antibody or antigen-binding fragment thereof may bind to the epitope, which is part of SEQ ID No: 2, or a fragment or variant thereof.

Preferably, the antibody or antigen-binding fragment thereof binds to an epitope contained in an amino acid sequence of SEQ ID No: 252 and/or SEQ ID No: 1. Preferably, the antibody or antigen-binding fragment thereof binds to one or more amino acids in SEQ ID No: 252 and/or SEQ ID No: 1, or a fragment or variant thereof. Preferably, the antibody or antigen-binding fragment thereof binds to any 5, 6, or 7 amino acids present in SEQ ID No: 252 and/or SEQ ID No: 1, or a variant or fragment thereof. Preferably, the antibody or antigen-binding fragment thereof binds to any 8, 9, or 10 amino acids present in SEQ ID No: 252 and/or SEQ ID No: 1, or a variant or fragment thereof. Preferably, the antibody or antigen-binding fragment thereof binds to any 11, 12, or 13 amino acids present in SEQ ID No: 252 and/or SEQ ID No: 1, or a variant or fragment thereof. Preferably, the antibody or antigen-binding fragment thereof binds to any 14, 15, or 16 amino acids present in SEQ ID No: 252 and/or SEQ ID No: 1, or a variant or fragment thereof.

Preferably, the antibody or antigen-binding fragment thereof binds to any 17 or 18 amino acids present in SEQ ID No: 252 and/or SEQ ID No: 1, or a variant or fragment thereof.

The epitope may be linear or conformational. The term "linear epitope" can mean an epitope comprising or consisting of amino acid residues that form a sequence together in the primary sequence of the protein antigen, i.e. sequential or continuous epitope. The linear epitope may be present on folded ZIP12.

The term "conformational epitope" can mean an epitope consisting of amino acid residues, at least some of which are separated from others in the primary sequence of the protein antigen, but which together assemble in the 3D structure and are recognised by an antibody, i.e. discontinuous or non-sequential epitope.

From the data obtained in FIG. 8, the inventors believe that the epitope of the antibody or antigen-binding fragment is at least partially linear. Indeed, it is likely that the antibody binds with a primarily linear epitope. However, it is possible that the antibody or antigen-binding fragment may not bind to every single one of the amino acids of SEQ ID No: 252 and/or SEQ ID No:1.

ZIP12, ZIP13 and ZIP4 are all zinc transporters. However, ZIP4 is not involved in the pathogenesis of pulmonary hypertension, but does have a significant role in tissue homeostasis, metabolism, development and immunity. Furthermore, ZIP13 has been shown to regulate intracellular zinc and smad signalling, which is important for BMP/TGF-beta signalling (see Fakuda et al, J Biol Inorg Chem, 2011). Impaired BMP signalling is known to be linked to pulmonary hypertension, as shown in Morrell et al Nature Reviews Cardiology, 2015. Therefore, the inhibition of ZIP13, leading to lower zinc concentrations, may impair BMP signalling and cause pulmonary hypertension, not cure it.

Therefore, it is important that the antibodies of the invention, which target ZIP12, do so specifically, and have no or little cross-reactivity with ZIP13 and/or ZIP4, because this could result in significant unwanted off-target effects.

Accordingly, preferably the antibody or antigen binding fragment thereof of the invention does not substantially bind to human ZIP13. Preferably, the antibody or antigen binding fragment thereof of the invention has no cross-reactivity with human ZIP13.

In one embodiment, ZIP13 may be represented by Gene ID No: 91252, which is provided herein as SEQ ID No: 3, as follows:

[SEQ ID No: 3]
MPGCPCPGCGMAGPRLLFLTALALELLERAGGSQPALRSRGTATACRLDN

KESESWGALLSGERLDTWICSLLGSLMVGLSGVFPLLVIPLEMGTMLRSE

AGAWRLKQLLSFALGGLLGNVFLHLLPEAWAYTCSASPGGEGQSLQQQQQ

LGLWVIAGILTFLALEKMFLDSKEEGTSQAPNKDPTAAAAALNGGHCLAQ

PAAEPGLGAVVRSIKVSGYLNLLANTIDNFTHGLAVAASFLVSKKIGLLT

TMAILLHEIPHEVGDFAILLRAGFDRWSAAKLQLSTALGGLLGAGFAICT

QSPKGVVGCSPAAEETAAWVLPFTSGGFLYIALVNVLPDLLEEEDPWRSL

QQLLLLCAGIVVMVLFSLFVD

Thus, preferably the antibody or antigen-binding fragment thereof does not bind to a sequence as substantially set out in SEQ ID No: 3, or a variant or fragment thereof.

In addition, preferably the antibody or antigen binding fragment thereof of the invention does not substantially bind to human ZIP4. Preferably, the antibody or antigen binding fragment thereof of the invention has no cross-reactivity with human ZIP4.

In one embodiment, ZIP4 may be represented by Genbank ID No: NP-570901, which is provided herein as SEQ ID No: 4, as follows:

[SEQ ID No: 4]
MASLVSLELGLLLAVLVVTATASPPAGLLSLLTSGQGALDQEALGGLLNT

LADRVHCANGPCGKCLSVEDALGLGEPEGSGLPPGPVLEARYVARLSAAA

VLYLSNPEGTCEDARAGLWASHADHLLALLESPKALTPGLSWLLQRMQAR

AAGQTPKTACVDIPQLLEEAVGAGAPGSAGGVLAALLDHVRSGSCFHALP

SPQYFVDFVFQQHSSEVPMTLAELSALMQRLGVGREAHSDHSHRHRGASS

RDPVPLISSSNSSSVWDTVCLSARDVMAAYGLSEQAGVTPEAWAQLSPAL

LQQQLSGACTSQSRPPVQDQLSQSERYLYGSLATLLICLCAVFGLLLLTC

TGCRGVTHYILQTFLSLAVGALTGDAVLHLTPKVLGLHTHSEEGLSPQPT

WRLLAMLAGLYAFFLFENLFNLLLPRDPEDLEDGPCGHSSHSHGGHSHGV

SLQLAPSELRQPKPPHEGSRADLVAEESPELLNPEPRRLSPELRLLPYMI

TLGDAVHNFADGLAVGAAFASSWKTGLATSLAVFCHELPHELGDFAALLH

AGLSVRQALLLNLASALTAFAGLYVALAVGVSEESEAWILAVATGLFLYV

ALCDMLPAMLKVRDPRPWLLFLLHNVGLLGGWTVLLLLSLYEDDITF

Thus, preferably the antibody or antigen-binding fragment thereof does not bind to a sequence as substantially set out in SEQ ID No: 4, or a variant or fragment thereof.

Preferably, the antibody or antigen-binding fragment thereof binds to human and/or cynomolgus ZIP12. Preferably, the antibody or antigen-binding fragment thereof does not bind to canine and/or porcine ZIP12.

The invention extends to both whole antibodies (i.e. immunoglobulins) with immunospecificity for the ZIP12 extracellular epitope comprising or consisting of SEQ ID No: 252 and/or SEQ ID No:1 or a variant or fragment thereof, as well as to antigen-binding fragments or regions of the corresponding full-length antibody.

The antibody or antigen-binding fragment thereof may be monovalent, divalent or polyvalent. Monovalent antibodies are dimers (HL) comprising a heavy (H) chain associated by a disulphide bridge with a light chain (L). Divalent antibodies are tetramer (H2L2) comprising two dimers associated by at least one disulphide bridge. Polyvalent antibodies may also be produced, for example by linking multiple dimers. The basic structure of an antibody molecule consists of two identical light chains and two identical heavy chains which associate non-covalently and can be linked by disulphide bonds. Each heavy and light chain contains an amino-terminal variable region of about 110 amino acids, and constant sequences in the remainder of the chain. The variable region includes several hypervariable regions, or Complementarity Determining Regions (CDRs), that form the antigen-binding site of the antibody molecule and determine its specificity for the antigen, i.e. the extracellular portion of ZIP12, or variant or fragment thereof (e.g. an epitope). On either side of the CDRs of the heavy and light chains is a framework region, a relatively conserved sequence of amino acids that anchors and orients the CDRs. Antibody fragments may include a bi-specific antibody (BsAb) or a chimeric antigen receptor (CAR).

The heavy chain constant region typically comprises three domains, $C_{H1}$, $C_{H2}$, and $C_{H3}$. Each light chain typically comprises a light chain variable region ($V_L$) and a light chain constant region. The light chain constant region typically comprises one domain, abbreviated $C_L$.

Each heavy chain and light chain generally comprise three CDRs and four FRs, arranged in the following order (from N-terminus to C-terminus): FR1—CDR1—FR2—CDR2—FR3—CDR3—FR4. The CDRs are involved in antigen binding and confer antigen specificity and binding affinity to the antibody. See Kabat et al., *Sequences of Proteins of Immunological Interest* 5th ed. (1991) Public Health Service, National Institutes of Health, Bethesda, MD, incorporated by reference in its entirety.

The heavy chain from any vertebrate species can be assigned to one of five different classes (or isotypes): IgA, IgD, IgE, IgG, and IgM. These classes are also designated α, δ, ε, γ, and μ, respectively. The IgG and IgA classes are further divided into subclasses on the basis of differences in sequence and function. Humans express the following subclasses: IgG1, IgG2, IgG3, IgG4, IgA1, and IgA2.

The light chain from any vertebrate species can be assigned to one of two types, called kappa and lambda, based on the sequence of the constant domain.

The constant region consists of one of five heavy chain sequences (μ, γ, ξ, α, or ε) and one of two light chain sequences (κ or λ). The heavy chain constant region sequences determine the isotype of the antibody and the effector functions of the molecule.

Preferably, the antibody or antigen-binding fragment thereof is isolated or purified.

In one preferred embodiment, the antibody or antigen-binding fragment thereof comprises a polyclonal antibody, or an antigen-binding fragment thereof. The antibody or antigen-binding fragment thereof may be generated in a rabbit, mouse or rat.

Preferably, the antibody or antigen-binding fragment thereof is obtained by immunising a host animal with the ZIP12 extracellular epitope comprising or consisting of SEQ ID No: 252 and/or SEQ ID No:1 or a variant or fragment thereof, and then collecting the antibody or antigen-binding fragment thereof. The host animal may be a rabbit.

In another preferred embodiment, the antibody or antigen-binding fragment thereof comprises a monoclonal antibody or an antigen-binding fragment thereof. Preferably, the antibody of the invention is a human antibody. As used herein, the term "human antibody" can mean an antibody, such as a monoclonal antibody, which comprises substantially the same heavy and light chain CDR amino acid sequences as found in a particular human antibody exhibiting immunospecificity for the extracellular portion of ZIP12, or a variant or fragment thereof. An amino acid sequence, which is substantially the same as a heavy or light chain CDR, exhibits a considerable amount of sequence identity when compared to a reference sequence. Such identity is definitively known or recognizable as representing the amino acid sequence of the particular human antibody. Substantially the same heavy and light chain CDR amino acid sequence can have, for example, minor modifications or conservative substitutions of amino acids. Such a human antibody maintains its function of selectively binding to the ZIP12 extracellular epitope comprising or consisting of SEQ ID No: 252 and/or SEQ ID No:1 or a variant or fragment thereof.

The term "human monoclonal antibody" can include a monoclonal antibody with substantially or entirely human CDR amino acid sequences produced, for example by recombinant methods such as production by a phage library, by lymphocytes or by hybridoma cells.

The term "monoclonal antibody" refers to an antibody from a population of substantially homogeneous antibodies. A population of substantially homogeneous antibodies comprises antibodies that are substantially similar and that bind the same epitope(s), except for variants that may normally arise during production of the monoclonal antibody. Such variants are generally present in only minor amounts. A monoclonal antibody is typically obtained by a process that includes the selection of a single antibody from a plurality of antibodies. For example, the selection process can be the selection of a unique clone from a plurality of clones, such as a pool of hybridoma clones, phage clones, yeast clones, bacterial clones, or other recombinant DNA clones. The selected antibody can be further altered, for example, to improve affinity for the target (by so-called "affinity maturation"), to humanize the antibody, to improve its production in cell culture, and/or to reduce its immunogenicity in a subject.

The term "humanised antibody" can mean an antibody from a non-human species (e.g. mouse or rabbit) whose protein sequences have been modified to increase their similarity to antibodies produced naturally in humans.

The antibody may be a recombinant antibody. The term "recombinant human antibody" can include a human antibody produced using recombinant DNA technology.

The term "antigen-binding region" can mean a region of the antibody having specific binding affinity for its target antigen, for example, the ZIP12 extracellular epitope comprising or consisting of SEQ ID No: 252 and/or SEQ ID No:1 or a variant or fragment thereof. Preferably, the fragment is an epitope. The antigen-binding region may be a hypervariable CDR or a functional portion thereof. The term "functional portion" of a CDR can mean a sequence within the CDR which shows specific affinity for the target antigen. The functional portion of a CDR may comprise a ligand which specifically binds to the ZIP12 extracellular epitope comprising or consisting of SEQ ID No: 252 and/or SEQ ID No:1 or a variant or fragment thereof.

The term "CDR" can mean a hypervariable region in the heavy and light variable chains. There may be one, two, three or more CDRs in each of the heavy and light chains of the antibody. Normally, there are at least three CDRs on each chain which, when configured together, form the antigen-binding site, i.e. the three-dimensional combining site with which the antigen binds or specifically reacts. It has however been postulated that there may be four CDRs in the heavy chains of some antibodies.

The definition of CDR also includes overlapping or subsets of amino acid residues when compared against each other. The exact residue numbers which encompass a particular CDR or a functional portion thereof will vary depending on the sequence and size of the CDR. Those skilled in the art can routinely determine which residues comprise a particular CDR given the variable region amino acid sequence of the antibody.

The amino acid sequence boundaries of a CDR can be determined by using any of a number of known numbering schemes, including those described by Kabat et al., supra ("Kabat" numbering scheme); Al-Lazikani et al., 1997, *J. Mol. Biol.*, 273:927-948 ("Chothia" numbering scheme); MacCallum et al., 1996, *J. Mol. Biol.* 262:732-745 ("Contact" numbering scheme); Lefranc et al., *Dev. Comp. Immunol.*, 2003, 27:55-77 ("IMGT" numbering scheme); and Honegge and Phückthun, *J. Mol. Biol.*, 2001, 309:657-70 ("AHo" numbering scheme).

The term "functional fragment" of an antibody can mean a portion of the antibody which retains a functional activity. A functional activity can be, for example antigen binding activity or specificity. A functional activity can also be, for example, an effector function provided by an antibody constant region. The term "functional fragment" is also intended to include, for example, fragments produced by protease digestion or reduction of a human monoclonal antibody and by recombinant DNA methods known to those skilled in the art. Human monoclonal antibody functional fragments include, for example individual heavy or light chains and fragments thereof, such as VL, VH and Fd; monovalent fragments, such as Fv, Fab, and Fab'; bivalent fragments such as $F(ab')_2$; single chain Fv (scFv); and Fc fragments.

The term "VL fragment" can mean a fragment of the light chain of a human monoclonal antibody which includes all or part of the light chain variable region, including the CDRs. A VL fragment can further include light chain constant region sequences.

The term "VH fragment" can mean a fragment of the heavy chain of a human monoclonal antibody which includes all or part of the heavy chain variable region, including the CDRs.

The term "Fd fragment" can mean the heavy chain variable region coupled to the first heavy chain constant region, i.e. VH and CH-1. The "Fd fragment" does not include the light chain, or the second and third constant regions of the heavy chain.

The term "Fv fragment" can mean a monovalent antigen-binding fragment of a human monoclonal antibody, including all or part of the variable regions of the heavy and light chains, and absent of the constant regions of the heavy and light chains. The variable regions of the heavy and light chains include, for example, the CDRs. For example, an Fv fragment includes all or part of the amino terminal variable region of about 110 amino acids of both the heavy and light chains.

The term "Fab fragment" can mean a monovalent antigen-binding fragment of a human monoclonal antibody that is larger than an Fv fragment. For example, a Fab fragment includes the variable regions, and all or part of the first constant domain of the heavy and light chains. Thus, a Fab fragment additionally includes, for example, amino acid residues from about 110 to about 220 of the heavy and light chains.

The term "Fab' fragment" can mean a monovalent antigen-binding fragment of a human monoclonal antibody that is larger than a Fab fragment. For example, a Fab' fragment includes all of the light chain, all of the variable region of the heavy chain, and all or part of the first and second constant domains of the heavy chain. For example, a Fab' fragment can additionally include some or all of amino acid residues 220 to 330 of the heavy chain.

The term "$F(ab')_2$ fragment" can mean a bivalent antigen-binding fragment of a human monoclonal antibody. An $F(ab')_2$ fragment includes, for example, all or part of the variable regions of two heavy chains- and two light chains, and can further include all or part of the first constant domains of two heavy chains and two light chains.

The term "single chain Fv (scFv)" can mean a fusion of the variable regions of the heavy (VH) and light chains (VL) connected with a short linker peptide.

The term "bispecific antibody (BsAb)" can mean a bispecific antibody comprising two scFv linked to each other by a shorter linked peptide.

One skilled in the art knows that the exact boundaries of a fragment of an antibody are not important, so long as the fragment maintains a functional activity. Using well-known recombinant methods, one skilled in the art can engineer a polynucleotide sequence to express a functional fragment with any endpoints desired for a particular application. A functional fragment of the antibody may comprise or consist of a fragment with substantially the same heavy and light chain variable regions as the human antibody.

Preferably, the antigen-binding fragment thereof, with respect to the first aspect of the invention, is immunospecific for the ZIP12 extracellular epitope comprising or consisting of SEQ ID No: 252 and/or SEQ ID No:1 or a variant or fragment thereof. The antigen-binding fragment thereof may comprise or consist of any of the fragments selected from a group consisting of VH, VL, Fd, Fv, Fab, Fab', scFv, F(ab')$_2$ and Fc fragment.

The antigen-binding fragment thereof may be a single domain antibody (sdAb), otherwise referred to as a nanobody, which the skilled person would understand is an antibody fragment consisting of a single monomeric variable antibody domain.

The antigen-binding fragment thereof may comprise or consist of any one of the antigen binding region sequences of the VL, any one of the antigen binding region sequences of the VH, or a combination of VL and VH antigen binding regions of a human antibody. The appropriate number and combination of VH and VL antigen binding region sequences may be determined by those skilled in the art depending on the desired affinity and specificity and the intended use of the antigen-binding fragment. Functional fragments or antigen-binding fragments of antibodies may be readily produced and isolated using methods well known to those skilled in the art. Such methods include, for example, proteolytic methods, recombinant methods and chemical synthesis. Proteolytic methods for the isolation of functional fragments comprise using human antibodies as a starting material. Enzymes suitable for proteolysis of human immunoglobulins may include, for example, papain, and pepsin. The appropriate enzyme may be readily chosen by one skilled in the art, depending on, for example, whether monovalent or bivalent fragments are required. For example, papain cleavage results in two monovalent Fab' fragments that bind antigen and an Fc fragment. Pepsin cleavage, for example, results in a bivalent F(ab') fragment. An F(ab')$_2$ fragment of the invention may be further reduced using, for example, DTT or 2-mercaptoethanol to produce two monovalent Fab' fragments.

Functional or antigen-binding fragments of antibodies produced by proteolysis may be purified by affinity and column chromatographic procedures. For example, undigested antibodies and Fc fragments may be removed by binding to protein A. Additionally, functional fragments may be purified by virtue of their charge and size, using, for example, ion exchange and gel filtration chromatography. Such methods are well known to those skilled in the art.

The antibody or antigen-binding fragment thereof may be produced by recombinant methodology. Preferably, one initially isolates a polynucleotide encoding desired regions of the antibody heavy and light chains. Such regions may include, for example, all or part of the variable region of the heavy and light chains. Preferably, such regions can particularly include the antigen binding regions of the heavy and light chains, preferably the antigen binding sites, most preferably the CDRs.

The polynucleotide encoding the antibody or antigen-binding fragment thereof according to the invention may be produced using methods known to those skilled in the art. The polynucleotide encoding the antibody or antigen-binding fragment thereof may be directly synthesized by methods of oligonucleotide synthesis known in the art. Alternatively, smaller fragments may be synthesized and joined to form a larger functional fragment using recombinant methods known in the art.

As used herein, the term "immunospecificity" can mean the binding region of the antibody or antigen-binding fragment thereof is capable of immunoreacting with the ZIP12 extracellular epitope comprising or consisting of SEQ ID No: 252 and/or SEQ ID No:1 or a variant or fragment thereof, by specifically binding therewith. The antibody or antigen-binding fragment thereof can preferably selectively interact with an antigen (i.e. the ZIP12 extracellular epitope comprising or consisting of SEQ ID No: 252 and/or SEQ ID No:1 or a variant or fragment thereof) with an affinity constant of approximately $10^{-5}$ to $10^{-13}$ M$^{-1}$, preferably $10^{-6}$ to $10^{-9}$ M$^{-1}$, even more preferably, $10^{-10}$ to $10^{-12}$ M$^{-1}$. The antibody or antigen-binding fragment thereof preferably does not substantially bind to ZIP4 and/or ZIP13, such that the affinity constant is approximately more than $10^{-10}$ M$^{-1}$, $10^{-9}$ M$^{-1}$, $10^{-8}$ M$^{-1}$, $10^{-7}$ M$^{-1}$, or $10^{-6}$ M$^{-1}$ preferably more than $10^{-5}$ M$^{-1}$, $10^{-4}$M$^{-1}$ or $10^{-3}$M$^{-1}$ and even more preferably $10^{-2}$M$^{-1}$ $10^{-1}$ M$^{-1}$ or $10^{-2}$M$^{-1}$ and most preferably $10^{+1}$M$^{-1}$, $10^{+2}$M$^{-1}$ or $10^{+3}$M$^{-1}$.

The term "immunoreact" can mean the binding region is capable of eliciting an immune response upon binding with the ZIP12 extracellular epitope comprising or consisting of SEQ ID No: 252 and/or SEQ ID No:1 or a variant or fragment thereof.

The term "epitope" can mean any region of an antigen with the ability to elicit, and combine with, a binding region of the antibody or antigen-binding fragment thereof.

Thus, the antibody the antibody or antigen-binding fragment thereof may comprise a heavy chain. The heavy chain may be selected from the group consisting of IgA; IgD; IgE; IgG and IgM. Preferably, the heavy chain is an IgG. Preferably, the heavy chain is an IgA.

The heavy chain may be an IgG1. The heavy chain may be an IgG2. The heavy chain may be an IgG3. The heavy chain may be an IgG4. The heavy chain may be an IgA1. The heavy chain may be an IgA2.

As described in the Examples and as shown in FIG. 1, the inventors have developed an antibody candidate, which binds to an extracellular domain of ZIP12, referred to herein as 51B12, which was able to target and inhibit the function of ZIP12. The six CDR, VH and VL sequences of this so-called "51B12-parent" antibody are summarised in the table shown in FIG. 9a. The inventors then subjected the "51B12-parent" antibody to affinity maturation in order to produce novel variants or mutants.

As described in Example 1, eight or nine mutants per CDR residue in the three heavy and light CDRs were designed. For variable heavy (VH) chain CDR variants, variable regions were synthesized and cloned into an expression vector containing an Fc null human IgG1. For variable light (VL) chain CDR variants, variable regions were synthesized and cloned into an expression vector containing a human kappa light chain constant region.

FIG. 9b shows a table summarising the sequences of 26 different embodiments of affinity matured antibodies derived from the "51B12 parent". The first row in the table represents the corresponding sequences (the six CDRs, VH and VL) for the affinity matured variant of the 51B12 parent referred to as "H3_W99H_L1", in which the CDR-H3 sequence is the same as that of the parent except for a W99H amino acid swap, and the CDR-L1 CDR is as shown. The second row in the table represents the corresponding sequences for the affinity matured variant of the 51B12 parent referred to as "H3_W99H_L2", in which the CDR-H3 sequence is the same as that of the parent except for a W99H amino acid swap, and the CDR-L2 CDR is as shown, and so on.

Each of these affinity matured variants will now be described in terms of their sequences.

H3 W99H_L1

Accordingly, in one embodiment, the antibody or antigen-binding fragment thereof is referred to herein as H3_W99H_L1.

Preferably, the antibody or antigen-binding fragment thereof comprises a CDR-H1 domain comprising or consisting of a sequence as substantially set out in SEQ ID No: 13, or a variant or fragment thereof. Preferably, the antibody or antigen-binding fragment thereof comprises a CDR-H2 domain comprising or consisting of a sequence as substantially set out in SEQ ID No: 14, or a variant or fragment thereof. Preferably, the antibody or antigen-binding fragment thereof comprises a CDR-H3 domain comprising or consisting of a sequence as substantially set out in SEQ ID No: 15, or a variant or fragment thereof.

Preferably, the antibody or antigen-binding fragment thereof comprises a CDR-H1 domain comprising or consisting of SEQ ID No: 13, a CDR-H2 domain comprising or consisting of SEQ ID No: 14 and/or a CDR-H3 domain comprising or consisting of SEQ ID No: 15. Preferably, however, the antibody or antigen-binding fragment thereof comprises a CDR-H1 domain comprising or consisting of SEQ ID No: 13, a CDR-H2 domain comprising or consisting of SEQ ID No: 14 and a CDR-H3 domain comprising or consisting of SEQ ID No: 15.

Preferably, the antibody or antigen-binding fragment thereof comprises a heavy chain variable (VH) region comprising or consisting of a sequence as substantially set out in SEQ ID No: 19, or a variant or fragment thereof.

Preferably, the antibody or antigen-binding fragment thereof comprises a CDR-L1 domain comprising or consisting of a sequence as substantially set out in SEQ ID No: 16, or a variant or fragment thereof. Preferably, the antibody or antigen-binding fragment thereof comprises a CDR-L2 domain comprising or consisting of a sequence as substantially set out in SEQ ID No: 17, or a variant or fragment thereof. Preferably, the antibody or antigen-binding fragment thereof comprises a CDR-L3 domain comprising or consisting of a sequence as substantially set out in SEQ ID No: 18, or a variant or fragment thereof.

Preferably, the antibody or antigen-binding fragment thereof comprises a CDR-L1 domain comprising or consisting of SEQ ID No: 16, a CDR-L2 domain comprising or consisting of SEQ ID No: 17, and/or a CDR-L3 domain comprising or consisting of SEQ ID No: 18. However, preferably the antibody or antigen-binding fragment thereof comprises a CDR-L1 domain comprising or consisting of SEQ ID No: 16, a CDR-L2 domain comprising or consisting of SEQ ID No: 17, and a CDR-L3 domain comprising or consisting of SEQ ID No: 18.

Preferably, the antibody or antigen-binding fragment thereof comprises a light chain variable region (VL) comprising or consisting of a sequence as substantially set out in SEQ ID No: 20, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 13, a CDR-H2 domain comprising or consisting of SEQ ID No: 14, a CDR-H3 domain comprising or consisting of SEQ ID No: 15, a CDR-L1 domain comprising or consisting of SEQ ID No: 16, a CDR-L2 domain comprising or consisting of SEQ ID No: 17, and a CDR-L3 domain comprising or consisting of SEQ ID No: 18.

Preferably, the antibody or antigen-binding fragment thereof comprises a heavy chain variable region comprising or consisting of SEQ ID No: 19 and a light chain variable region comprising or consisting of SEQ ID No: 20.

H3_W99H_L2

In one embodiment, the antibody or antigen-binding fragment thereof is referred to herein as H3_W99H_L2.

Preferably, the antibody or antigen-binding fragment thereof comprises a CDR-H1 domain comprising or consisting of a sequence as substantially set out in SEQ ID No: 21, or a variant or fragment thereof. Preferably, the antibody or antigen-binding fragment thereof comprises a CDR-H2 domain comprising or consisting of a sequence as substantially set out in SEQ ID No: 22, or a variant or fragment thereof. Preferably, the antibody or antigen-binding fragment thereof comprises a CDR-H3 domain comprising or consisting of a sequence as substantially set out in SEQ ID No: 23, or a variant or fragment thereof.

Preferably, the antibody or antigen-binding fragment thereof comprises a CDR-H1 domain comprising or consisting of SEQ ID No: 21, a CDR-H2 domain comprising or consisting of SEQ ID No: 22 and/or a CDR-H3 domain comprising or consisting of SEQ ID No: 23. Preferably, however, the antibody or antigen-binding fragment thereof comprises a CDR-H1 domain comprising or consisting of SEQ ID No: 21, a CDR-H2 domain comprising or consisting of SEQ ID No: 22 and a CDR-H3 domain comprising or consisting of SEQ ID No: 23.

Preferably, the antibody or antigen-binding fragment thereof comprises a heavy chain variable (VH) region comprising or consisting of a sequence as substantially set out in SEQ ID No: 27, or a variant or fragment thereof.

Preferably, the antibody or antigen-binding fragment thereof comprises a CDR-L1 domain comprising or consisting of a sequence as substantially set out in SEQ ID No: 24, or a variant or fragment thereof. Preferably, the antibody or antigen-binding fragment thereof comprises a CDR-L2 domain comprising or consisting of a sequence as substantially set out in SEQ ID No: 25, or a variant or fragment thereof. Preferably, the antibody or antigen-binding fragment thereof comprises a CDR-L3 domain comprising or consisting of a sequence as substantially set out in SEQ ID No: 26, or a variant or fragment thereof.

Preferably, the antibody or antigen-binding fragment thereof comprises a CDR-L1 domain comprising or consisting of SEQ ID No: 24, a CDR-L2 domain comprising or consisting of SEQ ID No: 25, and/or a CDR-L3 domain comprising or consisting of SEQ ID No: 26. However, preferably the antibody or antigen-binding fragment thereof comprises a CDR-L1 domain comprising or consisting of SEQ ID No: 24, a CDR-L2 domain comprising or consisting of SEQ ID No: 25, and a CDR-L3 domain comprising or consisting of SEQ ID No: 26.

Preferably, the antibody or antigen-binding fragment thereof comprises a light chain variable (VL) region comprising or consisting of a sequence as substantially set out in SEQ ID No: 28, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 21, a CDR-H2 domain comprising or consisting of SEQ ID No: 22, a CDR-H3 domain comprising or consisting of SEQ ID No: 23, a CDR-L1 domain comprising or consisting of SEQ ID No: 24, a CDR-L2 domain comprising or consisting of SEQ ID No: 25, and a CDR-L3 domain comprising or consisting of SEQ ID No: 26.

Preferably, the antibody or antigen-binding fragment thereof comprises a heavy chain variable region comprising or consisting of SEQ ID No: 27 and a light chain variable region comprising or consisting of SEQ ID No: 28.

H3_W99H_VL-par

In one embodiment, the antibody or antigen-binding fragment thereof is referred to herein as H3_W99H_VL-par.

Preferably, the antibody or antigen-binding fragment thereof comprises a CDR-H1 domain comprising or consisting of a sequence as substantially set out in SEQ ID No: 29, or a variant or fragment thereof. Preferably, the antibody or antigen-binding fragment thereof comprises a CDR-H2 domain comprising or consisting of a sequence as substantially set out in SEQ ID No: 30, or a variant or fragment thereof. Preferably, the antibody or antigen-binding fragment thereof comprises a CDR-H3 domain comprising or consisting of a sequence as substantially set out in SEQ ID No: 31, or a variant or fragment thereof.

Preferably, the antibody or antigen-binding fragment thereof comprises a CDR-H1 domain comprising or consisting of SEQ ID No: 29, a CDR-H2 domain comprising or consisting of SEQ ID No: 30 and/or a CDR-H3 domain comprising or consisting of SEQ ID No: 31. Preferably, however, the antibody or antigen-binding fragment thereof comprises a CDR-H1 domain comprising or consisting of SEQ ID No: 29, a CDR-H2 domain comprising or consisting of SEQ ID No: 30 and a CDR-H3 domain comprising or consisting of SEQ ID No: 31.

Preferably, the antibody or antigen-binding fragment thereof comprises a heavy chain variable (VH) region comprising or consisting of a sequence as substantially set out in SEQ ID No: 35, or a variant or fragment thereof.

Preferably, the antibody or antigen-binding fragment thereof comprises a CDR-L1 domain comprising or consisting of a sequence as substantially set out in SEQ ID No: 32, or a variant or fragment thereof. Preferably, the antibody or antigen-binding fragment thereof comprises a CDR-L2 domain comprising or consisting of a sequence as substantially set out in SEQ ID No: 33, or a variant or fragment thereof. Preferably, the antibody or antigen-binding fragment thereof comprises a CDR-L3 domain comprising or consisting of a sequence as substantially set out in SEQ ID No: 34, or a variant or fragment thereof.

Preferably, the antibody or antigen-binding fragment thereof comprises a CDR-L1 domain comprising or consisting of SEQ ID No: 32, a CDR-L2 domain comprising or consisting of SEQ ID No: 33, and/or a CDR-L3 domain comprising or consisting of SEQ ID No: 34. However, preferably the antibody or antigen-binding fragment thereof comprises a CDR-L1 domain comprising or consisting of SEQ ID No: 32, a CDR-L2 domain comprising or consisting of SEQ ID No: 33, and a CDR-L3 domain comprising or consisting of SEQ ID No: 34.

Preferably, the antibody or antigen-binding fragment thereof comprises a light chain variable (VL) region comprising or consisting of a sequence as substantially set out in SEQ ID No: 36, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 29, a CDR-H2 domain comprising or consisting of SEQ ID No: 30, a CDR-H3 domain comprising or consisting of SEQ ID No: 31, a CDR-L1 domain comprising or consisting of SEQ ID No: 32, a CDR-L2 domain comprising or consisting of SEQ ID No: 33, and a CDR-L3 domain comprising or consisting of SEQ ID No: 34.

Preferably, the antibody or antigen-binding fragment thereof comprises a heavy chain variable region comprising or consisting of SEQ ID No: 35 and a light chain variable region comprising or consisting of SEQ ID No: 36.

H2_T56H_L1

In one embodiment, the antibody or antigen-binding fragment thereof is referred to herein as H2_T56H_L1.

Preferably, the antibody or antigen-binding fragment thereof comprises a CDR-H1 domain comprising or consisting of a sequence as substantially set out in SEQ ID No: 37, or a variant or fragment thereof. Preferably, the antibody or antigen-binding fragment thereof comprises a CDR-H2 domain comprising or consisting of a sequence as substantially set out in SEQ ID No: 38, or a variant or fragment thereof. Preferably, the antibody or antigen-binding fragment thereof comprises a CDR-H3 domain comprising or consisting of a sequence as substantially set out in SEQ ID No: 39, or a variant or fragment thereof.

Preferably, the antibody or antigen-binding fragment thereof comprises a CDR-H1 domain comprising or consisting of SEQ ID No: 37, a CDR-H2 domain comprising or consisting of SEQ ID No: 38 and/or a CDR-H3 domain comprising or consisting of SEQ ID No: 39. Preferably, however, the antibody or antigen-binding fragment thereof comprises a CDR-H1 domain comprising or consisting of SEQ ID No: 37, a CDR-H2 domain comprising or consisting of SEQ ID No: 38 and a CDR-H3 domain comprising or consisting of SEQ ID No: 39.

Preferably, the antibody or antigen-binding fragment thereof comprises a heavy chain variable (VH) region comprising or consisting of a sequence as substantially set out in SEQ ID No: 43, or a variant or fragment thereof.

Preferably, the antibody or antigen-binding fragment thereof comprises a CDR-L1 domain comprising or consisting of a sequence as substantially set out in SEQ ID No: 40, or a variant or fragment thereof. Preferably, the antibody or antigen-binding fragment thereof comprises a CDR-L2 domain comprising or consisting of a sequence as substantially set out in SEQ ID No: 41, or a variant or fragment thereof. Preferably, the antibody or antigen-binding fragment thereof comprises a CDR-L3 domain comprising or consisting of a sequence as substantially set out in SEQ ID No: 42, or a variant or fragment thereof.

Preferably, the antibody or antigen-binding fragment thereof comprises a CDR-L1 domain comprising or consisting of SEQ ID No: 40, a CDR-L2 domain comprising or consisting of SEQ ID No: 41, and/or a CDR-L3 domain comprising or consisting of SEQ ID No: 42. However, preferably the antibody or antigen-binding fragment thereof comprises a CDR-L1 domain comprising or consisting of SEQ ID No: 40, a CDR-L2 domain comprising or consisting of SEQ ID No: 41, and a CDR-L3 domain comprising or consisting of SEQ ID No: 42.

Preferably, the antibody or antigen-binding fragment thereof comprises a light chain variable (VL) region comprising or consisting of a sequence as substantially set out in SEQ ID No: 44, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 37, a CDR-H2 domain comprising or consisting of SEQ ID No: 38, a CDR-H3 domain comprising or consisting of SEQ ID No: 39, a CDR-L1 domain comprising or consisting of SEQ ID No: 40, a CDR-L2 domain comprising or consisting of SEQ ID No: 41, and a CDR-L3 domain comprising or consisting of SEQ ID No: 42.

Preferably, the antibody or antigen-binding fragment thereof comprises a heavy chain variable region comprising or consisting of SEQ ID No: 43 and a light chain variable region comprising or consisting of SEQ ID No: 44.

H2_T57H_L1

In one embodiment, the antibody or antigen-binding fragment thereof is referred to herein as H2_T57H_L1.

Preferably, the antibody or antigen-binding fragment thereof comprises a CDR-H1 domain comprising or consisting of a sequence as substantially set out in SEQ ID No: 45, or a variant or fragment thereof. Preferably, the antibody or antigen-binding fragment thereof comprises a CDR-H2 domain comprising or consisting of a sequence as substantially set out in SEQ ID No: 46, or a variant or fragment thereof. Preferably, the antibody or antigen-binding fragment thereof comprises a CDR-H3 domain comprising or consisting of a sequence as substantially set out in SEQ ID No: 47, or a variant or fragment thereof.

Preferably, the antibody or antigen-binding fragment thereof comprises a CDR-H1 domain comprising or consisting of SEQ ID No: 45, a CDR-H2 domain comprising or consisting of SEQ ID No: 46 and/or a CDR-H3 domain comprising or consisting of SEQ ID No: 47. Preferably, however, the antibody or antigen-binding fragment thereof comprises a CDR-H1 domain comprising or consisting of SEQ ID No: 45, a CDR-H2 domain comprising or consisting of SEQ ID No: 46 and a CDR-H3 domain comprising or consisting of SEQ ID No: 47.

Preferably, the antibody or antigen-binding fragment thereof comprises a heavy chain variable (VH) region comprising or consisting of a sequence as substantially set out in SEQ ID No: 51, or a variant or fragment thereof.

Preferably, the antibody or antigen-binding fragment thereof comprises a CDR-L1 domain comprising or consisting of a sequence as substantially set out in SEQ ID No: 48, or a variant or fragment thereof. Preferably, the antibody or antigen-binding fragment thereof comprises a CDR-L2 domain comprising or consisting of a sequence as substantially set out in SEQ ID No: 49, or a variant or fragment thereof. Preferably, the antibody or antigen-binding fragment thereof comprises a CDR-L3 domain comprising or consisting of a sequence as substantially set out in SEQ ID No: 50, or a variant or fragment thereof.

Preferably, the antibody or antigen-binding fragment thereof comprises a CDR-L1 domain comprising or consisting of SEQ ID No: 48, a CDR-L2 domain comprising or consisting of SEQ ID No: 49, and/or a CDR-L3 domain comprising or consisting of SEQ ID No: 50. However, preferably the antibody or antigen-binding fragment thereof comprises a CDR-L1 domain comprising or consisting of SEQ ID No: 48, a CDR-L2 domain comprising or consisting of SEQ ID No: 49, and a CDR-L3 domain comprising or consisting of SEQ ID No: 50.

Preferably, the antibody or antigen-binding fragment thereof comprises a light chain variable (VL) region comprising or consisting of a sequence as substantially set out in SEQ ID No: 52, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 45, a CDR-H2 domain comprising or consisting of SEQ ID No: 46, a CDR-H3 domain comprising or consisting of SEQ ID No: 47, a CDR-L1 domain comprising or consisting of SEQ ID No: 48, a CDR-L2 domain comprising or consisting of SEQ ID No: 49, and a CDR-L3 domain comprising or consisting of SEQ ID No: 50.

Preferably, the antibody or antigen-binding fragment thereof comprises a heavy chain variable region comprising or consisting of SEQ ID No: 51 and a light chain variable region comprising or consisting of SEQ ID No: 52.

H2_Y60K_L1

In one embodiment, the antibody or antigen-binding fragment thereof is referred to herein as H2_Y60K_L1.

Preferably, the antibody or antigen-binding fragment thereof comprises a CDR-H1 domain comprising or consisting of a sequence as substantially set out in SEQ ID No: 53, or a variant or fragment thereof. Preferably, the antibody or antigen-binding fragment thereof comprises a CDR-H2 domain comprising or consisting of a sequence as substantially set out in SEQ ID No: 54, or a variant or fragment thereof. Preferably, the antibody or antigen-binding fragment thereof comprises a CDR-H3 domain comprising or consisting of a sequence as substantially set out in SEQ ID No: 55, or a variant or fragment thereof.

Preferably, the antibody or antigen-binding fragment thereof comprises a CDR-H1 domain comprising or consisting of SEQ ID No: 53, a CDR-H2 domain comprising or consisting of SEQ ID No: 54 and/or a CDR-H3 domain comprising or consisting of SEQ ID No: 55. Preferably, however, the antibody or antigen-binding fragment thereof comprises a CDR-H1 domain comprising or consisting of SEQ ID No: 53, a CDR-H2 domain comprising or consisting of SEQ ID No: 54 and a CDR-H3 domain comprising or consisting of SEQ ID No: 55.

Preferably, the antibody or antigen-binding fragment thereof comprises a heavy chain variable (VH) region comprising or consisting of a sequence as substantially set out in SEQ ID No: 59, or a variant or fragment thereof.

Preferably, the antibody or antigen-binding fragment thereof comprises a CDR-L1 domain comprising or consisting of a sequence as substantially set out in SEQ ID No: 56, or a variant or fragment thereof. Preferably, the antibody or antigen-binding fragment thereof comprises a CDR-L2 domain comprising or consisting of a sequence as substantially set out in SEQ ID No: 57, or a variant or fragment thereof. Preferably, the antibody or antigen-binding fragment thereof comprises a CDR-L3 domain comprising or consisting of a sequence as substantially set out in SEQ ID No: 58, or a variant or fragment thereof.

Preferably, the antibody or antigen-binding fragment thereof comprises a CDR-L1 domain comprising or consisting of SEQ ID No: 56, a CDR-L2 domain comprising or consisting of SEQ ID No: 57, and/or a CDR-L3 domain comprising or consisting of SEQ ID No: 58. However, preferably the antibody or antigen-binding fragment thereof comprises a CDR-L1 domain comprising or consisting of SEQ ID No: 56, a CDR-L2 domain comprising or consisting of SEQ ID No: 57, and a CDR-L3 domain comprising or consisting of SEQ ID No: 58.

Preferably, the antibody or antigen-binding fragment thereof comprises a light chain variable (VL) region comprising or consisting of a sequence as substantially set out in SEQ ID No: 60, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 53, a CDR-H2 domain comprising or consisting of SEQ ID No: 54, a CDR-H3 domain comprising or consisting of SEQ ID No: 55, a CDR-L1 domain comprising or consisting of SEQ ID No: 56, a CDR-L2 domain comprising or consisting of SEQ ID No: 57, and a CDR-L3 domain comprising or consisting of SEQ ID No: 58.

Preferably, the antibody or antigen-binding fragment thereof comprises a heavy chain variable region comprising or consisting of SEQ ID No: 59 and a light chain variable region comprising or consisting of SEQ ID No: 60.

H2_T63Y_L1

In one embodiment, the antibody or antigen-binding fragment thereof is referred to herein as H2_T63Y_L1.

Preferably, the antibody or antigen-binding fragment thereof comprises a CDR-H1 domain comprising or consisting of a sequence as substantially set out in SEQ ID No: 61, or a variant or fragment thereof. Preferably, the antibody or antigen-binding fragment thereof comprises a CDR-H2 domain comprising or consisting of a sequence as substantially set out in SEQ ID No: 62, or a variant or fragment thereof. Preferably, the antibody or antigen-binding fragment thereof comprises a CDR-H3 domain comprising or consisting of a sequence as substantially set out in SEQ ID No: 63, or a variant or fragment thereof.

Preferably, the antibody or antigen-binding fragment thereof comprises a CDR-H1 domain comprising or consisting of SEQ ID No: 61, a CDR-H2 domain comprising or consisting of SEQ ID No: 62 and/or a CDR-H3 domain comprising or consisting of SEQ ID No: 63. Preferably, however, the antibody or antigen-binding fragment thereof comprises a CDR-H1 domain comprising or consisting of SEQ ID No: 61, a CDR-H2 domain comprising or consisting of SEQ ID No: 62 and a CDR-H3 domain comprising or consisting of SEQ ID No: 63.

Preferably, the antibody or antigen-binding fragment thereof comprises a heavy chain variable (VH) region comprising or consisting of a sequence as substantially set out in SEQ ID No: 67, or a variant or fragment thereof.

Preferably, the antibody or antigen-binding fragment thereof comprises a CDR-L1 domain comprising or consisting of a sequence as substantially set out in SEQ ID No: 64, or a variant or fragment thereof. Preferably, the antibody or antigen-binding fragment thereof comprises a CDR-L2 domain comprising or consisting of a sequence as substantially set out in SEQ ID No: 65, or a variant or fragment thereof. Preferably, the antibody or antigen-binding fragment thereof comprises a CDR-L3 domain comprising or consisting of a sequence as substantially set out in SEQ ID No: 66, or a variant or fragment thereof.

Preferably, the antibody or antigen-binding fragment thereof comprises a CDR-L1 domain comprising or consisting of SEQ ID No: 64, a CDR-L2 domain comprising or consisting of SEQ ID No: 65, and/or a CDR-L3 domain comprising or consisting of SEQ ID No: 66. However, preferably the antibody or antigen-binding fragment thereof comprises a CDR-L1 domain comprising or consisting of SEQ ID No: 64, a CDR-L2 domain comprising or consisting of SEQ ID No: 65, and a CDR-L3 domain comprising or consisting of SEQ ID No: 66.

Preferably, the antibody or antigen-binding fragment thereof comprises a light chain variable (VL) region comprising or consisting of a sequence as substantially set out in SEQ ID No: 68, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 61, a CDR-H2 domain comprising or consisting of SEQ ID No: 62, a CDR-H3 domain comprising or consisting of SEQ ID No: 63, a CDR-L1 domain comprising or consisting of SEQ ID No: 64, a CDR-L2 domain comprising or consisting of SEQ ID No: 65, and a CDR-L3 domain comprising or consisting of SEQ ID No: 66.

Preferably, the antibody or antigen-binding fragment thereof comprises a heavy chain variable region comprising or consisting of SEQ ID No: 67 and a light chain variable region comprising or consisting of SEQ ID No: 68.

H2_K65P_L1

In one embodiment, the antibody or antigen-binding fragment thereof is referred to herein as H2_K65P_L1.

Preferably, the antibody or antigen-binding fragment thereof comprises a CDR-H1 domain comprising or consisting of a sequence as substantially set out in SEQ ID No: 69, or a variant or fragment thereof. Preferably, the antibody or antigen-binding fragment thereof comprises a CDR-H2 domain comprising or consisting of a sequence as substantially set out in SEQ ID No: 70, or a variant or fragment thereof. Preferably, the antibody or antigen-binding fragment thereof comprises a CDR-H3 domain comprising or consisting of a sequence as substantially set out in SEQ ID No: 71, or a variant or fragment thereof.

Preferably, the antibody or antigen-binding fragment thereof comprises a CDR-H1 domain comprising or consisting of SEQ ID No: 69, a CDR-H2 domain comprising or consisting of SEQ ID No: 70 and/or a CDR-H3 domain comprising or consisting of SEQ ID No: 71. Preferably, however, the antibody or antigen-binding fragment thereof comprises a CDR-H1 domain comprising or consisting of SEQ ID No: 69, a CDR-H2 domain comprising or consisting of SEQ ID No: 70 and a CDR-H3 domain comprising or consisting of SEQ ID No: 71.

Preferably, the antibody or antigen-binding fragment thereof comprises a heavy chain variable (VH) region comprising or consisting of a sequence as substantially set out in SEQ ID No: 75, or a variant or fragment thereof.

Preferably, the antibody or antigen-binding fragment thereof comprises a CDR-L1 domain comprising or consisting of a sequence as substantially set out in SEQ ID No: 72, or a variant or fragment thereof. Preferably, the antibody or antigen-binding fragment thereof comprises a CDR-L2 domain comprising or consisting of a sequence as substantially set out in SEQ ID No: 73, or a variant or fragment thereof. Preferably, the antibody or antigen-binding fragment thereof comprises a CDR-L3 domain comprising or consisting of a sequence as substantially set out in SEQ ID No: 74, or a variant or fragment thereof.

Preferably, the antibody or antigen-binding fragment thereof comprises a CDR-L1 domain comprising or consisting of SEQ ID No: 72, a CDR-L2 domain comprising or consisting of SEQ ID No: 73, and/or a CDR-L3 domain comprising or consisting of SEQ ID No: 74. However, preferably the antibody or antigen-binding fragment thereof comprises a CDR-L1 domain comprising or consisting of SEQ ID No: 72, a CDR-L2 domain comprising or consisting of SEQ ID No: 73, and a CDR-L3 domain comprising or consisting of SEQ ID No: 74.

Preferably, the antibody or antigen-binding fragment thereof comprises a light chain variable (VL) region comprising or consisting of a sequence as substantially set out in SEQ ID No: 76, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 69, a CDR-H2 domain comprising or consisting of SEQ ID No: 70, a CDR-H3 domain comprising or consisting of SEQ ID No: 71, a CDR-L1 domain comprising or consisting of SEQ ID No: 72, a CDR-L2 domain comprising or consisting of SEQ ID No: 73, and a CDR-L3 domain comprising or consisting of SEQ ID No: 74.

Preferably, the antibody or antigen-binding fragment thereof comprises a heavy chain variable region comprising or consisting of SEQ ID No: 75 and a light chain variable region comprising or consisting of SEQ ID No: 76.

H2_G66Q_L1

In one embodiment, the antibody or antigen-binding fragment thereof is referred to herein as H2_G66Q_L1.

Preferably, the antibody or antigen-binding fragment thereof comprises a CDR-H1 domain comprising or consisting of a sequence as substantially set out in SEQ ID No: 77, or a variant or fragment thereof. Preferably, the antibody or antigen-binding fragment thereof comprises a CDR-H2 domain comprising or consisting of a sequence as substantially set out in SEQ ID No: 78, or a variant or fragment thereof. Preferably, the antibody or antigen-binding fragment thereof comprises a CDR-H3 domain comprising or consisting of a sequence as substantially set out in SEQ ID No: 79, or a variant or fragment thereof.

Preferably, the antibody or antigen-binding fragment thereof comprises a CDR-H1 domain comprising or consisting of SEQ ID No: 77, a CDR-H2 domain comprising or consisting of SEQ ID No: 78 and/or a CDR-H3 domain comprising or consisting of SEQ ID No: 79. Preferably, however, the antibody or antigen-binding fragment thereof comprises a CDR-H1 domain comprising or consisting of SEQ ID No: 77, a CDR-H2 domain comprising or consisting of SEQ ID No: 78 and a CDR-H3 domain comprising or consisting of SEQ ID No: 79.

Preferably, the antibody or antigen-binding fragment thereof comprises a heavy chain variable (VH) region comprising or consisting of a sequence as substantially set out in SEQ ID No: 83, or a variant or fragment thereof.

Preferably, the antibody or antigen-binding fragment thereof comprises a CDR-L1 domain comprising or consisting of a sequence as substantially set out in SEQ ID No: 80, or a variant or fragment thereof. Preferably, the antibody or antigen-binding fragment thereof comprises a CDR-L2 domain comprising or consisting of a sequence as substantially set out in SEQ ID No: 81, or a variant or fragment thereof. Preferably, the antibody or antigen-binding fragment thereof comprises a CDR-L3 domain comprising or consisting of a sequence as substantially set out in SEQ ID No: 82, or a variant or fragment thereof.

Preferably, the antibody or antigen-binding fragment thereof comprises a CDR-L1 domain comprising or consisting of SEQ ID No: 80, a CDR-L2 domain comprising or consisting of SEQ ID No: 81, and/or a CDR-L3 domain comprising or consisting of SEQ ID No: 82. However, preferably the antibody or antigen-binding fragment thereof comprises a CDR-L1 domain comprising or consisting of SEQ ID No: 80, a CDR-L2 domain comprising or consisting of SEQ ID No: 81, and a CDR-L3 domain comprising or consisting of SEQ ID No: 82.

Preferably, the antibody or antigen-binding fragment thereof comprises a light chain variable (VL) region comprising or consisting of a sequence as substantially set out in SEQ ID No: 84, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 77, a CDR-H2 domain comprising or consisting of SEQ ID No: 78, a CDR-H3 domain comprising or consisting of SEQ ID No: 79, a CDR-L1 domain comprising or consisting of SEQ ID No: 80, a CDR-L2 domain comprising or consisting of SEQ ID No: 81, and a CDR-L3 domain comprising or consisting of SEQ ID No: 82.

Preferably, the antibody or antigen-binding fragment thereof comprises a heavy chain variable region comprising or consisting of SEQ ID No: 83 and a light chain variable region comprising or consisting of SEQ ID No: 84.

H3 M105P_L1

In one embodiment, the antibody or antigen-binding fragment thereof is referred to herein as H3_M105P_L1.

Preferably, the antibody or antigen-binding fragment thereof comprises a CDR-H1 domain comprising or consisting of a sequence as substantially set out in SEQ ID No: 85, or a variant or fragment thereof. Preferably, the antibody or antigen-binding fragment thereof comprises a CDR-H2 domain comprising or consisting of a sequence as substantially set out in SEQ ID No: 86, or a variant or fragment thereof. Preferably, the antibody or antigen-binding fragment thereof comprises a CDR-H3 domain comprising or consisting of a sequence as substantially set out in SEQ ID No: 87, or a variant or fragment thereof.

Preferably, the antibody or antigen-binding fragment thereof comprises a CDR-H1 domain comprising or consisting of SEQ ID No: 85, a CDR-H2 domain comprising or consisting of SEQ ID No: 86 and/or a CDR-H3 domain comprising or consisting of SEQ ID No: 87. Preferably, however, the antibody or antigen-binding fragment thereof comprises a CDR-H1 domain comprising or consisting of SEQ ID No: 85, a CDR-H2 domain comprising or consisting of SEQ ID No: 86 and a CDR-H3 domain comprising or consisting of SEQ ID No: 87.

Preferably, the antibody or antigen-binding fragment thereof comprises a heavy chain variable (VH) region comprising or consisting of a sequence as substantially set out in SEQ ID No: 91, or a variant or fragment thereof.

Preferably, the antibody or antigen-binding fragment thereof comprises a CDR-L1 domain comprising or consisting of a sequence as substantially set out in SEQ ID No: 88, or a variant or fragment thereof. Preferably, the antibody or antigen-binding fragment thereof comprises a CDR-L2 domain comprising or consisting of a sequence as substantially set out in SEQ ID No: 89, or a variant or fragment thereof. Preferably, the antibody or antigen-binding fragment thereof comprises a CDR-L3 domain comprising or consisting of a sequence as substantially set out in SEQ ID No: 90, or a variant or fragment thereof.

Preferably, the antibody or antigen-binding fragment thereof comprises a CDR-L1 domain comprising or consisting of SEQ ID No: 88, a CDR-L2 domain comprising or consisting of SEQ ID No: 89, and/or a CDR-L3 domain comprising or consisting of SEQ ID No: 90. However, preferably the antibody or antigen-binding fragment thereof comprises a CDR-L1 domain comprising or consisting of SEQ ID No: 88, a CDR-L2 domain comprising or consisting of SEQ ID No: 89, and a CDR-L3 domain comprising or consisting of SEQ ID No: 90.

Preferably, the antibody or antigen-binding fragment thereof comprises a light chain variable (VL) region comprising or consisting of a sequence as substantially set out in SEQ ID No: 92, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 85, a CDR-H2 domain comprising or consisting of SEQ ID No: 86, a CDR-H3 domain comprising or consisting of SEQ ID No: 87, a CDR-L1 domain comprising or consisting of SEQ ID No: 88, a CDR-L2 domain comprising or consisting of SEQ ID No: 89, and a CDR-L3 domain comprising or consisting of SEQ ID No: 90.

Preferably, the antibody or antigen-binding fragment thereof comprises a heavy chain variable region comprising or consisting of SEQ ID No: 91 and a light chain variable region comprising or consisting of SEQ ID No: 92.

51B12 VH_L1

In one embodiment, the antibody or antigen-binding fragment thereof is referred to herein as 51B12_VH_L1.

Preferably, the antibody or antigen-binding fragment thereof comprises a CDR-H1 domain comprising or consisting of a sequence as substantially set out in SEQ ID No: 93, or a variant or fragment thereof. Preferably, the antibody or antigen-binding fragment thereof comprises a CDR-H2 domain comprising or consisting of a sequence as substantially set out in SEQ ID No: 94, or a variant or fragment thereof. Preferably, the antibody or antigen-binding fragment thereof comprises a CDR-H3 domain comprising or consisting of a sequence as substantially set out in SEQ ID No: 95, or a variant or fragment thereof.

Preferably, the antibody or antigen-binding fragment thereof comprises a CDR-H1 domain comprising or consisting of SEQ ID No: 93, a CDR-H2 domain comprising or consisting of SEQ ID No: 94 and/or a CDR-H3 domain comprising or consisting of SEQ ID No: 95. Preferably, however, the antibody or antigen-binding fragment thereof comprises a CDR-H1 domain comprising or consisting of SEQ ID No: 93, a CDR-H2 domain comprising or consisting of SEQ ID No: 94 and a CDR-H3 domain comprising or consisting of SEQ ID No: 95.

Preferably, the antibody or antigen-binding fragment thereof comprises a heavy chain variable (VH) region comprising or consisting of a sequence as substantially set out in SEQ ID No: 99, or a variant or fragment thereof.

Preferably, the antibody or antigen-binding fragment thereof comprises a CDR-L1 domain comprising or consisting of a sequence as substantially set out in SEQ ID No: 96, or a variant or fragment thereof. Preferably, the antibody or antigen-binding fragment thereof comprises a CDR-L2 domain comprising or consisting of a sequence as substantially set out in SEQ ID No: 97, or a variant or fragment thereof. Preferably, the antibody or antigen-binding fragment thereof comprises a CDR-L3 domain comprising or consisting of a sequence as substantially set out in SEQ ID No: 98, or a variant or fragment thereof.

Preferably, the antibody or antigen-binding fragment thereof comprises a CDR-L1 domain comprising or consisting of SEQ ID No: 96, a CDR-L2 domain comprising or consisting of SEQ ID No: 97, and/or a CDR-L3 domain comprising or consisting of SEQ ID No: 98. However, preferably the antibody or antigen-binding fragment thereof comprises a CDR-L1 domain comprising or consisting of SEQ ID No: 96, a CDR-L2 domain comprising or consisting of SEQ ID No: 97, and a CDR-L3 domain comprising or consisting of SEQ ID No: 98.

Preferably, the antibody or antigen-binding fragment thereof comprises a light chain variable (VL) region comprising or consisting of a sequence as substantially set out in SEQ ID No: 100, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 93, a CDR-H2 domain comprising or consisting of SEQ ID No: 94, a CDR-H3 domain comprising or consisting of SEQ ID No: 95, a CDR-L1 domain comprising or consisting of SEQ ID No: 96, a CDR-L2 domain comprising or consisting of SEQ ID No: 97, and a CDR-L3 domain comprising or consisting of SEQ ID No: 98.

Preferably, the antibody or antigen-binding fragment thereof comprises a heavy chain variable region comprising or consisting of SEQ ID No: 99 and a light chain variable region comprising or consisting of SEQ ID No: 100.

H2_T56H_L2

In one embodiment, the antibody or antigen-binding fragment thereof is referred to herein as H2_T56H_L2.

Preferably, the antibody or antigen-binding fragment thereof comprises a CDR-H1 domain comprising or consisting of a sequence as substantially set out in SEQ ID No: 101, or a variant or fragment thereof. Preferably, the antibody or antigen-binding fragment thereof comprises a CDR-H2 domain comprising or consisting of a sequence as substantially set out in SEQ ID No: 102, or a variant or fragment thereof. Preferably, the antibody or antigen-binding fragment thereof comprises a CDR-H3 domain comprising or consisting of a sequence as substantially set out in SEQ ID No: 103, or a variant or fragment thereof.

Preferably, the antibody or antigen-binding fragment thereof comprises a CDR-H1 domain comprising or consisting of SEQ ID No: 101, a CDR-H2 domain comprising or consisting of SEQ ID No: 102 and/or a CDR-H3 domain comprising or consisting of SEQ ID No: 103. Preferably, however, the antibody or antigen-binding fragment thereof comprises a CDR-H1 domain comprising or consisting of SEQ ID No: 101, a CDR-H2 domain comprising or consisting of SEQ ID No: 102 and a CDR-H3 domain comprising or consisting of SEQ ID No: 103.

Preferably, the antibody or antigen-binding fragment thereof comprises a heavy chain variable (VH) region comprising or consisting of a sequence as substantially set out in SEQ ID No: 107, or a variant or fragment thereof.

Preferably, the antibody or antigen-binding fragment thereof comprises a CDR-L1 domain comprising or consisting of a sequence as substantially set out in SEQ ID No: 104, or a variant or fragment thereof. Preferably, the antibody or antigen-binding fragment thereof comprises a CDR-L2 domain comprising or consisting of a sequence as substantially set out in SEQ ID No: 105, or a variant or fragment thereof. Preferably, the antibody or antigen-binding fragment thereof comprises a CDR-L3 domain comprising or consisting of a sequence as substantially set out in SEQ ID No: 106, or a variant or fragment thereof.

Preferably, the antibody or antigen-binding fragment thereof comprises a CDR-L1 domain comprising or consisting of SEQ ID No: 104, a CDR-L2 domain comprising or consisting of SEQ ID No: 105, and/or a CDR-L3 domain comprising or consisting of SEQ ID No: 106. However, preferably the antibody or antigen-binding fragment thereof comprises a CDR-L1 domain comprising or consisting of SEQ ID No: 104, a CDR-L2 domain comprising or consisting of SEQ ID No: 105, and a CDR-L3 domain comprising or consisting of SEQ ID No: 106.

Preferably, the antibody or antigen-binding fragment thereof comprises a light chain variable (VL) region comprising or consisting of a sequence as substantially set out in SEQ ID No: 108, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 101, a CDR-H2 domain comprising or consisting of SEQ ID No: 102, a CDR-H3 domain comprising or consisting of SEQ ID No: 103, a CDR-L1 domain comprising or consisting of SEQ ID No: 104, a CDR-L2 domain comprising or consisting of SEQ ID No: 105, and a CDR-L3 domain comprising or consisting of SEQ ID No: 106.

Preferably, the antibody or antigen-binding fragment thereof comprises a heavy chain variable region comprising or consisting of SEQ ID No: 107 and a light chain variable region comprising or consisting of SEQ ID No: 108.

H2_T57H_L2

In one embodiment, the antibody or antigen-binding fragment thereof is referred to herein as H2_T57H_L2.

Preferably, the antibody or antigen-binding fragment thereof comprises a CDR-H1 domain comprising or consisting of a sequence as substantially set out in SEQ ID No: 109, or a variant or fragment thereof. Preferably, the antibody or antigen-binding fragment thereof comprises a CDR-H2 domain comprising or consisting of a sequence as substantially set out in SEQ ID No: 110, or a variant or fragment thereof. Preferably, the antibody or antigen-binding fragment thereof comprises a CDR-H3 domain comprising or consisting of a sequence as substantially set out in SEQ ID No: 111, or a variant or fragment thereof.

Preferably, the antibody or antigen-binding fragment thereof comprises a CDR-H1 domain comprising or consisting of SEQ ID No: 109, a CDR-H2 domain comprising or consisting of SEQ ID No: 110 and/or a CDR-H3 domain comprising or consisting of SEQ ID No: 111. Preferably, however, the antibody or antigen-binding fragment thereof comprises a CDR-H1 domain comprising or consisting of SEQ ID No: 109, a CDR-H2 domain comprising or consisting of SEQ ID No: 110 and a CDR-H3 domain comprising or consisting of SEQ ID No: 111.

Preferably, the antibody or antigen-binding fragment thereof comprises a heavy chain variable (VH) region comprising or consisting of a sequence as substantially set out in SEQ ID No: 115, or a variant or fragment thereof.

Preferably, the antibody or antigen-binding fragment thereof comprises a CDR-L1 domain comprising or consisting of a sequence as substantially set out in SEQ ID No: 112, or a variant or fragment thereof. Preferably, the antibody or antigen-binding fragment thereof comprises a CDR-L2 domain comprising or consisting of a sequence as substantially set out in SEQ ID No: 113, or a variant or fragment thereof. Preferably, the antibody or antigen-binding fragment thereof comprises a CDR-L3 domain comprising or consisting of a sequence as substantially set out in SEQ ID No: 114, or a variant or fragment thereof.

Preferably, the antibody or antigen-binding fragment thereof comprises a CDR-L1 domain comprising or consisting of SEQ ID No: 112, a CDR-L2 domain comprising or consisting of SEQ ID No: 113, and/or a CDR-L3 domain comprising or consisting of SEQ ID No: 114. However, preferably the antibody or antigen-binding fragment thereof comprises a CDR-L1 domain comprising or consisting of SEQ ID No: 112, a CDR-L2 domain comprising or consisting of SEQ ID No: 113, and a CDR-L3 domain comprising or consisting of SEQ ID No: 114.

Preferably, the antibody or antigen-binding fragment thereof comprises a light chain variable (VL) region comprising or consisting of a sequence as substantially set out in SEQ ID No: 116, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 109, a CDR-H2 domain comprising or consisting of SEQ ID No: 110, a CDR-H3 domain comprising or consisting of SEQ ID No: 111, a CDR-L1 domain comprising or consisting of SEQ ID No: 112, a CDR-L2 domain comprising or consisting of SEQ ID No: 113, and a CDR-L3 domain comprising or consisting of SEQ ID No: 114.

Preferably, the antibody or antigen-binding fragment thereof comprises a heavy chain variable region comprising or consisting of SEQ ID No: 115 and a light chain variable region comprising or consisting of SEQ ID No: 116.

H2_Y60K_L2

In one embodiment, the antibody or antigen-binding fragment thereof is referred to herein as H2_Y60K_L2.

Preferably, the antibody or antigen-binding fragment thereof comprises a CDR-H1 domain comprising or consisting of a sequence as substantially set out in SEQ ID No: 117, or a variant or fragment thereof. Preferably, the antibody or antigen-binding fragment thereof comprises a CDR-H2 domain comprising or consisting of a sequence as substantially set out in SEQ ID No: 118, or a variant or fragment thereof. Preferably, the antibody or antigen-binding fragment thereof comprises a CDR-H3 domain comprising or consisting of a sequence as substantially set out in SEQ ID No: 119, or a variant or fragment thereof.

Preferably, the antibody or antigen-binding fragment thereof comprises a CDR-H1 domain comprising or consisting of SEQ ID No: 117, a CDR-H2 domain comprising or consisting of SEQ ID No: 118 and/or a CDR-H3 domain comprising or consisting of SEQ ID No: 119. Preferably, however, the antibody or antigen-binding fragment thereof comprises a CDR-H1 domain comprising or consisting of SEQ ID No: 117, a CDR-H2 domain comprising or consisting of SEQ ID No: 118 and a CDR-H3 domain comprising or consisting of SEQ ID No: 119.

Preferably, the antibody or antigen-binding fragment thereof comprises a heavy chain variable (VH) region comprising or consisting of a sequence as substantially set out in SEQ ID No: 123, or a variant or fragment thereof.

Preferably, the antibody or antigen-binding fragment thereof comprises a CDR-L1 domain comprising or consisting of a sequence as substantially set out in SEQ ID No: 120, or a variant or fragment thereof. Preferably, the antibody or antigen-binding fragment thereof comprises a CDR-L2 domain comprising or consisting of a sequence as substantially set out in SEQ ID No: 121, or a variant or fragment thereof. Preferably, the antibody or antigen-binding fragment thereof comprises a CDR-L3 domain comprising or consisting of a sequence as substantially set out in SEQ ID No: 122, or a variant or fragment thereof.

Preferably, the antibody or antigen-binding fragment thereof comprises a CDR-L1 domain comprising or consisting of SEQ ID No: 120, a CDR-L2 domain comprising or consisting of SEQ ID No: 121, and/or a CDR-L3 domain comprising or consisting of SEQ ID No: 122. However, preferably the antibody or antigen-binding fragment thereof comprises a CDR-L1 domain comprising or consisting of SEQ ID No: 120, a CDR-L2 domain comprising or consisting of SEQ ID No: 121, and a CDR-L3 domain comprising or consisting of SEQ ID No: 122.

Preferably, the antibody or antigen-binding fragment thereof comprises a light chain variable (VL) region comprising or consisting of a sequence as substantially set out in SEQ ID No: 124, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 117, a CDR-H2 domain comprising or consisting of SEQ ID No: 118, a CDR-H3 domain comprising or consisting of SEQ ID No: 119, a CDR-L1 domain comprising or consisting of SEQ ID No: 120, a CDR-L2 domain comprising or consisting of SEQ ID No: 121, and a CDR-L3 domain comprising or consisting of SEQ ID No: 122.

Preferably, the antibody or antigen-binding fragment thereof comprises a heavy chain variable region comprising or consisting of SEQ ID No: 123 and a light chain variable region comprising or consisting of SEQ ID No: 124.

H2_T63Y_L2

In one embodiment, the antibody or antigen-binding fragment thereof is referred to herein as H2_T63Y_L2.

Preferably, the antibody or antigen-binding fragment thereof comprises a CDR-H1 domain comprising or consisting of a sequence as substantially set out in SEQ ID No: 125, or a variant or fragment thereof. Preferably, the antibody or antigen-binding fragment thereof comprises a CDR-H2 domain comprising or consisting of a sequence as substantially set out in SEQ ID No: 126, or a variant or fragment thereof. Preferably, the antibody or antigen-binding fragment thereof comprises a CDR-H3 domain comprising or consisting of a sequence as substantially set out in SEQ ID No: 127, or a variant or fragment thereof.

Preferably, the antibody or antigen-binding fragment thereof comprises a CDR-H1 domain comprising or consisting of SEQ ID No: 125, a CDR-H2 domain comprising or consisting of SEQ ID No: 126 and/or a CDR-H3 domain comprising or consisting of SEQ ID No: 127. Preferably, however, the antibody or antigen-binding fragment thereof comprises a CDR-H1 domain comprising or consisting of SEQ ID No: 125, a CDR-H2 domain comprising or consisting of SEQ ID No: 126 and a CDR-H3 domain comprising or consisting of SEQ ID No: 127.

Preferably, the antibody or antigen-binding fragment thereof comprises a heavy chain variable (VH) region comprising or consisting of a sequence as substantially set out in SEQ ID No: 131, or a variant or fragment thereof.

Preferably, the antibody or antigen-binding fragment thereof comprises a CDR-L1 domain comprising or consisting of a sequence as substantially set out in SEQ ID No: 128, or a variant or fragment thereof. Preferably, the antibody or antigen-binding fragment thereof comprises a CDR-L2 domain comprising or consisting of a sequence as substantially set out in SEQ ID No: 129, or a variant or fragment thereof. Preferably, the antibody or antigen-binding fragment thereof comprises a CDR-L3 domain comprising or consisting of a sequence as substantially set out in SEQ ID No: 130, or a variant or fragment thereof.

Preferably, the antibody or antigen-binding fragment thereof comprises a CDR-L1 domain comprising or consisting of SEQ ID No: 128, a CDR-L2 domain comprising or consisting of SEQ ID No: 129, and/or a CDR-L3 domain comprising or consisting of SEQ ID No: 130. However, preferably the antibody or antigen-binding fragment thereof comprises a CDR-L1 domain comprising or consisting of SEQ ID No: 128, a CDR-L2 domain comprising or consisting of SEQ ID No: 129, and a CDR-L3 domain comprising or consisting of SEQ ID No: 130.

Preferably, the antibody or antigen-binding fragment thereof comprises a light chain variable (VL) region comprising or consisting of a sequence as substantially set out in SEQ ID No: 132, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 125, a CDR-H2 domain comprising or consisting of SEQ ID No: 126, a CDR-H3 domain comprising or consisting of SEQ ID No: 127, a CDR-L1 domain comprising or consisting of SEQ ID No: 128, a CDR-L2 domain comprising or consisting of SEQ ID No: 129, and a CDR-L3 domain comprising or consisting of SEQ ID No: 130.

Preferably, the antibody or antigen-binding fragment thereof comprises a heavy chain variable region comprising or consisting of SEQ ID No: 131 and a light chain variable region comprising or consisting of SEQ ID No: 132.

H3_M105P_VL-par

In one embodiment, the antibody or antigen-binding fragment thereof is referred to herein as H3_M105P_VL-par.

Preferably, the antibody or antigen-binding fragment thereof comprises a CDR-H1 domain comprising or consisting of a sequence as substantially set out in SEQ ID No: 133, or a variant or fragment thereof. Preferably, the antibody or antigen-binding fragment thereof comprises a CDR-H2 domain comprising or consisting of a sequence as substantially set out in SEQ ID No: 134, or a variant or fragment thereof. Preferably, the antibody or antigen-binding fragment thereof comprises a CDR-H3 domain comprising or consisting of a sequence as substantially set out in SEQ ID No: 135, or a variant or fragment thereof.

Preferably, the antibody or antigen-binding fragment thereof comprises a CDR-H1 domain comprising or consisting of SEQ ID No: 133, a CDR-H2 domain comprising or consisting of SEQ ID No: 134 and/or a CDR-H3 domain comprising or consisting of SEQ ID No: 135. Preferably, however, the antibody or antigen-binding fragment thereof comprises a CDR-H1 domain comprising or consisting of SEQ ID No: 133, a CDR-H2 domain comprising or consisting of SEQ ID No: 134 and a CDR-H3 domain comprising or consisting of SEQ ID No: 135.

Preferably, the antibody or antigen-binding fragment thereof comprises a heavy chain variable (VH) region comprising or consisting of a sequence as substantially set out in SEQ ID No: 139, or a variant or fragment thereof.

Preferably, the antibody or antigen-binding fragment thereof comprises a CDR-L1 domain comprising or consisting of a sequence as substantially set out in SEQ ID No: 136, or a variant or fragment thereof. Preferably, the antibody or antigen-binding fragment thereof comprises a CDR-L2 domain comprising or consisting of a sequence as substantially set out in SEQ ID No: 137, or a variant or fragment thereof. Preferably, the antibody or antigen-binding fragment thereof comprises a CDR-L3 domain comprising or consisting of a sequence as substantially set out in SEQ ID No: 138, or a variant or fragment thereof.

Preferably, the antibody or antigen-binding fragment thereof comprises a CDR-L1 domain comprising or consisting of SEQ ID No: 136, a CDR-L2 domain comprising or consisting of SEQ ID No: 137, and/or a CDR-L3 domain comprising or consisting of SEQ ID No: 138. However, preferably the antibody or antigen-binding fragment thereof comprises a CDR-L1 domain comprising or consisting of SEQ ID No: 136, a CDR-L2 domain comprising or consisting of SEQ ID No: 137, and a CDR-L3 domain comprising or consisting of SEQ ID No: 138.

Preferably, the antibody or antigen-binding fragment thereof comprises a light chain variable (VL) region comprising or consisting of a sequence as substantially set out in SEQ ID No: 140, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 133, a CDR-H2 domain comprising or consisting of SEQ ID No: 134, a CDR-H3 domain comprising or consisting of SEQ ID No: 135, a CDR-L1 domain comprising or consisting of SEQ ID No: 136, a CDR-L2 domain comprising or consisting of SEQ ID No: 137, and a CDR-L3 domain comprising or consisting of SEQ ID No: 138.

Preferably, the antibody or antigen-binding fragment thereof comprises a heavy chain variable region comprising or consisting of SEQ ID No: 139 and a light chain variable region comprising or consisting of SEQ ID No: 140.

H2_K65P_L2

In one embodiment, the antibody or antigen-binding fragment thereof is referred to herein as H2_K65P_L2.

Preferably, the antibody or antigen-binding fragment thereof comprises a CDR-H1 domain comprising or consisting of a sequence as substantially set out in SEQ ID No: 141, or a variant or fragment thereof. Preferably, the antibody or antigen-binding fragment thereof comprises a CDR-H2 domain comprising or consisting of a sequence as substantially set out in SEQ ID No: 142, or a variant or fragment thereof. Preferably, the antibody or antigen-binding fragment thereof comprises a CDR-H3 domain comprising or consisting of a sequence as substantially set out in SEQ ID No: 143, or a variant or fragment thereof.

Preferably, the antibody or antigen-binding fragment thereof comprises a CDR-H1 domain comprising or consisting of SEQ ID No: 141, a CDR-H2 domain comprising or consisting of SEQ ID No: 142 and/or a CDR-H3 domain comprising or consisting of SEQ ID No: 143. Preferably, however, the antibody or antigen-binding fragment thereof comprises a CDR-H1 domain comprising or consisting of SEQ ID No: 141, a CDR-H2 domain comprising or consisting of SEQ ID No: 142 and a CDR-H3 domain comprising or consisting of SEQ ID No: 143.

Preferably, the antibody or antigen-binding fragment thereof comprises a heavy chain variable (VH) region comprising or consisting of a sequence as substantially set out in SEQ ID No: 147, or a variant or fragment thereof.

Preferably, the antibody or antigen-binding fragment thereof comprises a CDR-L1 domain comprising or consisting of a sequence as substantially set out in SEQ ID No: 144, or a variant or fragment thereof. Preferably, the antibody or antigen-binding fragment thereof comprises a CDR-L2 domain comprising or consisting of a sequence as substantially set out in SEQ ID No: 145, or a variant or fragment thereof. Preferably, the antibody or antigen-binding fragment thereof comprises a CDR-L3 domain comprising or consisting of a sequence as substantially set out in SEQ ID No: 146, or a variant or fragment thereof.

Preferably, the antibody or antigen-binding fragment thereof comprises a CDR-L1 domain comprising or consisting of SEQ ID No: 144, a CDR-L2 domain comprising or consisting of SEQ ID No: 145, and/or a CDR-L3 domain comprising or consisting of SEQ ID No: 146. However, preferably the antibody or antigen-binding fragment thereof comprises a CDR-L1 domain comprising or consisting of SEQ ID No: 144, a CDR-L2 domain comprising or consisting of SEQ ID No: 145, and a CDR-L3 domain comprising or consisting of SEQ ID No: 146.

Preferably, the antibody or antigen-binding fragment thereof comprises a light chain variable (VL) region comprising or consisting of a sequence as substantially set out in SEQ ID No: 148, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 141, a CDR-H2 domain comprising or consisting of SEQ ID No: 142, a CDR-H3 domain comprising or consisting of SEQ ID No: 143, a CDR-L1 domain comprising or consisting of SEQ ID No: 144, a CDR-L2 domain comprising or consisting of SEQ ID No: 145, and a CDR-L3 domain comprising or consisting of SEQ ID No: 146.

Preferably, the antibody or antigen-binding fragment thereof comprises a heavy chain variable region comprising or consisting of SEQ ID No: 147 and a light chain variable region comprising or consisting of SEQ ID No: 148.

H2_G66Q_L2

In one embodiment, the antibody or antigen-binding fragment thereof is referred to herein as H2_G66Q_L2.

Preferably, the antibody or antigen-binding fragment thereof comprises a CDR-H1 domain comprising or consisting of a sequence as substantially set out in SEQ ID No: 149, or a variant or fragment thereof. Preferably, the antibody or antigen-binding fragment thereof comprises a CDR-H2 domain comprising or consisting of a sequence as substantially set out in SEQ ID No: 150, or a variant or fragment thereof. Preferably, the antibody or antigen-binding fragment thereof comprises a CDR-H3 domain comprising or consisting of a sequence as substantially set out in SEQ ID No: 151, or a variant or fragment thereof.

Preferably, the antibody or antigen-binding fragment thereof comprises a CDR-H1 domain comprising or consisting of SEQ ID No: 149, a CDR-H2 domain comprising or consisting of SEQ ID No: 150 and/or a CDR-H3 domain comprising or consisting of SEQ ID No: 151. Preferably, however, the antibody or antigen-binding fragment thereof comprises a CDR-H1 domain comprising or consisting of SEQ ID No: 149, a CDR-H2 domain comprising or consisting of SEQ ID No: 150 and a CDR-H3 domain comprising or consisting of SEQ ID No: 151.

Preferably, the antibody or antigen-binding fragment thereof comprises a heavy chain variable (VH) region comprising or consisting of a sequence as substantially set out in SEQ ID No: 155, or a variant or fragment thereof.

Preferably, the antibody or antigen-binding fragment thereof comprises a CDR-L1 domain comprising or consisting of a sequence as substantially set out in SEQ ID No: 152, or a variant or fragment thereof. Preferably, the antibody or antigen-binding fragment thereof comprises a CDR-L2 domain comprising or consisting of a sequence as substantially set out in SEQ ID No: 153, or a variant or fragment thereof. Preferably, the antibody or antigen-binding fragment thereof comprises a CDR-L3 domain comprising or consisting of a sequence as substantially set out in SEQ ID No: 154, or a variant or fragment thereof.

Preferably, the antibody or antigen-binding fragment thereof comprises a CDR-L1 domain comprising or consisting of SEQ ID No: 152, a CDR-L2 domain comprising or consisting of SEQ ID No: 153, and/or a CDR-L3 domain comprising or consisting of SEQ ID No: 154. However, preferably the antibody or antigen-binding fragment thereof comprises a CDR-L1 domain comprising or consisting of SEQ ID No: 152, a CDR-L2 domain comprising or consisting of SEQ ID No: 153, and a CDR-L3 domain comprising or consisting of SEQ ID No: 154.

Preferably, the antibody or antigen-binding fragment thereof comprises a light chain variable (VL) region comprising or consisting of a sequence as substantially set out in SEQ ID No: 156, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 149, a CDR-H2 domain comprising or consisting of SEQ ID No: 150, a CDR-H3 domain comprising or consisting of SEQ ID No: 151, a CDR-L1 domain comprising or consisting of SEQ ID No: 152, a CDR-L2 domain comprising or consisting of SEQ ID No: 153, and a CDR-L3 domain comprising or consisting of SEQ ID No: 154.

Preferably, the antibody or antigen-binding fragment thereof comprises a heavy chain variable region comprising or consisting of SEQ ID No: 155 and a light chain variable region comprising or consisting of SEQ ID No: 156.

H3 M105P_L2

In one embodiment, the antibody or antigen-binding fragment thereof is referred to herein as H3_M105P_L2.

Preferably, the antibody or antigen-binding fragment thereof comprises a CDR-H1 domain comprising or consisting of a sequence as substantially set out in SEQ ID No: 157, or a variant or fragment thereof. Preferably, the antibody or antigen-binding fragment thereof comprises a CDR-H2 domain comprising or consisting of a sequence as substantially set out in SEQ ID No: 158, or a variant or fragment thereof. Preferably, the antibody or antigen-binding fragment thereof comprises a CDR-H3 domain comprising or consisting of a sequence as substantially set out in SEQ ID No: 159, or a variant or fragment thereof.

Preferably, the antibody or antigen-binding fragment thereof comprises a CDR-H1 domain comprising or consisting of SEQ ID No: 157, a CDR-H2 domain comprising or consisting of SEQ ID No: 158 and/or a CDR-H3 domain comprising or consisting of SEQ ID No: 159. Preferably, however, the antibody or antigen-binding fragment thereof comprises a CDR-H1 domain comprising or consisting of SEQ ID No: 157, a CDR-H2 domain comprising or consisting of SEQ ID No: 158 and a CDR-H3 domain comprising or consisting of SEQ ID No: 159.

Preferably, the antibody or antigen-binding fragment thereof comprises a heavy chain variable (VH) region comprising or consisting of a sequence as substantially set out in SEQ ID No: 163, or a variant or fragment thereof.

Preferably, the antibody or antigen-binding fragment thereof comprises a CDR-L1 domain comprising or consisting of a sequence as substantially set out in SEQ ID No: 160, or a variant or fragment thereof. Preferably, the antibody or antigen-binding fragment thereof comprises a CDR-L2 domain comprising or consisting of a sequence as substantially set out in SEQ ID No: 161, or a variant or fragment thereof. Preferably, the antibody or antigen-binding fragment thereof comprises a CDR-L3 domain comprising or consisting of a sequence as substantially set out in SEQ ID No: 162, or a variant or fragment thereof.

Preferably, the antibody or antigen-binding fragment thereof comprises a CDR-L1 domain comprising or consisting of SEQ ID No: 160, a CDR-L2 domain comprising or consisting of SEQ ID No: 161, and/or a CDR-L3 domain comprising or consisting of SEQ ID No: 162. However, preferably the antibody or antigen-binding fragment thereof comprises a CDR-L1 domain comprising or consisting of SEQ ID No: 160, a CDR-L2 domain comprising or consisting of SEQ ID No: 161, and a CDR-L3 domain comprising or consisting of SEQ ID No: 162.

Preferably, the antibody or antigen-binding fragment thereof comprises a light chain variable (VL) region comprising or consisting of a sequence as substantially set out in SEQ ID No: 164, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 157, a CDR-H2 domain comprising or consisting of SEQ ID No: 158, a CDR-H3 domain comprising or consisting of SEQ ID No: 159, a CDR-L1 domain comprising or consisting of SEQ ID No: 160, a CDR-L2 domain comprising or consisting of SEQ ID No: 161, and a CDR-L3 domain comprising or consisting of SEQ ID No: 162.

Preferably, the antibody or antigen-binding fragment thereof comprises a heavy chain variable region comprising or consisting of SEQ ID No: 163 and a light chain variable region comprising or consisting of SEQ ID No: 164.

51B12 VH_L2

In one embodiment, the antibody or antigen-binding fragment thereof is referred to herein as 51B12_VH_L2.

Preferably, the antibody or antigen-binding fragment thereof comprises a CDR-H1 domain comprising or consisting of a sequence as substantially set out in SEQ ID No: 165, or a variant or fragment thereof. Preferably, the antibody or antigen-binding fragment thereof comprises a CDR-H2 domain comprising or consisting of a sequence as substantially set out in SEQ ID No: 166, or a variant or fragment thereof. Preferably, the antibody or antigen-binding fragment thereof comprises a CDR-H3 domain comprising or consisting of a sequence as substantially set out in SEQ ID No: 167, or a variant or fragment thereof.

Preferably, the antibody or antigen-binding fragment thereof comprises a CDR-H1 domain comprising or consisting of SEQ ID No: 165, a CDR-H2 domain comprising or consisting of SEQ ID No: 166 and/or a CDR-H3 domain comprising or consisting of SEQ ID No: 167. Preferably, however, the antibody or antigen-binding fragment thereof comprises a CDR-H1 domain comprising or consisting of SEQ ID No: 165, a CDR-H2 domain comprising or consisting of SEQ ID No: 166 and a CDR-H3 domain comprising or consisting of SEQ ID No: 167.

Preferably, the antibody or antigen-binding fragment thereof comprises a heavy chain variable (VH) region comprising or consisting of a sequence as substantially set out in SEQ ID No: 171, or a variant or fragment thereof.

Preferably, the antibody or antigen-binding fragment thereof comprises a CDR-L1 domain comprising or consisting of a sequence as substantially set out in SEQ ID No: 168, or a variant or fragment thereof. Preferably, the antibody or antigen-binding fragment thereof comprises a CDR-L2 domain comprising or consisting of a sequence as substantially set out in SEQ ID No: 169, or a variant or fragment thereof. Preferably, the antibody or antigen-binding fragment thereof comprises a CDR-L3 domain comprising or consisting of a sequence as substantially set out in SEQ ID No: 170, or a variant or fragment thereof.

Preferably, the antibody or antigen-binding fragment thereof comprises a CDR-L1 domain comprising or consisting of SEQ ID No: 168, a CDR-L2 domain comprising or consisting of SEQ ID No: 169, and/or a CDR-L3 domain comprising or consisting of SEQ ID No: 170. However, preferably the antibody or antigen-binding fragment thereof comprises a CDR-L1 domain comprising or consisting of SEQ ID No: 168, a CDR-L2 domain comprising or consisting of SEQ ID No: 169, and a CDR-L3 domain comprising or consisting of SEQ ID No: 170.

Preferably, the antibody or antigen-binding fragment thereof comprises a light chain variable (VL) region comprising or consisting of a sequence as substantially set out in SEQ ID No: 172, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 165, a CDR-H2 domain comprising or consisting of SEQ ID No: 166, a CDR-H3 domain comprising or consisting of SEQ ID No: 167, a CDR-L1 domain comprising or consisting of SEQ ID No: 168, a CDR-L2 domain comprising or consisting of SEQ ID No: 169, and a CDR-L3 domain comprising or consisting of SEQ ID No: 170.

Preferably, the antibody or antigen-binding fragment thereof comprises a heavy chain variable region comprising or consisting of SEQ ID No: 171 and a light chain variable region comprising or consisting of SEQ ID No: 172.

H2_T56H_VL-par

In one embodiment, the antibody or antigen-binding fragment thereof is referred to herein as H2_T56H_VL-par.

Preferably, the antibody or antigen-binding fragment thereof comprises a CDR-H1 domain comprising or consisting of a sequence as substantially set out in SEQ ID No: 173, or a variant or fragment thereof. Preferably, the antibody or antigen-binding fragment thereof comprises a CDR-H2 domain comprising or consisting of a sequence as substantially set out in SEQ ID No: 174, or a variant or fragment thereof. Preferably, the antibody or antigen-binding fragment thereof comprises a CDR-H3 domain comprising or consisting of a sequence as substantially set out in SEQ ID No: 175, or a variant or fragment thereof.

Preferably, the antibody or antigen-binding fragment thereof comprises a CDR-H1 domain comprising or consisting of SEQ ID No: 173, a CDR-H2 domain comprising or consisting of SEQ ID No: 174 and/or a CDR-H3 domain comprising or consisting of SEQ ID No: 175. Preferably, however, the antibody or antigen-binding fragment thereof comprises a CDR-H1 domain comprising or consisting of SEQ ID No: 173, a CDR-H2 domain comprising or consisting of SEQ ID No: 174 and a CDR-H3 domain comprising or consisting of SEQ ID No: 175.

Preferably, the antibody or antigen-binding fragment thereof comprises a heavy chain variable (VH) region comprising or consisting of a sequence as substantially set out in SEQ ID No: 179, or a variant or fragment thereof.

Preferably, the antibody or antigen-binding fragment thereof comprises a CDR-L1 domain comprising or consisting of a sequence as substantially set out in SEQ ID No: 176, or a variant or fragment thereof. Preferably, the antibody or antigen-binding fragment thereof comprises a CDR-L2 domain comprising or consisting of a sequence as substantially set out in SEQ ID No: 177, or a variant or fragment thereof. Preferably, the antibody or antigen-binding fragment thereof comprises a CDR-L3 domain comprising or consisting of a sequence as substantially set out in SEQ ID No: 178, or a variant or fragment thereof.

Preferably, the antibody or antigen-binding fragment thereof comprises a CDR-L1 domain comprising or consisting of SEQ ID No: 176, a CDR-L2 domain comprising or consisting of SEQ ID No: 177, and/or a CDR-L3 domain comprising or consisting of SEQ ID No: 178. However, preferably the antibody or antigen-binding fragment thereof comprises a CDR-L1 domain comprising or consisting of SEQ ID No: 176, a CDR-L2 domain comprising or consisting of SEQ ID No: 177, and a CDR-L3 domain comprising or consisting of SEQ ID No: 178.

Preferably, the antibody or antigen-binding fragment thereof comprises a light chain variable (VL) region comprising or consisting of a sequence as substantially set out in SEQ ID No: 180, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 173, a CDR-H2 domain comprising or consisting of SEQ ID No: 174, a CDR-H3 domain comprising or consisting of SEQ ID No: 175, a CDR-L1 domain comprising or consisting of SEQ ID No: 176, a CDR-L2 domain comprising or consisting of SEQ ID No: 177, and a CDR-L3 domain comprising or consisting of SEQ ID No: 178.

Preferably, the antibody or antigen-binding fragment thereof comprises a heavy chain variable region comprising or consisting of SEQ ID No: 179 and a light chain variable region comprising or consisting of SEQ ID No: 180.

H2_T57H_VL-par

In one embodiment, the antibody or antigen-binding fragment thereof is referred to herein as H2_T57H_VL-par.

Preferably, the antibody or antigen-binding fragment thereof comprises a CDR-H1 domain comprising or consisting of a sequence as substantially set out in SEQ ID No: 181, or a variant or fragment thereof. Preferably, the antibody or antigen-binding fragment thereof comprises a CDR-H2 domain comprising or consisting of a sequence as substantially set out in SEQ ID No: 182, or a variant or fragment thereof. Preferably, the antibody or antigen-binding fragment thereof comprises a CDR-H3 domain comprising or consisting of a sequence as substantially set out in SEQ ID No: 183, or a variant or fragment thereof.

Preferably, the antibody or antigen-binding fragment thereof comprises a CDR-H1 domain comprising or consisting of SEQ ID No: 181, a CDR-H2 domain comprising or consisting of SEQ ID No: 182 and/or a CDR-H3 domain comprising or consisting of SEQ ID No: 183. Preferably, however, the antibody or antigen-binding fragment thereof comprises a CDR-H1 domain comprising or consisting of SEQ ID No: 181, a CDR-H2 domain comprising or consisting of SEQ ID No: 182 and a CDR-H3 domain comprising or consisting of SEQ ID No: 183.

Preferably, the antibody or antigen-binding fragment thereof comprises a heavy chain variable (VH) region comprising or consisting of a sequence as substantially set out in SEQ ID No: 187, or a variant or fragment thereof.

Preferably, the antibody or antigen-binding fragment thereof comprises a CDR-L1 domain comprising or consisting of a sequence as substantially set out in SEQ ID No: 184, or a variant or fragment thereof. Preferably, the antibody or antigen-binding fragment thereof comprises a CDR-L2 domain comprising or consisting of a sequence as substantially set out in SEQ ID No: 185, or a variant or fragment thereof. Preferably, the antibody or antigen-binding fragment thereof comprises a CDR-L3 domain comprising or consisting of a sequence as substantially set out in SEQ ID No: 186, or a variant or fragment thereof.

Preferably, the antibody or antigen-binding fragment thereof comprises a CDR-L1 domain comprising or consisting of SEQ ID No: 184, a CDR-L2 domain comprising or consisting of SEQ ID No: 185, and/or a CDR-L3 domain comprising or consisting of SEQ ID No: 186. However, preferably the antibody or antigen-binding fragment thereof comprises a CDR-L1 domain comprising or consisting of SEQ ID No: 184, a CDR-L2 domain comprising or consisting of SEQ ID No: 185, and a CDR-L3 domain comprising or consisting of SEQ ID No: 186.

Preferably, the antibody or antigen-binding fragment thereof comprises a light chain variable (VL) region comprising or consisting of a sequence as substantially set out in SEQ ID No: 188, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 181, a CDR-H2 domain comprising or consisting of SEQ ID No: 182, a CDR-H3 domain comprising or consisting of SEQ ID No: 183, a CDR-L1 domain comprising or consisting of SEQ ID No: 184, a CDR-L2 domain comprising or consisting of SEQ ID No: 185, and a CDR-L3 domain comprising or consisting of SEQ ID No: 186.

Preferably, the antibody or antigen-binding fragment thereof comprises a heavy chain variable region comprising or consisting of SEQ ID No: 187 and a light chain variable region comprising or consisting of SEQ ID No: 188.

H2_Y60K_VL-par

In one embodiment, the antibody or antigen-binding fragment thereof is referred to herein as H2_Y60K_VL-par.

Preferably, the antibody or antigen-binding fragment thereof comprises a CDR-H1 domain comprising or consisting of a sequence as substantially set out in SEQ ID No: 189, or a variant or fragment thereof. Preferably, the antibody or antigen-binding fragment thereof comprises a CDR-H2 domain comprising or consisting of a sequence as substantially set out in SEQ ID No: 190, or a variant or fragment thereof. Preferably, the antibody or antigen-binding fragment thereof comprises a CDR-H3 domain comprising or consisting of a sequence as substantially set out in SEQ ID No: 191, or a variant or fragment thereof.

Preferably, the antibody or antigen-binding fragment thereof comprises a CDR-H1 domain comprising or consisting of SEQ ID No: 189, a CDR-H2 domain comprising or consisting of SEQ ID No: 190 and/or a CDR-H3 domain comprising or consisting of SEQ ID No: 191. Preferably, however, the antibody or antigen-binding fragment thereof comprises a CDR-H1 domain comprising or consisting of SEQ ID No: 189, a CDR-H2 domain comprising or consisting of SEQ ID No: 190 and a CDR-H3 domain comprising or consisting of SEQ ID No: 191.

Preferably, the antibody or antigen-binding fragment thereof comprises a heavy chain variable (VH) region comprising or consisting of a sequence as substantially set out in SEQ ID No: 195, or a variant or fragment thereof.

Preferably, the antibody or antigen-binding fragment thereof comprises a CDR-L1 domain comprising or consisting of a sequence as substantially set out in SEQ ID No: 192, or a variant or fragment thereof. Preferably, the antibody or antigen-binding fragment thereof comprises a CDR-L2 domain comprising or consisting of a sequence as substantially set out in SEQ ID No: 193, or a variant or fragment thereof. Preferably, the antibody or antigen-binding fragment thereof comprises a CDR-L3 domain comprising or consisting of a sequence as substantially set out in SEQ ID No: 194, or a variant or fragment thereof.

Preferably, the antibody or antigen-binding fragment thereof comprises a CDR-L1 domain comprising or consisting of SEQ ID No: 192, a CDR-L2 domain comprising or consisting of SEQ ID No: 193, and/or a CDR-L3 domain comprising or consisting of SEQ ID No: 194. However, preferably the antibody or antigen-binding fragment thereof comprises a CDR-L1 domain comprising or consisting of SEQ ID No: 192, a CDR-L2 domain comprising or consisting of SEQ ID No: 193, and a CDR-L3 domain comprising or consisting of SEQ ID No: 194.

Preferably, the antibody or antigen-binding fragment thereof comprises a light chain variable (VL) region comprising or consisting of a sequence as substantially set out in SEQ ID No: 196, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 189, a CDR-H2 domain comprising or consisting of SEQ ID No: 190, a CDR-H3 domain comprising or consisting of SEQ ID No: 191, a CDR-L1 domain comprising or consisting of SEQ ID No: 192, a CDR-L2 domain comprising or consisting of SEQ ID No: 193, and a CDR-L3 domain comprising or consisting of SEQ ID No: 194.

Preferably, the antibody or antigen-binding fragment thereof comprises a heavy chain variable region comprising or consisting of SEQ ID No: 195 and a light chain variable region comprising or consisting of SEQ ID No: 196.

H2_T63Y_VL-par

In one embodiment, the antibody or antigen-binding fragment thereof is referred to herein as H2_T63Y_VL-par.

Preferably, the antibody or antigen-binding fragment thereof comprises a CDR-H1 domain comprising or consisting of a sequence as substantially set out in SEQ ID No: 197, or a variant or fragment thereof. Preferably, the antibody or antigen-binding fragment thereof comprises a CDR-H2 domain comprising or consisting of a sequence as substantially set out in SEQ ID No: 198, or a variant or fragment thereof. Preferably, the antibody or antigen-binding fragment thereof comprises a CDR-H3 domain comprising or consisting of a sequence as substantially set out in SEQ ID No: 199, or a variant or fragment thereof.

Preferably, the antibody or antigen-binding fragment thereof comprises a CDR-H1 domain comprising or consisting of SEQ ID No: 197, a CDR-H2 domain comprising or consisting of SEQ ID No: 198 and/or a CDR-H3 domain comprising or consisting of SEQ ID No: 199. Preferably, however, the antibody or antigen-binding fragment thereof comprises a CDR-H1 domain comprising or consisting of SEQ ID No: 197, a CDR-H2 domain comprising or consisting of SEQ ID No: 198 and a CDR-H3 domain comprising or consisting of SEQ ID No: 199.

Preferably, the antibody or antigen-binding fragment thereof comprises a heavy chain variable (VH) region comprising or consisting of a sequence as substantially set out in SEQ ID No: 203, or a variant or fragment thereof.

Preferably, the antibody or antigen-binding fragment thereof comprises a CDR-L1 domain comprising or consisting of a sequence as substantially set out in SEQ ID No: 200, or a variant or fragment thereof. Preferably, the antibody or antigen-binding fragment thereof comprises a CDR-L2 domain comprising or consisting of a sequence as substantially set out in SEQ ID No: 201, or a variant or fragment thereof. Preferably, the antibody or antigen-binding fragment thereof comprises a CDR-L3 domain comprising or consisting of a sequence as substantially set out in SEQ ID No: 202, or a variant or fragment thereof.

Preferably, the antibody or antigen-binding fragment thereof comprises a CDR-L1 domain comprising or consisting of SEQ ID No: 200, a CDR-L2 domain comprising or consisting of SEQ ID No: 201, and/or a CDR-L3 domain comprising or consisting of SEQ ID No: 202. However, preferably the antibody or antigen-binding fragment thereof comprises a CDR-L1 domain comprising or consisting of SEQ ID No: 200, a CDR-L2 domain comprising or consisting of SEQ ID No: 201, and a CDR-L3 domain comprising or consisting of SEQ ID No: 202.

Preferably, the antibody or antigen-binding fragment thereof comprises a light chain variable (VL) region comprising or consisting of a sequence as substantially set out in SEQ ID No: 204, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 197, a CDR-H2 domain comprising or consisting of SEQ ID No: 198, a CDR-H3 domain comprising or consisting of SEQ ID No: 199, a CDR-L1 domain comprising or consisting of SEQ ID No: 200, a CDR-L2 domain comprising or consisting of SEQ ID No: 201, and a CDR-L3 domain comprising or consisting of SEQ ID No: 202.

Preferably, the antibody or antigen-binding fragment thereof comprises a heavy chain variable region comprising or consisting of SEQ ID No: 203 and a light chain variable region comprising or consisting of SEQ ID No: 204.

H2_K65P_VL-par

In one embodiment, the antibody or antigen-binding fragment thereof is referred to herein as H2_K65P_VL-par.

Preferably, the antibody or antigen-binding fragment thereof comprises a CDR-H1 domain comprising or consisting of a sequence as substantially set out in SEQ ID No: 205, or a variant or fragment thereof. Preferably, the antibody or antigen-binding fragment thereof comprises a CDR-H2 domain comprising or consisting of a sequence as substantially set out in SEQ ID No: 206, or a variant or fragment thereof. Preferably, the antibody or antigen-binding fragment thereof comprises a CDR-H3 domain comprising or consisting of a sequence as substantially set out in SEQ ID No: 207, or a variant or fragment thereof.

Preferably, the antibody or antigen-binding fragment thereof comprises a CDR-H1 domain comprising or consisting of SEQ ID No: 205, a CDR-H2 domain comprising or consisting of SEQ ID No: 206 and/or a CDR-H3 domain comprising or consisting of SEQ ID No: 207. Preferably, however, the antibody or antigen-binding fragment thereof comprises a CDR-H1 domain comprising or consisting of SEQ ID No: 205, a CDR-H2 domain comprising or consisting of SEQ ID No: 206 and a CDR-H3 domain comprising or consisting of SEQ ID No: 207.

Preferably, the antibody or antigen-binding fragment thereof comprises a heavy chain variable (VH) region comprising or consisting of a sequence as substantially set out in SEQ ID No: 211, or a variant or fragment thereof.

Preferably, the antibody or antigen-binding fragment thereof comprises a CDR-L1 domain comprising or consisting of a sequence as substantially set out in SEQ ID No: 208, or a variant or fragment thereof. Preferably, the antibody or antigen-binding fragment thereof comprises a CDR-L2 domain comprising or consisting of a sequence as substantially set out in SEQ ID No: 209, or a variant or fragment thereof. Preferably, the antibody or antigen-binding fragment thereof comprises a CDR-L3 domain comprising or consisting of a sequence as substantially set out in SEQ ID No: 210, or a variant or fragment thereof.

Preferably, the antibody or antigen-binding fragment thereof comprises a CDR-L1 domain comprising or consisting of SEQ ID No: 208, a CDR-L2 domain comprising or consisting of SEQ ID No: 209, and/or a CDR-L3 domain comprising or consisting of SEQ ID No: 210. However, preferably the antibody or antigen-binding fragment thereof comprises a CDR-L1 domain comprising or consisting of SEQ ID No: 208, a CDR-L2 domain comprising or consisting of SEQ ID No: 209, and a CDR-L3 domain comprising or consisting of SEQ ID No: 210.

Preferably, the antibody or antigen-binding fragment thereof comprises a light chain variable (VL) region comprising or consisting of a sequence as substantially set out in SEQ ID No: 212, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 205, a CDR-H2 domain comprising or consisting of SEQ ID No: 206, a CDR-H3 domain comprising or consisting of SEQ ID No: 207, a CDR-L1 domain comprising or consisting of SEQ ID No: 208, a CDR-L2 domain comprising or consisting of SEQ ID No: 209, and a CDR-L3 domain comprising or consisting of SEQ ID No: 210.

Preferably, the antibody or antigen-binding fragment thereof comprises a heavy chain variable region comprising or consisting of SEQ ID No: 211 and a light chain variable region comprising or consisting of SEQ ID No: 212.

H2_G660_VL-par

In one embodiment, the antibody or antigen-binding fragment thereof is referred to herein as H2_G66Q_VL-par.

Preferably, the antibody or antigen-binding fragment thereof comprises a CDR-H1 domain comprising or consisting of a sequence as substantially set out in SEQ ID No: 213, or a variant or fragment thereof. Preferably, the antibody or antigen-binding fragment thereof comprises a CDR-H2 domain comprising or consisting of a sequence as substantially set out in SEQ ID No: 214, or a variant or fragment thereof. Preferably, the antibody or antigen-binding fragment thereof comprises a CDR-H3 domain comprising or consisting of a sequence as substantially set out in SEQ ID No: 215, or a variant or fragment thereof.

Preferably, the antibody or antigen-binding fragment thereof comprises a CDR-H1 domain comprising or consisting of SEQ ID No: 213, a CDR-H2 domain comprising or consisting of SEQ ID No: 214 and/or a CDR-H3 domain comprising or consisting of SEQ ID No: 215. Preferably, however, the antibody or antigen-binding fragment thereof comprises a CDR-H1 domain comprising or consisting of SEQ ID No: 213, a CDR-H2 domain comprising or consisting of SEQ ID No: 214 and a CDR-H3 domain comprising or consisting of SEQ ID No: 215.

Preferably, the antibody or antigen-binding fragment thereof comprises a heavy chain variable (VH) region comprising or consisting of a sequence as substantially set out in SEQ ID No: 219, or a variant or fragment thereof.

Preferably, the antibody or antigen-binding fragment thereof comprises a CDR-L1 domain comprising or consisting of a sequence as substantially set out in SEQ ID No: 216, or a variant or fragment thereof. Preferably, the antibody or antigen-binding fragment thereof comprises a CDR-L2 domain comprising or consisting of a sequence as substantially set out in SEQ ID No: 217, or a variant or fragment thereof. Preferably, the antibody or antigen-binding fragment thereof comprises a CDR-L3 domain comprising or consisting of a sequence as substantially set out in SEQ ID No: 218, or a variant or fragment thereof.

Preferably, the antibody or antigen-binding fragment thereof comprises a CDR-L1 domain comprising or consisting of SEQ ID No: 216, a CDR-L2 domain comprising or consisting of SEQ ID No: 217, and/or a CDR-L3 domain comprising or consisting of SEQ ID No: 218. However, preferably the antibody or antigen-binding fragment thereof comprises a CDR-L1 domain comprising or consisting of SEQ ID No: 216, a CDR-L2 domain comprising or consisting of SEQ ID No: 217, and a CDR-L3 domain comprising or consisting of SEQ ID No: 218.

Preferably, the antibody or antigen-binding fragment thereof comprises a light chain variable (VL) region comprising or consisting of a sequence as substantially set out in SEQ ID No: 220, or a variant or fragment thereof.

Preferably, the antibody or antigen-binding fragment thereof comprises at least one, at least two, at least three, at least four, at least five, or at least six CDRs. Preferably, the antibody or antigen-binding fragment thereof comprises at least CDR-H3.

Preferably, the antibody or antigen-binding fragment thereof comprises a CDR-H1 domain comprising or consisting of SEQ ID No: 213, a CDR-H2 domain comprising or consisting of SEQ ID No: 214, a CDR-H3 domain comprising or consisting of SEQ ID No: 215, a CDR-L1 domain comprising or consisting of SEQ ID No: 216, a CDR-L2 domain comprising or consisting of SEQ ID No: 217, and a CDR-L3 domain comprising or consisting of SEQ ID No: 218.

Preferably, the antibody or antigen-binding fragment thereof comprises a heavy chain variable region comprising or consisting of SEQ ID No: 219 and a light chain variable region comprising or consisting of SEQ ID No: 220.

In a second aspect of the invention, there is provided an antibody or antigen-binding fragment thereof, wherein the antibody or antigen-binding fragment specifically binds ZIP12, and comprises six CDR sequences as set out for each antibody shown in FIG. 9b.

For example, in an embodiment, the antibody or antigen-binding fragment preferably comprises the six CDR sequences as set out for the antibody referred to as "H3_W99H_L1", as shown in FIG. 9b, i.e. CDR-H1=SEQ ID No: 13; CDR-H2=SEQ ID No: 14; CDR-H3=SEQ ID No: 15; CDR-L1=SEQ ID No: 16; CDR-L2=SEQ ID No: 17; and CDR-L3=SEQ ID No: 18. The same applies to the other CDR sequences for each of the other antibodies shown in FIG. 9b.

Furthermore, the antibody or antigen-binding fragment preferably comprises a VH/VL sequence pair as set out for each antibody shown in FIG. 9b. For example, in an embodiment, the antibody or antigen-binding fragment preferably comprises the VH/VL sequences as set out for the antibody clone referred to as "H3_W99H_L1", as shown in FIG. 9b, i.e. VH=SEQ ID No: 19; and VL=SEQ ID No: 20. The same applies to the other VH/VL sequence pairs for each of the other antibodies shown in FIG. 9b.

The antibody or antigen-binding fragment of the invention may not comprise six CDR sequences (or the VH/VL sequences) as set out for the antibody clone referred to as "51B12 parent", as shown in FIG. 9a.

The antibody or antigen-binding fragment thereof of the second aspect specifically binds to an extracellular domain of ZIP12, and recognises an epitope comprising or consisting of ADLLQVLSAGDHPPHNHSRS (SEQ ID No: 252), or a variant or fragment thereof.

Preferably, the antibody or antigen-binding fragment thereof of the second aspect specifically binds to an extracellular domain of ZIP12, and recognises an epitope comprising or consisting of LLQVLSAGDHPPHNHSRS (SEQ ID No:1), or a variant or fragment thereof. The epitope of the antibody or antigen-binding fragment may be as defined in relation to the first aspect.

Advantageously, the anti-ZIP12 activity of the antibody or antigen-binding fragment thereof according to the first and second aspects of the invention means that it has utility as a therapeutic agent in its own right, and may be used in the treatment, amelioration or prevention of a hypoxia-induced or hypoxia-associated condition, and in particular pulmonary hypertension.

Accordingly, in a third aspect of the invention, there is provided an antibody or an antigen-binding fragment thereof according to the first or second aspect, for use in therapy.

In a fourth aspect of the invention, there is provided an antibody or an antigen-binding fragment thereof according to the first or second aspect, for use in treating, preventing or ameliorating a hypoxia-related condition.

According to a fifth aspect of the invention, there is provided a method of treating, preventing or ameliorating a hypoxia-related condition in a subject, the method comprising administering, or having administered, to a patient in need of such treatment, a therapeutically effective amount of an antibody or antigen-binding fragment thereof according to the first or second aspect.

The hypoxia-related condition may be selected from the group consisting of: ischemic-reperfusion injury (IRI), cardiovascular disease, ischemic heart disease, ischemic brain condition, macular degeneration, ocular ischemic syndrome, ischemic optic neuropathy (ION), diabetic retinopathy, arthritis, inflammation, sepsis, sepsis-induced shock, renal disease, tissue fibrosis, gastrointestinal disease, neurodegenerative disease, respiratory distress syndrome, bronchopulmonary dysplasia, pulmonary hypertension, hypoxic pulmonary hypertension, severe pulmonary hypertension, COPD, idiopathic pulmonary fibrosis (IPF), diabetic retinopathy, diabetes, corneal neovascularization, pathogenic blood vessel growth, cancer and musculoskeletal disorder.

The inventors have demonstrated that the hypoxic core of tumours is a site of hypoxia-stimulated neoangiogenesis (Zhao et al 2015, The zinc transporter, ZIP12, regulates the pulmonary vascular response to chronic hypoxia, Nature, Vol:524, ISSN:0028-0836, Pages:356-360) and hypoxia is known as a universal hallmark of tumours and contributes towards resistance to radiation and chemotherapy. Thus, ZIP12, which the inventors have demonstrated to be upregulated in hypoxic conditions and is a key factor in disease progression, has been identified an as an ideal therapeutic target for cancer by the inventors. Inhibition of ZIP12 in the tumour microenvironment may restrict blood supply to the tumour and therefore restrict tumour growth and/or induce hypoxic tumour cell death.

Thus, in one embodiment, the hypoxia-related condition is cancer.

Preferably, the use or method in treating, preventing or ameliorating cancer comprises inhibiting angiogenesis. Preferably, the use or method comprises restricting blood supply to the tumour.

However, preferably, the hypoxia-related condition is pulmonary hypertension. Most preferably, the hypoxia-related condition is hypoxic pulmonary hypertension.

It will be appreciated that antibodies, fragments thereof according to the invention (collectively referred to herein as "agents") may be used in a monotherapy (e.g. the use of an antibody or antigen binding fragment thereof alone), for treating, ameliorating or preventing hypoxia-related condition, and preferably pulmonary hypertension. Alternatively, agents according to the invention may be used as an adjunct to, or in combination with, known therapies for treating, ameliorating, or preventing hypoxia-related condition, preferably pulmonary hypertension, such as anticoagulants such as warfarin, diuretics, digoxin, endothelin receptor antagonists such as bosentan, ambrisentan and macitentan, phosphodiesterase 5 inhibitors such as sildenafil and tadalafil, prostaglandins such as epoprostenol, iloprost and treprostinil, soluble guanylate cyclase stimulators such as riociguat and calcium channel blockers nifedipine, diltiazem, nicardipine and amlodipine.

The agents according to the invention may be combined in compositions having a number of different forms depending, in particular, on the manner in which the composition is to be used.

Thus, for example, the composition may be in the form of a powder, tablet, capsule, liquid, ointment, cream, gel, hydrogel, aerosol, spray, micellar solution, transdermal patch, liposome suspension or any other suitable form that may be administered to a person or animal in need of treatment. It will be appreciated that the vehicle of medicaments according to the invention should be one which is well-tolerated by the subject to whom it is given.

Medicaments comprising agents of the invention may be used in a number of ways. For instance, oral administration may be required, in which case the agents may be contained within a composition that may, for example, be ingested orally in the form of a tablet, capsule or liquid. Compositions comprising agents and medicaments of the invention may be administered by inhalation (e.g. intranasally). Compositions may also be formulated for topical use. For instance, creams or ointments may be applied to the skin.

Agents and medicaments according to the invention may also be incorporated within a slow- or delayed-release device. Such devices may, for example, be inserted on or under the skin, and the medicament may be released over weeks or even months. The device may be located at least adjacent the treatment site. Such devices may be particularly advantageous when long-term treatment with agents used according to the invention is required and which would normally require frequent administration (e.g. at least daily injection).

In a preferred embodiment, agents and medicaments according to the invention may be administered to a subject by injection into the blood stream or directly into a site requiring treatment. Injections may be intravenous (bolus or infusion) or subcutaneous (bolus or infusion), or intradermal (bolus or infusion).

It will be appreciated that the amount of the antibodies and fragments (i.e. agent) that is required is determined by its biological activity and bioavailability, which in turn depends on the mode of administration, the physiochemical properties of the agent, and whether it is being used as a monotherapy or in a combined therapy. The frequency of administration will also be influenced by the half-life of the agent within the subject being treated. Optimal dosages to be administered may be determined by those skilled in the art, and will vary with the particular agent in use, the strength of the pharmaceutical composition, the mode of administration, and the advancement of the pulmonary hypertension. Additional factors depending on the particular subject being treated will result in a need to adjust dosages, including subject age, weight, gender, diet, and time of administration.

Generally, a daily dose of between 0.01 µg/kg of body weight and 100 mg/kg of body weight of agent according to the invention may be used for treating, ameliorating, or preventing the condition, such as pulmonary hypertension, depending upon which agent. More preferably, the daily dose of agent is between 11 □g/kg of body weight and 100 mg/kg of body weight, more preferably between 10□g/kg and □□mg/kg body weight, and most preferably between approximately 100 □g/kg and 10 mg/kg body weight.

The agents may be administered before, during or after onset of pulmonary hypertension. Daily doses may be given as a single administration (e.g. a single daily injection). Alternatively, the agents may require administration twice or more times during a day. As an example, agents may be administered as two (or more depending upon the severity of the pulmonary hypertension being treated) daily doses of between 0.07 □g and 700 mg (i.e. assuming a body weight of 70 kg). A patient receiving treatment may take a first dose upon waking and then a second dose in the evening (if on a two dose regime) or at 3- or 4-hourly intervals thereafter. Alternatively, a slow release device may be used to provide optimal doses of agents according to the invention to a patient without the need to administer repeated doses. Known procedures, such as those conventionally employed by the pharmaceutical industry (e.g. in vivo experimentation, clinical trials, etc.), may be used to form specific formulations of the agents according to the invention and precise therapeutic regimes (such as daily doses of the agents and the frequency of administration).

In a sixth aspect of the invention, there is provided a pharmaceutical composition comprising an antibody or antigen-binding fragment thereof according to the first or second aspect, and optionally a pharmaceutically acceptable vehicle.

The pharmaceutical composition is preferably anti-hypertensive, i.e. a pharmaceutical formulation used in the therapeutic amelioration, prevention or treatment of pulmonary hypertension.

The invention also provides in a seventh aspect, a process for making the pharmaceutical composition according to the sixth aspect, the process comprising combining a therapeutically effective amount of an antibody or antigen-binding fragment thereof as defined in the first or second aspect, with a pharmaceutically acceptable vehicle.

The antibody or antigen-binding fragment thereof may be as defined with respect to the first or second aspect.

A "subject" may be a vertebrate, mammal, or domestic animal. Hence, medicaments according to the invention may be used to treat any mammal, for example livestock (e.g. a horse), pets, or may be used in other veterinary applications. Most preferably, the subject is a human being.

A "therapeutically effective amount" of the antibody or antigen-binding fragment thereof is any amount which, when administered to a subject, is the amount of agent that is needed to treat the pulmonary hypertension, or produce the desired effect.

For example, the therapeutically effective amount of antibody or fragment thereof used may be from about 0.1 ng/kg to about 100 mg/kg, and preferably from about 1 ng/kg to about 10 mg/kg.

It is preferred that the amount of antibody or fragment is an amount from about 10 ng/kg to about 10 mg/kg, and most preferably from about 50 ng/kg to about 5 mg/kg.

A "pharmaceutically acceptable vehicle" as referred to herein, is any known compound or combination of known compounds that are known to those skilled in the art to be useful in formulating pharmaceutical compositions.

In one embodiment, the pharmaceutically acceptable vehicle may be a solid, and the composition may be in the form of a powder or tablet. A solid pharmaceutically acceptable vehicle may include one or more substances which may also act as flavouring agents, lubricants, solubilisers, suspending agents, dyes, fillers, glidants, compression aids, inert binders, sweeteners, preservatives, dyes, coatings, or tablet-disintegrating agents. The vehicle may also be an encapsulating material. In powders, the vehicle is a finely divided solid that is in admixture with the finely divided active agents according to the invention. In tablets, the active agent may be mixed with a vehicle having the necessary compression properties in suitable proportions and compacted in the shape and size desired. The powders and tablets preferably contain up to 99% of the active agents. Suitable solid vehicles include, for example calcium phosphate, magnesium stearate, talc, sugars, lactose, dextrin, starch, gelatin, cellulose, polyvinylpyrrolidine, low melting waxes and ion exchange resins. In another embodiment, the pharmaceutical vehicle may be a gel and the composition may be in the form of a cream or the like.

However, the pharmaceutical vehicle may be a liquid, and the pharmaceutical composition is in the form of a solution. Liquid vehicles are used in preparing solutions, suspensions, emulsions, syrups, elixirs and pressurized compositions. The active agent according to the invention may be dissolved or suspended in a pharmaceutically acceptable liquid vehicle such as water, an organic solvent, a mixture of both or pharmaceutically acceptable oils or fats. The liquid vehicle can contain other suitable pharmaceutical additives such as solubilisers, emulsifiers, buffers, preservatives, sweeteners, flavouring agents, suspending agents, thickening agents, colours, viscosity regulators, stabilizers or osmo-regulators. Suitable examples of liquid vehicles for oral and parenteral administration include water (partially containing additives as above, e.g. cellulose derivatives, preferably sodium carboxymethyl cellulose solution), alcohols (including monohydric alcohols and polyhydric alcohols, e.g. glycols) and their derivatives, and oils (e.g. fractionated coconut oil and arachis oil). For parenteral administration, the vehicle can also be an oily ester such as ethyl oleate and isopropyl myristate. Sterile liquid vehicles are useful in sterile liquid form compositions for parenteral administration. The liquid vehicle for pressurized compositions can be a halogenated hydrocarbon or other pharmaceutically acceptable propellant.

Liquid pharmaceutical compositions, which are sterile solutions or suspensions, can be utilized by, for example, intramuscular, intrathecal, epidural, intraperitoneal, intravenous and particularly subcutaneous injection. The agent may be prepared as a sterile solid composition that may be dissolved or suspended at the time of administration using sterile water, saline, or other appropriate sterile injectable medium.

The agents and compositions of the invention may be administered orally in the form of a sterile solution or suspension containing other solutes or suspending agents (for example, enough saline or glucose to make the solution isotonic), bile salts, acacia, gelatin, sorbitan monoleate, polysorbate 80 (oleate esters of sorbitol and its anhydrides copolymerized with ethylene oxide) and the like. The agents used according to the invention can also be administered orally either in liquid or solid composition form. Compositions suitable for oral administration include solid forms, such as pills, capsules, granules, tablets, and powders, and liquid forms, such as solutions, syrups, elixirs, and suspensions. Forms useful for parenteral administration include sterile solutions, emulsions, and suspensions.

The invention also extends to methods for producing the antibody of the first or second aspect, and antibodies so produced.

In an eighth aspect, there is provided an antibody or antigen-binding fragment thereof obtained by a method comprising:—
 (i) immunising a host organism with a ZIP12 extracellular epitope comprising or consisting of SEQ ID No: 252 or SEQ ID No:1, or a variant or fragment thereof; and
 (ii) collecting an antibody or antigen-binding fragment thereof from the host.

The host may be a mammal, and may be a human, rabbit or mouse.

The epitope may be linear or conformational. The epitope may be denatured or folded. Preferably, however, a folded epitope is used to immunise the host.

Preferably, the method comprises bleeding the host animal, and then preferably collecting the antibody or antigen-binding fragment thereof from the blood, most preferably blood serum. Preferably, the blood serum is passed through a gravity column with covalently bound peptide-support. Following washing, the antibody or antigen-binding fragment thereof is preferably eluted in buffer, which is preferably acidic buffer, and the solution may then be neutralized. The method may further comprise dialysis against a suitable buffer (e.g. PBS) and, optionally, lyophilisation.

In a ninth aspect of the invention, there is provided a polynucleotide sequence encoding the antibody or antigen binding fragment thereof as defined in the first or second aspect.

In a tenth aspect of the invention, there is provided an expression cassette comprising a polynucleotide sequence according to the ninth aspect.

The polynucleotide sequence encoding the antibody or antigen binding fragment thereof of the invention is preferably harboured in a recombinant vector, for example a recombinant vector for delivery into a host cell of interest to enable production of the antibody or antigen binding fragment thereof.

Accordingly, in an eleventh aspect of the invention, there is provided a recombinant vector comprising the expression cassette according to the tenth aspect.

The vector encoding the antibody or antigen binding fragment thereof of the first or second aspect may for example be a plasmid, cosmid or phage and/or be a viral vector. Such recombinant vectors are highly useful in the delivery systems of the invention for transforming cells with the nucleotide sequences. The nucleotide sequences may preferably be a DNA sequence, and it is this DNA sequence which encodes the antibody or antigen binding fragment thereof sequence forming the antibody or antigen binding fragment thereof of the first or second aspect.

Recombinant vectors encoding the antibody or antigen binding fragment thereof of the first or second aspect may also include other functional elements. For example, they may further comprise a variety of other functional elements including a suitable promoter for initiating transgene expression upon introduction of the vector in a host cell. For instance, the vector is preferably capable of autonomously replicating in the nucleus of the host cell. In this case, elements which induce or regulate DNA replication may be required in the recombinant vector. Alternatively, the recombinant vector may be designed such that it integrates into the genome of a host cell. In this case, DNA sequences which favour targeted integration (e.g. by homologous recombination) are envisaged. Suitable promoters may include the SV40 promoter, CMV, EF1a, PGK, viral long terminal repeats, as well as inducible promoters, such as the Tetracycline inducible system, as examples. The cassette or vector may also comprise a terminator, such as the Beta globin, SV40 polyadenylation sequences or synthetic polyadenylation sequences. The recombinant vector may also comprise a promoter or regulator or enhancer to control expression of the nucleic acid as required.

The vector may also comprise DNA coding for a gene that may be used as a selectable marker in the cloning process, i.e. to enable selection of cells that have been transfected or transformed, and to enable the selection of cells harbouring vectors incorporating heterologous DNA. For example, ampicillin, neomycin, puromycin or chloramphenicol resistance is envisaged. Alternatively, the selectable marker gene may be in a different vector to be used simultaneously with the vector containing the transgene. The cassette or vector may also comprise DNA involved with regulating expression of the nucleotide sequence, or for targeting the expressed polypeptide to a certain part of the host cell.

Purified vector may be inserted directly into a host cell by suitable means, e.g. direct endocytotic uptake. The vector may be introduced directly into a host cell (e.g. a eukaryotic or prokaryotic cell) by transfection, infection, electroporation, microinjection, cell fusion, protoplast fusion, calcium phosphate, cationic lipid-based lipofection, polymer or dendrimer-based methods or ballistic bombardment. Alternatively, vectors of the invention may be introduced directly into a host cell using a particle gun.

Alternatively, the delivery system may provide the polynucleotide to the host cell without it being incorporated in a vector. For instance, the nucleic acid molecule may be incorporated within a liposome or virus particle. Alternatively a "naked" polynucleotide may be inserted into a host cell by a suitable means e.g. direct endocytotic uptake.

In a twelfth aspect of the invention, there is provided a host cell comprising the polynucleotide sequence according to the ninth aspect, the expression cassette according to the tenth aspect, or the vector according to the eleventh aspect.

The host cell may be a eukaryotic or prokaryotic host cell. Preferably, the host cell is a eukaryotic host cell. More preferably, the host cell is a mammalian host cell such as NS0 murine myeloma cells, PER.C6® human cells, Human embryonic kidney 293 cells or Chinese hamster ovary (CHO) cells. Most preferably, the host cell is a CHO cell.

In a thirteenth aspect, there is provided a method of preparing the antibody or antigen binding fragment according to the first or second aspect, the method comprising:

a) introducing, into a host cell, the vector of the eleventh aspect; and b) culturing the host cell under conditions to result in the production of the antibody or antigen binding fragment according to the first or second aspect.

The host cell of step a) may be a eukaryotic or prokaryotic host cell. Preferably, the host cell is a eukaryotic host cell. More preferably, the host cell is a mammalian host cell such as NS0 murine myeloma cells, PER.C6® human cells, Human embryonic kidney 293 cells or Chinese hamster ovary (CHO) cells. Most preferably, the host cell is a CHO cell.

The method may further comprise (c) harvesting, centrifuging and/or filtering the cell culture media to obtain a cell culture supernatant comprising the antibody or antigen binding fragment thereof.

The method may further comprise (d) separating and purifying the antibody or antigen binding fragment thereof from the cell culture supernatant. Preferably, purification is performed by at least one chromatographic step.

Suitable chromatographic steps include affinity chromatography and/or ion exchange chromatography. Preferably, affinity chromatography is protein A chromatography. Ion exchange chromatography may be anionic exchange chromatography and/or cationic exchange chromatography.

Preferably, step (d) comprises separating and purifying the antibody or antigen binding fragment thereof from the cell culture supernatant by:

i) protein A chromatography;
ii) anionic exchange chromatography; and/or
iii) cationic exchange chromatography.

The method may further comprise (e) filtering the purified antibody or antigen binding fragment thereof resulting from step (d). Preferably, step (e) comprises virus filtration. Thus, preferably the purified antibody or antigen binding fragment thereof resulting from step (d) is filtered using a virus filtration membrane. Suitable membranes would be known to those skilled in the art.

As discussed herein, ZIP12 expression is increased in many cell types, including endothelial, smooth muscle and interstitial cells, in the remodelled pulmonary arterioles of rats, cows and humans susceptible to hypoxia-induced pulmonary hypertension. Thus, given that the antibodies of the invention are able to bind to the ZIP12 extracellular epitope comprising or consisting of SEQ ID No: 252 and/or SEQ ID No:1 or a variant or fragment thereof, the antibodies or antigen-binding fragments thereof may be used as a robust diagnostic tool by detecting the presence, and determining the concentration of, ZIP12.

Thus, in a fourteenth aspect, there is provided the antibody or antigen-binding fragment of according to the first or second aspect, for use in diagnosis or prognosis.

According to a fifteenth aspect of the invention, there is provided the antibody or antigen-binding fragment of according to the first or second aspect, for use in diagnosing or prognosing a hypoxia-related condition.

According to a sixteenth aspect, there is provided a method of diagnosing or prognosing a hypoxia-related condition in a subject, the method comprising detecting ZIP12 in a biological sample obtained from the subject with the antibody or antigen-binding fragment of according to the first or second aspect.

Preferably, the hypoxia-related condition is selected from the group consisting of: ischemic-reperfusion injury (IRI), cardiovascular disease, ischemic heart disease, ischemic brain condition, macular degeneration, ocular ischemic syndrome, ischemic optic neuropathy (ION), diabetic retinopathy, arthritis, inflammation, sepsis, sepsis-induced shock, renal disease, tissue fibrosis, gastrointestinal disease, neurodegenerative disease, respiratory distress syndrome, bronchopulmonary displasia, pulmonary hypertension, hypoxic pulmonary hypertension, severe pulmonary hypertension, COPD, idiopathic pulmonary fibrosis (IPF), diabetic retinopathy, diabetes, corneal neovascularization, pathogenic blood vessel growth and musculoskeletal disorder.

Preferably, the hypoxia-related condition is cancer or pulmonary hypertension. Most preferably, hypoxia-related condition is pulmonary hypertension.

The method may be an in vitro or ex vivo method. Preferably, the method is an in vitro method.

The use or method may comprise determining the level of expression of ZIP12 in a subject, preferably wherein an increase in the concentration of ZIP12 in the biological sample when compared to a reference concentration from a healthy control population is indicative of pulmonary hypertension or a poor prognosis.

In one embodiment, the presence of ZIP12 in the lung may be considered indicative of pulmonary hypertension or a poor prognosis. The presence of ZIP12 may be detected by immunocytochemistry.

In one embodiment, a 1 fold increase of ZIP12 when compared to the reference from a healthy control population is indicative of pulmonary hypertension or a poor prognosis. In one embodiment, a 2 fold, 3 fold, 4 fold or 5 fold increase of ZIP12 when compared to the reference from a healthy control population is indicative of pulmonary hypertension or a poor prognosis. In one embodiment, a 10 fold, 50 fold or 100 fold increase of ZIP12 when compared to the reference from a healthy control population is indicative of pulmonary hypertension or a poor prognosis.

According to a seventeenth aspect of the invention, there is provided a kit for diagnosing a subject suffering from a hypoxia-related condition, or for providing a prognosis of the subject's condition, the kit comprising an antibody or antigen-binding fragment thereof according to the first or second aspect for detecting ZIP12 in a sample from a test subject.

The kit may further comprise instructions for use and/or a receptacle for obtaining a biological sample from a subject.

Preferably, the hypoxia-related condition is as defined herein, and is preferably pulmonary hypertension.

Prognosis may relate to determining the therapeutic outcome in a subject that has been diagnosed with pulmonary hypertension. Prognosis may relate to predicting the rate of progression or improvement and/or the duration of pulmonary hypertension in a subject, the probability of survival, and/or the efficacy of various treatment regimes. Thus, a poor prognosis may be indicative of pulmonary hypertension progression, low probability of survival and reduced efficacy of a treatment regime. A favourable prognosis may be indicative of pulmonary hypertension resolution, high probability of survival and increased efficacy of a treatment regime.

Preferably, the sample comprises a biological sample. The sample may be any material that is obtainable from a subject from which protein is obtainable.

The biological sample may be tissue or a biological fluid. The biological sample may be any material that is obtainable from the subject from which endothelial, smooth muscle and/or interstitial cells are obtainable. Furthermore, the sample may be blood, plasma, serum, spinal fluid, urine, sweat, saliva, tears, breast aspirate, breast milk, prostate fluid, seminal fluid, vaginal fluid, stool, cervical scraping, cytes, amniotic fluid, intraocular fluid, mucous, moisture in breath, animal tissue, cell lysates, tumour tissue, hair, skin, buccal scrapings, lymph, interstitial fluid, nails, bone marrow, cartilage, prions, bone powder, ear wax, lymph, granuloma, cancer biopsy or combinations thereof.

The sample may be a liquid aspirate. For example, the sample may be bronchial alveolar lavage (BAL), ascites, pleural lavage, or pericardial lavage.

The sample may comprise blood, urine, tissue etc. In one preferred embodiment, the biological sample comprises a blood sample. The blood may be venous or arterial blood. Blood samples may be assayed immediately. Alternatively, the blood sample may be stored at low temperatures, for example in a fridge or even frozen before the method is conducted. Alternatively, the blood sample may be stored at room temperature, for example between 18 to 22 degrees Celsius, before the method is conducted. The blood sample may comprise comprises blood serum. The blood sample may comprise blood plasma. Preferably, however the detection is carried out on whole blood and most preferably the blood sample is peripheral blood.

The blood may be further processed before it is contacted with the antibody of the invention. For instance, an anticoagulant, such as citrate (such as sodium citrate), hirudin, heparin, PPACK, or sodium fluoride may be added. Thus, the sample collection container may contain an anticoagulant in order to prevent the blood sample from clotting.

Preferably, the sample may comprise an endothelial, smooth muscle and/or interstitial cell, preferably a pulmonary endothelial, smooth muscle and/or interstitial cell.

It will be appreciated that the invention extends to any nucleic acid or peptide or variant, derivative or analogue thereof, which comprises substantially the amino acid or nucleic acid sequences of any of the sequences referred to herein, including variants or fragments thereof. The terms "substantially the amino acid/nucleotide/peptide sequence", "variant" and "fragment", can be a sequence that has at least 40% sequence identity with the amino acid/nucleotide/peptide sequences of any one of the sequences referred to herein, for example 40% identity with any of the sequence identified herein.

Amino acid/polynucleotide/polypeptide sequences with a sequence identity which is greater than 65%, more preferably greater than 70%, even more preferably greater than 75%, and still more preferably greater than 80% sequence identity to any of the sequences referred to are also envisaged. Preferably, the amino acid/polynucleotide/polypeptide sequence has at least 85% identity with any of the sequences referred to, more preferably at least 90% identity, even more preferably at least 92% identity, even more preferably at least 95% identity, even more preferably at least 97% identity, even more preferably at least 98% identity and, most preferably at least 99% identity with any of the sequences referred to herein.

The skilled technician will appreciate how to calculate the percentage identity between two amino acid/polynucleotide/polypeptide sequences. In order to calculate the percentage identity between two amino acid/polynucleotide/polypeptide sequences, an alignment of the two sequences must first be prepared, followed by calculation of the sequence identity value. The percentage identity for two sequences may take different values depending on: —(i) the method used to align the sequences, for example, ClustalW, BLAST, FASTA, Smith-Waterman (implemented in different programs), or structural alignment from 3D comparison; and (ii) the parameters used by the alignment method, for example, local vs global alignment, the pair-score matrix used (e.g. BLOSUM62, PAM250, Gonnet etc.), and gap-penalty, e.g. functional form and constants.

Having made the alignment, there are many different ways of calculating percentage identity between the two sequences. For example, one may divide the number of identities by: (i) the length of shortest sequence; (ii) the length of alignment; (iii) the mean length of sequence; (iv) the number of non-gap positions; or (v) the number of equivalenced positions excluding overhangs. Furthermore, it will be appreciated that percentage identity is also strongly length dependent. Therefore, the shorter a pair of sequences is, the higher the sequence identity one may expect to occur by chance.

Hence, it will be appreciated that the accurate alignment of protein or DNA sequences is a complex process. The popular multiple alignment program ClustalW (Thompson et al., 1994, Nucleic Acids Research, 22, 4673-4680; Thompson et al., 1997, Nucleic Acids Research, 24, 4876-4882) is a preferred way for generating multiple alignments of proteins or DNA in accordance with the invention. Suitable parameters for ClustalW may be as follows: For DNA alignments: Gap Open Penalty=15.0, Gap Extension Penalty=6.66, and Matrix=Identity. For protein alignments: Gap Open Penalty=10.0, Gap Extension Penalty=0.2, and Matrix=Gonnet. For DNA and Protein alignments: END-GAP=-1, and GAPDIST=4. Those skilled in the art will be aware that it may be necessary to vary these and other parameters for optimal sequence alignment.

Preferably, calculation of percentage identities between two amino acid/polynucleotide/polypeptide sequences may then be calculated from such an alignment as (N/T)*100, where N is the number of positions at which the sequences share an identical residue, and T is the total number of positions compared including gaps and either including or excluding overhangs. Preferably, overhangs are included in the calculation. Hence, a most preferred method for calculating percentage identity between two sequences comprises (i) preparing a sequence alignment using the ClustalW program using a suitable set of parameters, for example, as set out above; and (ii) inserting the values of N and T into the following formula:— Sequence Identity=(N/T)*100.

Alternative methods for identifying similar sequences will be known to those skilled in the art. For example, a substantially similar nucleotide sequence will be encoded by a sequence which hybridizes to DNA sequences or their complements under stringent conditions. By stringent conditions, the inventors mean the nucleotide hybridises to filter-bound DNA or RNA in 3× sodium chloride/sodium citrate (SSC) at approximately 45° C. followed by at least one wash in 0.2×SSC/0.1% SDS at approximately 20-65° C. Alternatively, a substantially similar polypeptide may differ by at least 1, but less than 5, 10, 20, 50 or 100 amino acids from any of the sequences described herein.

Due to the degeneracy of the genetic code, it is clear that any nucleic acid sequence described herein could be varied or changed without substantially affecting the sequence of the protein encoded thereby, to provide a functional variant thereof. Suitable nucleotide variants are those having a sequence altered by the substitution of different codons that encode the same amino acid within the sequence, thus producing a silent (synonymous) change. Other suitable variants are those having homologous nucleotide sequences but comprising all, or portions of, sequence, which are altered by the substitution of different codons that encode an amino acid with a side chain of similar biophysical properties to the amino acid it substitutes, to produce a conservative change. For example, small non-polar, hydrophobic amino acids include glycine, alanine, leucine, isoleucine, valine, proline, and methionine. Large non-polar, hydrophobic amino acids include phenylalanine, tryptophan and tyrosine. The polar neutral amino acids include serine, threonine, cysteine, asparagine and glutamine. The positively charged (basic) amino acids include lysine, arginine and histidine. The negatively charged (acidic) amino acids include aspartic acid and glutamic acid. It will therefore be appreciated which amino acids may be replaced with an amino acid having similar biophysical properties, and the skilled technician will know the nucleotide sequences encoding these amino acids.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

FIG. 1 shows an affinity maturation strategy used in the development of embodiments of antibodies described herein (Rajpal et al., 2005, PNAS 102:24 8466-8471). Nine amino acids were selected, i.e. alanine, serine, histidine, leucine, proline, tyrosine, aspartic acid, glutamine and lysine, which were substituted at each CDR residue. The heavy variable chain (VH) and light variable chain (VL) are also shown, with their respect CDRs highlighted in the boxes, i.e. CDR-H1, CDR-H2, CDR-H3, and CDR-L1, CDR-L2 and CDR-L3.

FIG. 2 shows the results of screening of 51B12-parent VH-CDR mutant production supernatants in HTRF and ELISA assays. Diluted production supernatants were tested. For ELISA, antibody binding was detected with anti-human-IgG-HRP and visualized with TMB. Reactivity data were plotted on an x-axis from left to right based on position in CDR and sorted alphabetically within CDR residue positions (n=8 or 9 mutants per CDR residue). The dashed line shows the average HTRF signal of the 51B12-parent antibody.

FIG. 3 shows the results of screening of 51B12-parent VL-CDR mutant production supernatants in HTRF and ELISA assays. Diluted production supernatants were tested. For ELISA, antibody binding was detected with anti-human-IgG-HRP and visualized with TMB. Reactivity data were plotted on an x-axis from left to right based on position in CDR and sorted alphabetically within CDR residue positions (n=8 or 9 mutants per CDR residue). The dashed line shows the average HTRF signal of the 51B12-parent antibody.

FIG. 6 shows the data for single cycle kinetic screen using 3.12 nM-800 nM huZIP12-ECD-GST.

FIG. 7 shows the data for single cycle kinetic screen of selected variants using 2.34 nM-600 nM huZIP12-ECD-GST.

FIG. 9a is a table summarising the six CDR, VH and VL sequences of the "51B12-parent" antibody. FIG. 9b is a table summarising the six CDR, VH and VL sequences of 26 different embodiments of the affinity matured antibodies described herein.

Figure 10B:
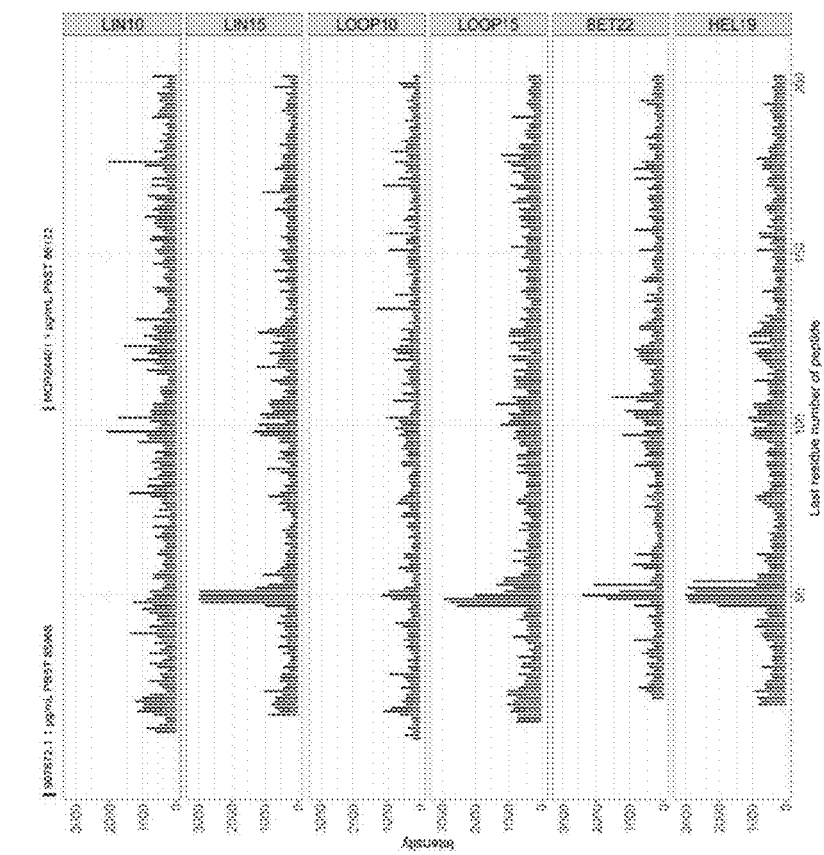
Figure 10A:
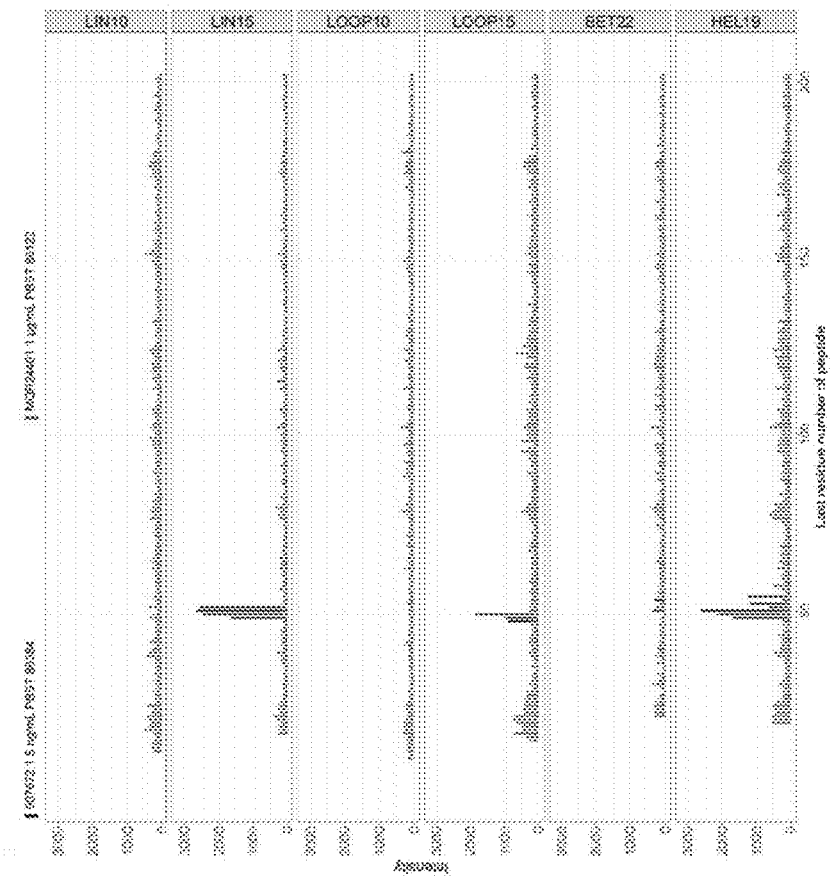
Figure 10C:
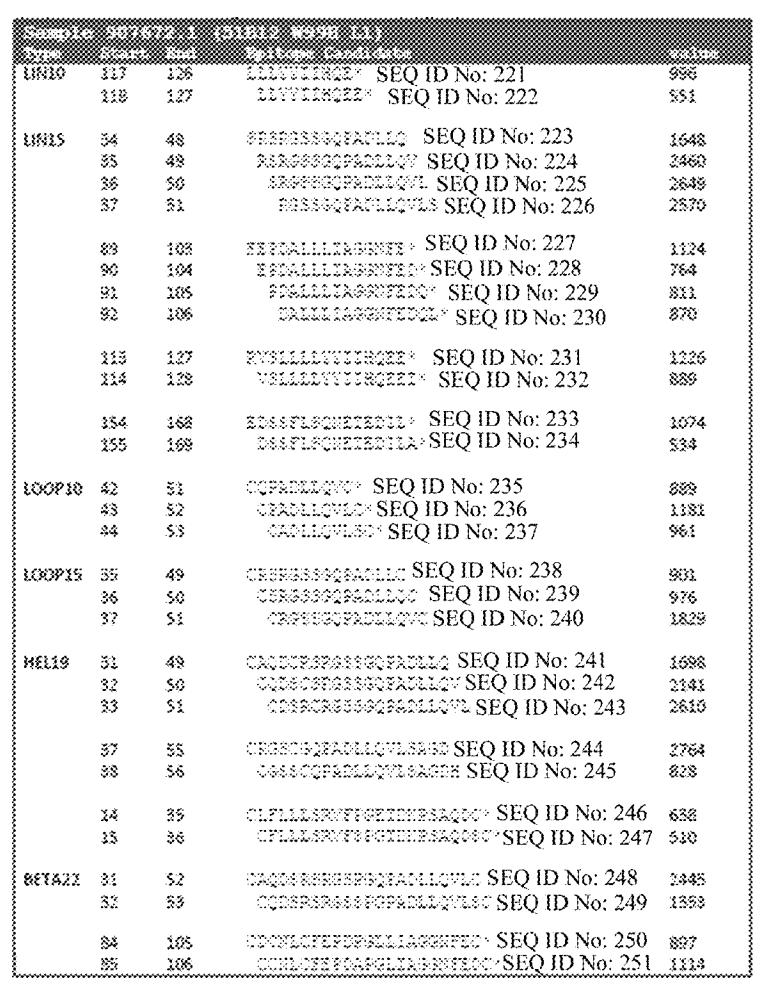

FIG. 10 shows epitope mapping of affinity matured 51B12 W99H_L1 (also referred to as H3_W99H_L1). FIG. 10a shows binding at low concentrations (5 ng/ml), and FIG. 10b shows binding at higher concentrations (1 ug/ml). FIG. 10c shows the list of epitope candidates for 51B12_W99H_L1.

Figure 11B:
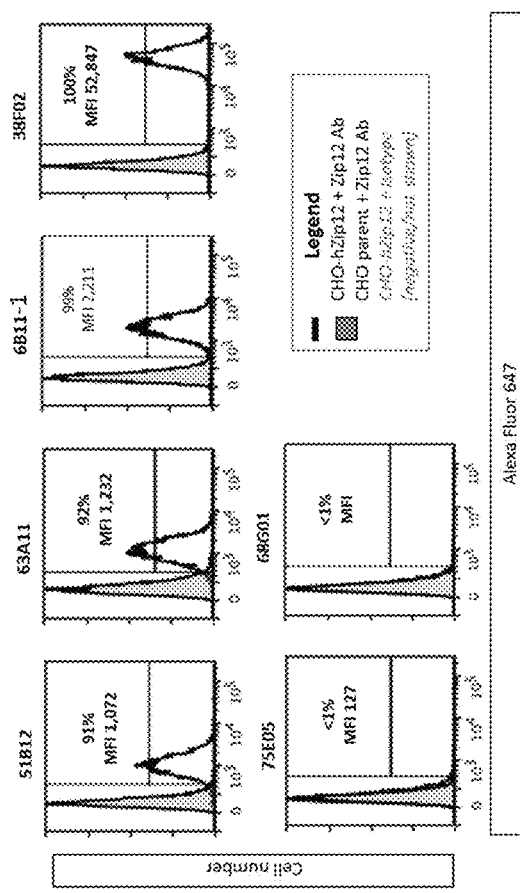

FIG. 11 shows the binding of antibodies 51B12, 63A11, 6B11, 38F02, 75E05 and 68G01 to CHO-K1 cells overexpressing ZIP12 (FIG. 1a), and the internalization of antibodies 51B12 and 63A11 when measured by using direct conjugation (FIG. 11b).

Figures 12, 13:
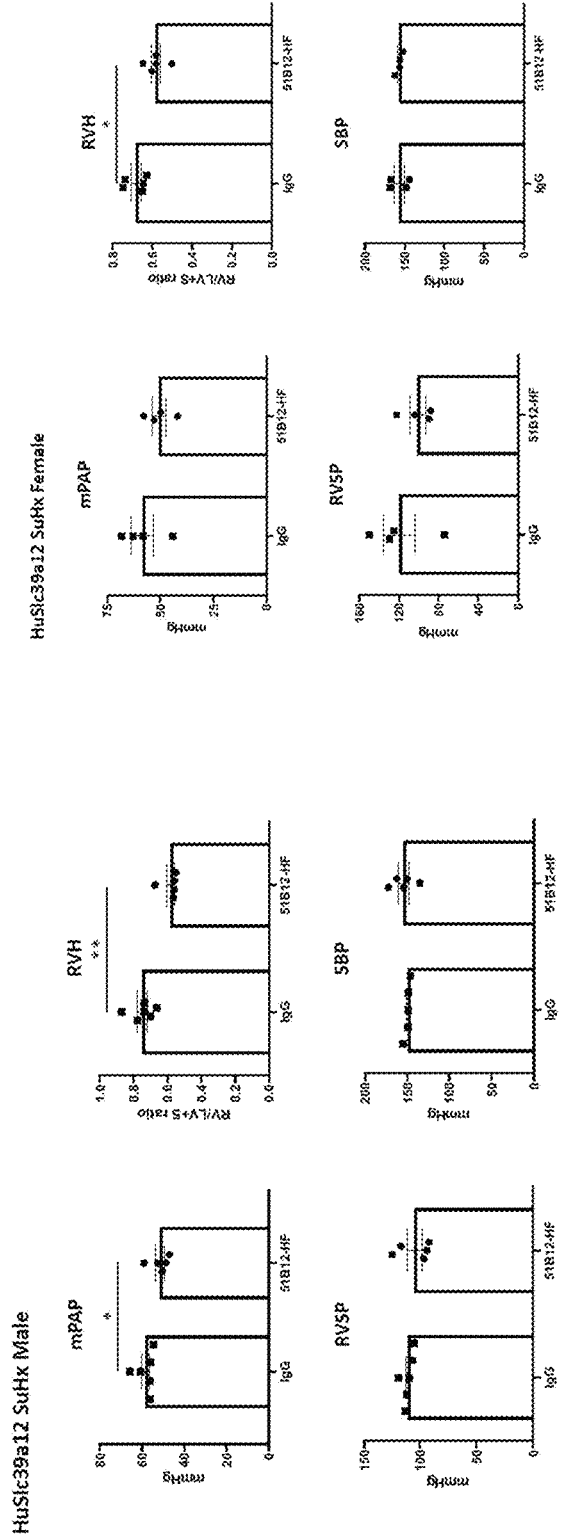

FIG. 12 shows the average data for the binding of 51B12_W99H_L1 to human, cynomolgus monkey, canina and porcine ZIP12-ECD-GST.

FIG. 13 shows a set of histograms that show the results from a Sugen model used to analyse the effect of dosing with 51B12_W99H_L1 on the reversal of pulmonary arterial hypertension pathology. Bars represent mean activity from six animals.

FIG. 14 shows the number of remodelled and occlusive vessels upon treatment with 51B12_W99H_L1 (FIG. 14a), and a representative image of remodelled and occlusive vessels, and their reversal, in the isotype control and the 51B12_W99H_L1 treatment groups (FIG. 14b).

EXAMPLES

ZIP12 has been implicated in the pathogenesis of pulmonary hypertension, with an increase in expression of ZIP12 associated with the condition. Therefore, the inventors set out to develop antibodies that are capable of specifically binding to and inhibiting the function of ZIP12, to provide improve the treatment and diagnosis of pulmonary hypertension. The inventors took a ZIP12-binding antibody referred to as 51B12 parent, and subjected it to affinity maturation in order to produce novel variants, which displayed improved characteristics compared to the parent.

Materials and Methods

Cloning and Expression
Cloning of 51B12 Affinity Matured Variants

The DNA expression constructs encoding the antibody were prepared de novo by build-up of overlapping oligonucleotides including restriction sites for cloning into mammalian expression vectors as well as a human signal sequence. HindIII and SpeI restriction sites were introduced to frame the VH domain containing the signal sequence for cloning into mammalian expression vectors containing the modified Fc null human γ 1 constant region. HindIII and BsiWI restriction sites were introduced to frame the VL domain containing the signal sequence for cloning into mammalian expression vector containing the human kappa constant region.

Expression of the Recombinant Antibodies (Including Antibody Quantification)

Expression plasmids encoding the heavy and light chains respectively were transiently co-transfected into HEK 293 6E cells and expressed at small scale to produce antibody. Antibodies were quantified by ELISA. ELISA plates were coated with anti human IgG (Sigma 13382) at 1 mg/ml and blocked with blocking solution (4% BSA in Tris buffered saline). Various dilutions of the tissue culture supernatants were added and the plate was incubated for 1 hour at room temperature. Dilutions of a known standard antibody were also added to the plate. The plate was washed in TBST and binding was detected by the addition of a peroxidise labelled anti human kappa light chain antibody (Sigma A71 64) at a dilution of 1/1 000 in blocking solution. The plate was incubated for 1 hour at room temp before washing in TBST. The plate was developed by addition of OPD substrate (Sigma P9187) and colour development stopped by addition of 2M H2S04. Absorbance was measured at 490 nm and a standard curve plotted using data for the known standard dilutions. The standard curve was used to estimate the concentration of antibody in the tissue culture supernatants. Larger scale antibody preparations were purified using protein A and concentrations were measured using a Nanodrop (Thermo Scientific).

Assays

Elisa Experiment Showing Binding of ZIP12 Antibodies to Recombinant Human ZIP12 Protein hZIP12-ECD-GST (5 µg/ml) was coated on ELISA plates, blocked and incubated with semi-log dilution series of antibody. Antibody binding was detected using anti-human IgG-HRP and TMB. Protein coating was validated using anti-ZIP12 and incubation with anti-rabbit IgG-HRP and TMB staining.

Htrf Experiment Showing Competition for Recombinant Human ZIP12 Protein Between Parent and Affinity Matured Antibodies Homogeneous Time Resolved Fluorescence (HTRF) assays were used to analyse the antibodies. A checkerboard assay was performed to validate the binding of the terbium labeled-antibody with hZIP12-ECD-GST. Serial dilutions (starting at 1000 ng/ml, semi-log dilutions) of Terbium-labeled 51B12-parent were incubated with serial dilutions of hZIP12-ECD-GST (starting at 5000 ng/ml, semi-log dilutions) followed by incubation with anti-GST-XL665. After excitation (320 nm), emission signals were obtained and HTRF ratio was calculated (665 nm/615 nm, Panel A). Signal/background ratios (S/B) were calculated from the HTRF ratios (0 ng/ml hZIP12-ECD-GST as background signal) and plotted against the Tb-51B12-parent concentration. The combinations 500 ng/ml hZIP12-ECD-GST+50 ng Tb-Ab, 150 ng/ml hZIP12-ECD-GST+50 ng Tb-Ab and 50 ng/ml hZIP12-ECD-GST+50 ng Tb-Ab were chosen as range for the competition assay. For the HTRF assay, 150 ng/ml hZIP12-ECD-GST+30 ng/ml Tb-51B12 was selected.

Spr Experiment—Single Cycle Kinetics

Single Cycle Kinetics (SCK) involves first capturing the mAb onto the protein A sensor surface and then sequentially injecting a series of concentrations of huZIP12-ECD-GST over the surface starting at the lowest concentration and ending with the highest concentration. The final concentration is followed by a dissociation phase where buffer only is passed across the surface followed by regeneration, where the remaining bound huZIP12-ECD-GST is removed from the surface by injection of a 10 mM Glycine pH 1.5 and 50 mM NaOH solution. The SCK is repeated for each monoclonal antibody providing duplicate data and the kinetics of each interaction is evaluated by the Biacore software.

The range of concentrations of huZIP12-ECD-GST to inject was selected based on the affinity of the control mAb established during the previous study.

The data for each mAb was examined. Ideally the concentration series of huZIP12-ECD-GST should reach ~80% saturation. Saturation was observed with some of the mAb samples at the top concentrations of huZIP12-ECD-GST tested. In those cases, the concentration series of huZIP12-ECD-GST was lowered to obtain optimal binding kinetic data.

The parental clone 51B12_VH_VL-par was screened as the positive control at the beginning of each cycle of SCK series and was included twice in duplicate throughout the 17-hour run to provide a measure of stability of the samples during the 17-hour run.

Epitope Mapping

A support with a hydrogel matrix was used to directly synthesise peptide sequences corresponding to sequences of the ZIP12 extracellular domain. This results in highly sensitive arrays and enables reliable detection of even the weakest binding signals. These immobilized peptide arrays are reusable and can be tested multiple times. This therefore permits screening of a series of antibodies or sera on a single array, making linear epitope mapping a fast and cost-effective option for best candidate selection, antibody characterization, antibody profiling and further development.

Example 1: Generation of Affinity Matured Variants

The inventors took a candidate parent antibody referred to as 51B12 parent (or 51B12 par), and subjected it to affinity maturation in order to produce novel variants or mutants, which were hoped to display improved characteristics compared to the parent.

Eight or nine mutants per CDR residue in the three heavy and light CDRs were designed as illustrated in FIG. 1 using methodology described in Rajpal et al., 2005. For variable heavy (VH) chain CDR variants, variable regions were synthesized and cloned into an expression vector containing an Fc null human IgG1. For variable light (VL) chain CDR variants, variable regions were synthesized and cloned into an expression vector containing a human kappa light chain constant region.

FIG. 9a sets out the amino acid sequences for each of CDR-H1, CDR-H2, CDR-H3, CDR-L1, CDR-L2, CDR-L3, VH and VL for the 51B12 parent. FIG. 9b shows a table summarising the sequences of 26 different embodiments of affinity matured antibodies derived from the 51B12 parent. The first row in the table represents the corresponding sequences for the affinity matured variant of the 51B12 parent, H3_W99H_L1, in which the CDR-H3 sequence is the same as that of the parent except for a W99H amino acid swap, and the CDR-L1 CDR is as shown. The second row in the table represents the corresponding sequences for the affinity matured variant of the 51B12 parent, H3_W99H_L2, in which the CDR-H3 sequence is the same as that of the parent except for a W99H amino acid swap, and the CDR-L2 CDR is as shown, and so on.

Example 2: Screening of the 51B12 Variants/Mutants

Figure 2:
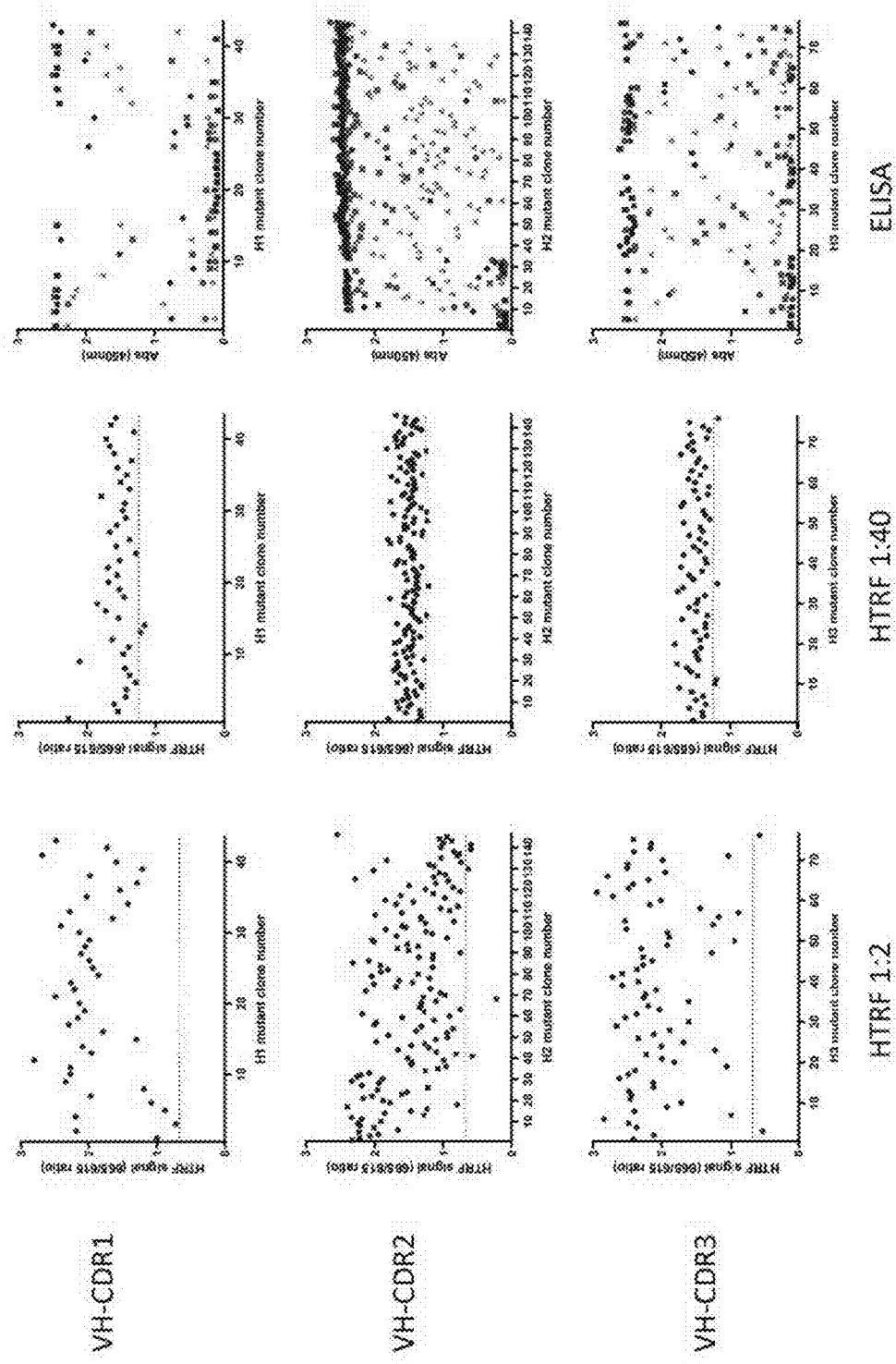
Figure 3:
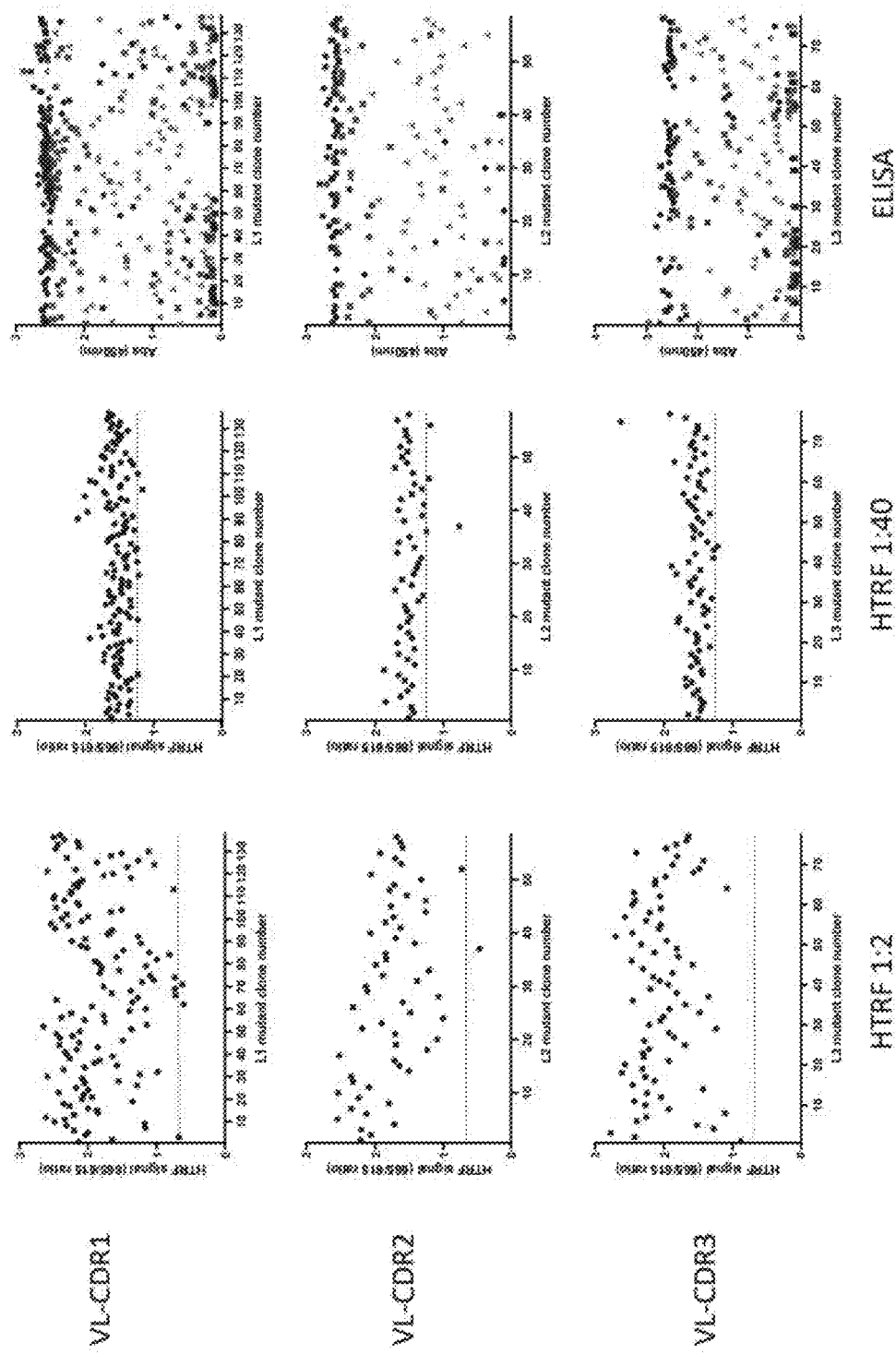

Referring to FIGS. 2 and 3, there are shown the results of screening of 51B12-parent VH-CDR (FIG. 2) and VL-CDR (FIG. 3) mutant production supernatants in HTRF and ELISA assays. Diluted production supernatants were tested. For ELISA, antibody binding was detected with anti-human-IgG-HRP and visualized with TMB. Reactivity data were plotted on an x-axis from left to right based on position in CDR and sorted alphabetically within CDR residue positions (n=8 or 9 mutants per CDR residue). The dashed line shows the average HTRF signal of the 51B12-parent antibody.

The screening demonstrated that amino acids G33, Y50, S53, W99, T100, Y103 and D106 in the heavy chain CDRs appeared to be especially important for target epitope recognition, because several clones with substitutions of these amino acids resulted in lost target recognition in ELISA and HTRF assay formats. Amino acids A24, V29, Y36, H94, S95 and P99 in the light chain CDRs also appeared to be especially important for target recognition, as several clones with substitutions of these amino acids again resulted in lost target recognition in ELISA and HTRF assay formats.

As a result of the extensive screening, 78 mutants were selected for dose response screening. This decision was based on experimental data from an HTRF-based antibody concentration analysis and an HTRF competition assay.

Example 3: Screening of 51B12 Variants/Mutants in a Dose Response HTRF Assay

Figures 4, 5:
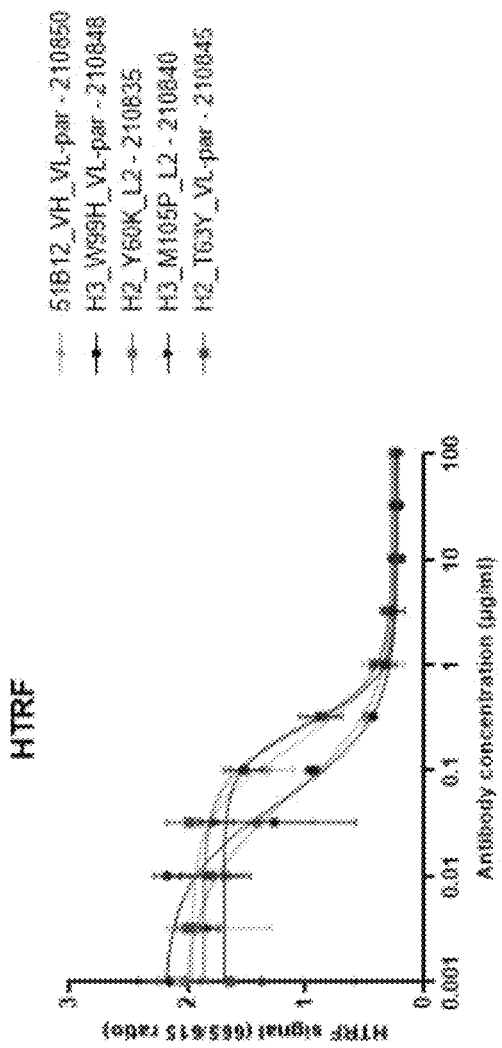
FIG. 4 shows an example overlay of selected antibody clones showing reactivity profiles in an HTRF inhibition assay.
FIG. 5 shows average data for the control parent antibody.

FIG. 4 shows an example overlay of selected antibody clones showing their reactivity profiles in an HTRF inhibition assay.

Clones H3_W99H_VL-par and H2_Y60K_L2 showed stronger inhibition in HTRF in comparison to the 51B12_VH_VL-par. Clones H3_M105P_L2 and H2_T63Y_VL-par showed slight less inhibition in HTRF in comparison to 51B12_VH_VL-par. Clone H3_W99H_VL-par showed improved reactivity profiles in all three assays. Heavy and light chain sequences were then selected and combined to make 27 affinity matured antibodies, which were then tested in an SPR assay.

Example 4: Screening of Purified Affinity Matured Antibodies in an SPR Assay

Referring to FIG. 5, there is shown the average data for the control 51B12_VH_VL-parent antibody.

Referring to FIG. 6, there are shown the kinetic parameters obtained for all antibody variants when screened with the 3.12 nM to 800 nM huZIP12-ECD-GST. The data shows that the on rates (ka) of the variants H3_W99H_L1, H3_W99H_L2 and H3_W99H_par are superior to the parent antibody, 51B12_par (shown in FIG. 5; 2.75e+04). The on rates of antibodies H2_T57H_L1, H2_Y60K_L1, H2_T63Y_L1, H2_K65P_L1, H2_G66Q_L1, H3_M105P_L1, 51B12_VH_L1, H2_T57H_L2, H2_Y60K_L2, H2_G66Q_L2, H2_T57H_VL_par, H2_Y60K_VL_par, H2, T63Y_VL_par and H2_G66Q_VL_par were also superior to the parent antibody. Affinity. All antibodies listed in FIG. 6 showed superior off-rate kinetics (kd). In particular, antibodies H3_W99H_L1, H3_W99H_L2 and H3_W99H_par showed superior binding affinity, defined as KD (M).

As can be seen, three antibody variants, H3_W99H_L1, H3_W99HL2 and H3_W99H_VL-par, all appear to have a higher affinity (KD) of ~500 pM.

A selection of the higher affinity antibody variants were re-tested at a lower concentration series with an extended dissociation time with the objective of obtaining a better assessment of the binding kinetics. Referring now to FIG. 7, there are shown the data for the monoclonal antibodies that were re-tested to optimise the binding kinetic data. Once again, three antibody variants, H3_W99H_L1, H3_W99HL2 and H3_W99H_VL-par, all appear to have a higher affinity than the parent antibody. The on-rate (ka), off-rate (kd) and overall affinity measurement (KD) are all improved compared to the 51B12 VH_VL_par parent antibody. An affinity of ~300 pM was obtained for the affinity matured variants in comparison to 1.1 nM for the parent antibody (shown in KD column in FIG. 7).

Example 5: Epitope Mapping

The inventors then set out to determine the precise epitope on the extracellular sequence of the ZIP12 protein to which the antibody variants bind.

The plots shown in FIG. 8 compare the binding profile of the sample (a 51B12 variant antibody, intensity of interaction shown by the blue barswith an isotype control sample (human IgG1 Fc null, intensity of interaction shown by the red bars) at the same conditions (in PBST buffer). Linear (LIN10, and LIN15) and looped (LOOP10, LOOP15) overlapping peptides (and HELix 19 and BETa sheet 22) were generated based on the human ZIP12 extracellular domain sequence, and these were immobilized on a hydrogel matrix. Peptides are defined as follows:

LIN10=10mer linear peptide, starting from position 1 of the ZIP12 extracellular domain. The position on the y axis in FIG. 8 is defined as the last residue number of the peptide. For example, peptide 1 covers amino acids 1-10 and therefore the last residue number is 10 etc.

LIN15=15mer linear peptide, starting from position 1 of the ZIP12 extracellular domain. The position on the y axis in FIG. 8 is defined as the last residue number of the peptide. For example, peptide 1 covers amino acids 1-15 and therefore the last residue number is 15 etc.

LOOP10=10mer peptide, starting from position 1 of the ZIP12 extracellular domain. The position on the y axis in FIG. 8 is defined as the last residue number of the peptide. For example, peptide 1 covers amino acids 1-10 and therefore the last residue number is 10 etc. The LOOP peptide differs from the LIN peptide because it is structurally fixed into a defined single loop structure using CLIPS scaffold technology (Pepscan).

LOOP15=15mer peptide, starting from position 1 of the ZIP12 extracellular domain. The position on the y axis in FIG. 8 is defined as the last residue number of the peptide. For example peptide 1 covers amino acids 1-15 and therefore the last residue number is 15 etc. The LOOP peptide differs from the LIN peptide because it is structurally fixed into a defined single loop structure using CLIPS scaffold technology (Pepscan).

HEL19=19mer peptide, starting from position 1 of the ZIP12 extracellular domain. The position on the y axis in FIG. 8 is defined as the last residue number of the peptide. For example, peptide 1 covers amino acids 1-19 and therefore the last residue number is 19 etc. The HEL peptide differs from the LIN peptide because it is structurally fixed into a defined alpha helix structure using CLIPS scaffold technology (Pepscan).

BET22=19mer peptide, starting from position 1 of the ZIP12 extracellular domain. The position on the y axis in FIG. 8 is defined as the last residue number of the peptide. For example, peptide 1 covers amino acids 1-22 and therefore the last residue number is 22 etc. The HEL peptide differs from the LIN peptide because it is structurally fixed into a defined beta sheet structure using CLIPS scaffold technology (Pepscan).

By using both linear peptides, and structurally defined peptides, both linear and conformational epitopes were explored. The antibody binding to each peptide was measured and plotted as in FIG. 8. For sample 51B12 antibodies, strong binding peaks ae observed in the linear peptides (LIN10 and LIN15) between amino acids 46-63, as well as conformational peptide (LOOP10, LOOP15, HEL19, BET22) mimics and was absent in the isotype. From the data obtained in FIG. 8, it can determined that the epitope of the 51B12 antibody variants is at least partially linear. The peptides which show intensity above that of the isotype control in FIG. 8 are epitope candidates for the 51B12 antibody. This antibody is functionally active in a Zn FLIPR assay demonstrating that it inhibits $Zn^{2+}$ transport.

The sequence of the epitope is: ADLLQVLSAGDHP-PHNHSRS [SEQ ID No: 252].

More preferably, the sequence of the epitope is: LLQVL-SAGDHPPHNHSRS [SEQ ID No: 1].

Example 6: Epitope Mapping of Affinity Matured Antibody

To reconstruct epitopes of the target molecule, a library of peptide-based mimics was synthesized using Fmoc-based solid-phase peptide synthesis. An amino functionalized polypropylene support was obtained by grafting with a proprietary hydrophilic polymer formulation, followed by reaction with tbutyloxycarbonyl-hexamethylenediamine (BocHMDA) using dicyclohexylcarbodiimide (DCC) with N-hydroxybenzotriazole (HOBt) and subsequent cleavage of the Boc-groups using trifluoroacetic acid (TFA). Standard Fmoc-peptide synthesis was used to synthesize peptides on the amino-functionalized solid support by custom modified JANUS liquid handling stations (Perkin Elmer).

| Different sets of peptides were designed as described below: | | |
|---|---|---|
| Set 1 | LIN10 | Linear peptides of length 10 derived from the target sequence of ECD Human ZIP12 |
| Set 2 | LIN15 | Linear peptides of length 15 derived from the target sequence of ECD Human ZIP12 |
| Set 3 | LOOP10 | Constrained peptides of length 10. On positions 2-9 are incorporated 8-mer peptides |
| Set 4 | LOOP15 | Constrained peptides of length 15. On positions 2-14 are incorporated 13-mer peptides |
| Set 5 | BET22 | β-turn peptide mimics of length 22. On positions 2-21 are 20-mer peptides derived |
| Set 6 | HEL19 | α-helical peptide mimics of length of length 19 derived from residues of the target |

The binding of antibody to each of the synthesized peptides was tested in a peptide-based ELISA. The peptide arrays were incubated with primary antibody solution (overnight at 4° C.). After washing, the peptide arrays were incubated with a 1/1000 dilution of an appropriate antibody peroxidase conjugate for one hour at 25° C. After washing, the peroxidase substrate 2,2'-azino-di-3-ethylbenzthiazoline sulfonate (ABTS) and 20 W/ml of 3 percent $H_2O_2$ were added. After one hour, the colour development was measured. The colour development was quantified with a charge coupled device- camera and an image processing system.

Sample 907672.1 (51B12 W99H_L1, also referred to as H3_W99H_L1) was screened under various conditions. A specific binder was observed consistently in various screenings in the amino acid region 35-48. The samples exhibited strong binding to this specific region of the peptides, even at extremely low concentrations such as 5 ng/ml (FIG. 10a). The high-intensity binder identified at region 35-48 didn't show distinct peak in LIN10 and LOOP10 peptide mimics, each comprising peptides consisting of 10 residues, as shown in FIG. 10A. At higher concentrations, several additional binding peaks were observed by linear and conformational mapping that were distinct from the isotype control (FIG. 10b). These peaks are determined to be minor epitope candidates, as they only appear at much higher concentrations. These binders could be non-specific.

To identify binders specific to the sample, an isotype control was screened under similar conditions. Binding peaks distinct from the isotype control were selected based on the criteria that sample peptide intensity should be at least 4 times the control peptide intensity. The high-intensity binder identified at region 35-48 did not show a distinct peak in LIN10 and LOOP10 peptide mimics, each comprising peptides consisting of 10 residues, as shown in FIG. 10a.

FIG. 10c shows the list of epitope candidates for 51B12_W99H_L1.

Example 7: 51B12 W99H_L1 Internalises in Cells Overexpressing ZIP12 Full Length Protein Internalisation of antibodies was measured using direct conjugation flow cytometry over a time course. The following antibodies were selected to be tested for internalisation: 51B12, 63A11, 6B11, 38F02, 75E05 and 68G01.

Figure 11A:
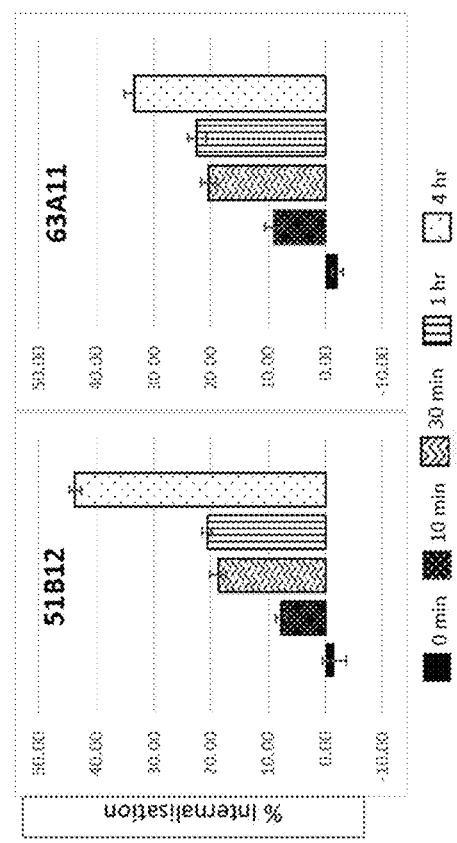

FIG. 11a shows the binding of antibodies 51B12, 63A11, 6B11, 38F02, 75E05 and 68G01 to CHO-K1 cells overexpressing ZIP12. Non-inhibitors 75E05 and 68G01 did not bind to the CHO-K1 cells, as expected. These antibodies were not further tested.

FIG. 11b shows internalization of antibodies 51B12 and 63A11 when measured by using direct conjugation. Only a small difference in internalisation rate could be observed between 51B12 and 63A11. Internalisation using direct conjugation could not be observed for 6B11 or 38F02.

Example 8: 51B12 W99H_L1 Binds to Human and Cynomolgus Monkey ZIP12-GST-ECD but does not Cross-React with Canine or Porcine Protein Surface plasmon resonance (SPR) is a label free biophysical technique that allows the direct measurement of biomolecular interactions. A single cycle kinetics (SCK) SPR direct binding assay was developed to characterise antibody binding to human, cyno, pig and canine ZIP12 fusion proteins. This assay was used to characterise the binding kinetics of the monoclonal antibody, 51B12_W99H_L1 against each of the four proteins (defined by kon, koff, KD). Single Cycle Kinetics (SCK) involves first capturing the mAb onto the protein A sensor surface and then sequentially injecting a series of concentrations of ZIP12-ECD-GST over the surface starting at the lowest concentration and ending with the highest concentration. The final concentration is followed by a dissociation phase where buffer only is passed across the surface followed by regeneration, where the remaining bound huZIP12-ECD-GST is removed from the surface by injection of a 10 mM Glycine pH 1.5 and 50 mM NaOH solution. The SCK is repeated for each monoclonal antibody providing duplicate data and the kinetics of each interaction is evaluated by the Biacore software.

FIG. 12 shows the average data for the binding of 51B12_W99H_L1 to human, cynomolgus monkey, canina and porcine ZIP12-ECD-GST. 51B12_W99H_L1 bound with similar ka, kd and KD to human and cynomolgus monkey protein ($4.02 \times 10^{-9}$ and $6.31 \times 10^{-9}$, respectively).

Example 9: 51B12 W99H_L1 Reverses Pulmonary Arterial Hypertension (PAH) Pathology in a Sugen Model of Pulmonary Remodelling FIG. 13 shows a set of histograms that show the results from a Sugen model used to analyse the effect of dosing with 51B12_W99H_L1 on the reversal of pulmonary arterial hypertension pathology. Humanized ZIP12 Sprague-Dawley rats were treated with 20 mg/kg Sugen5416 to and placed in a hypoxic chamber with an oxygen level of 10%. Rats were left in the chamber for 24 days, and then reverted to room air for another 8 days. After this time, PAH pathology is expected to have developed. Rats were then randomised into 2 groups and treated with either 10 mg/kg human IgG1 isotype control antibody (control) or 10 mg/kg 51B12_W99H_L1. To quantify the reversal of PAH pathology, multiple haemodynamic measurements were taken. Bars represent mean activity from six animals.

FIG. 13 shows that humanized rats treated with 51B12_W99H_L1 had reduced mean pulmonary artery pressure (mPAP) compared to the isotype control. Right ventricular hypertrophy was also decreased in rats treated with 51B12_W99H_L1, compared to those treated with the isotype control.

FIG. 14a shows that the number of remodelled and occlusive vessels is reduced upon treatment with 51B12_W99H_L1. Remodelled vessels are defined as those pulmonary vasculature vessels which show thickening of the vessel wall and occlusive vessels are defined as those vessels which are closed.

FIG. 14b shows a representative example of remodelled and occlusive vessels, and their reversal, in the isotype control and the 51B12_W99H_L1 treatment groups. Remodelled vessels are shown with closed black arrows and occlusive vessels are shown with open arrows.

CONCLUSIONS

Figure 8:
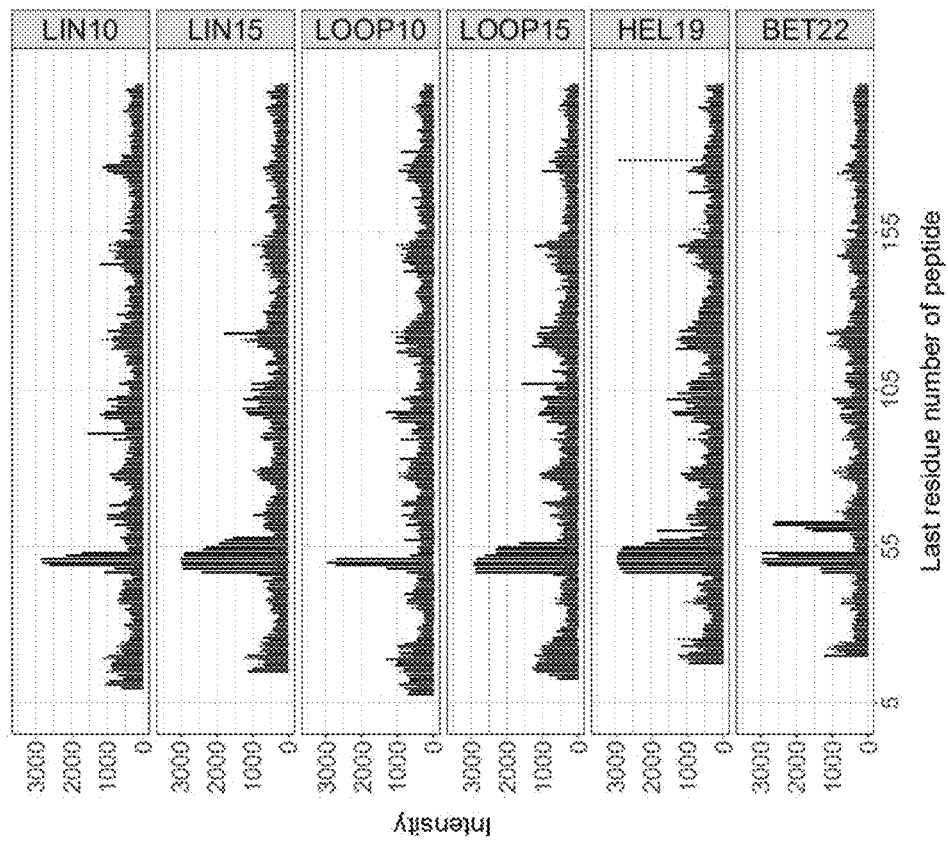
FIG. 8 shows epitope mapping of 51B12 antibodies.

In summary, the inventors took a ZIP12-binding antibody referred to as 51B12 parent, and subjected it to affinity maturation in order to produce a series of 26 novel variants. As shown in FIG. 8, using epitope mapping, the inventors have accurately determined the epitope on the extracellular domain of ZIP12 to which each of these antibodies binds. Furthermore, the variant antibodies have surprisingly high binding affinities to this epitope with improvements seen in on-rate (ka), off-rate (kd) and overall affinity (KD). Moreover, the variants are functionally active in a Zn FLIPR assay showing that they inhibit zinc ion transport. As a result, these antibodies will be strong therapeutic candidates for use in treating, preventing or ameliorating a hypoxia-related condition, for example pulmonary hypertension or cancer.

```
                             SEQUENCE LISTING

Sequence total quantity: 253
SEQ ID NO: 1            moltype = AA  length = 18
FEATURE                 Location/Qualifiers
source                  1..18
                        mol_type = protein
                        organism = Homo sapiens
SEQUENCE: 1
LLQVLSAGDH PPHNHSRS                                                         18

SEQ ID NO: 2            moltype = AA  length = 691
FEATURE                 Location/Qualifiers
source                  1..691
                        mol_type = protein
                        organism = Homo sapiens
SEQUENCE: 2
MCFRTKLSVS WVPLFLLLSR VFSTETEDKPS AQDSRSRGSS GQPADLLQVL SAGDHPPHNH        60
SRSLIKTLLE KTGCPRRRNG MQGDCNLCFE PDALLLIAGG NFEDQLREEV VQRVSLLLLY         120
YIIHQEEICS SKLNMSNKEY KFYLHSLLSL RQDEDSSFLS QNETEDILAF TRQYFDTSQS         180
QCMETKTLQK KSGIVSSEGA NESTLPQLAA MIITLSLQGV CLGQGNLPSP DYFTEYIFSS         240
LNRTNTLRLS ELDQLLNTLW TRSTCIKNEK IHQFQRKQNN IITHDQDYSN FSSSMEKESE         300
DGPVSWDQTC FSARQLVEIF LQKGLSLSIK EDPKQMSPGI IQQLLSCSCH LPKDQQAKLP         360
PTTLEKYGYS TVAVTLLLTG SMLGTALVLF HSCEENYRLI LQLFVGLAVG TLSGDALLHL         420
IPQVLGLHKQ EAPEFGHFHE SKGHIWKLMG LIGGIHGFFL IEKCFILLVS PNDKQGLSLV         480
NGHVGHSHHL ALNSELSDQA GRGKSASTIQ LKSPEDSQAA EMPIGSMTAS NRKCKAISLL         540
AIMILVGDSL HNFADGLAIG AAFSSSSESG VTTTIAILCH EIPHEMGDFA VLLSSGLSMK         600
TAILMNFISS LTAFMGLYIG LSVSADPCVQ DWIFTVTAGM FLYLSLVEML PEMTHVQTQR         660
PWMMFLLQNF GLILGWLSLL LLAIYEQNIK I                                        691

SEQ ID NO: 3            moltype = AA  length = 371
FEATURE                 Location/Qualifiers
source                  1..371
                        mol_type = protein
                        organism = Homo sapiens
SEQUENCE: 3
MPGCPCPGCG MAGPRLLFLT ALALELLERA GGSQPALRSR GTATACRLDN KESESWGALL         60
SGERLDTWIC SLLGSLMVGL SGVFPLLVIP LEMGTMLRSE AGAWRLKQLL SFALGGLLGN         120
VFLHLLPEAW AYTCSASPGG EGQSLQQQQQ LGLWVIAGIL TFLALEKMFL DSKEEGTSQA         180
PNKDPTAAAA ALNGGHCLAQ PAAEPGLGAV VRSIKVSGYL NLLANTIDNF THGLAVAASF         240
LVSKKIGLLT TMAILLHEIP HEVGDFAILL RAGFDRWSAA KLQLSTALGG LLGAGFAICT         300
QSPKGVVGCS PAAEETAAWV LPFTSGGFLY IALVNVLPDL LEEEDPWRSL QQLLLLCAGI         360
VVMVLFSLFV D                                                              371

SEQ ID NO: 4            moltype = AA  length = 647
FEATURE                 Location/Qualifiers
source                  1..647
                        mol_type = protein
                        organism = Homo sapiens
SEQUENCE: 4
MASLVSLELG LLLAVLVVTA TASPPAGLLS LLTSGQGALD QEALGGLLNT LADRVHCANG         60
PCGKCLSVED ALGLGEPEGS GLPPGPVLEA RYVARLSAAA VLYLSNPEGT CEDARAGLWA         120
SHADHLLALL ESPKALTPGL SWLLQRMQAR AAGQTPKTAC VDIPQLLEEA VGAGAPGSAG         180
GVLAALLDHV RSGSCFHALP SPQYFVDFVF QQHSSEVPMT LAELSALMQR LGVGREAHSD         240
```

```
HSHRHRGASS RDPVPLISSS NSSSVWDTVC LSARDVMAAY GLSEQAGVTP EAWAQLSPAL    300
LQQQLSGACT SQSRPPVQDQ LSQSERYLYG SLATLLICLC AVFGLLLLTC TGCRGVTHYI    360
LQTFLSLAVG ALTGDAVLHL TPKVLGLHTH SEEGLSPQPT WRLLAMLAGL YAFFLFENLF    420
NLLLPRDPED LEDGPCGHSS HSHGGHSHGV SLQLAPSELR QPKPPHEGSR ADLVAEESPE    480
LLNPEPRRLS PELRLLPYMI TLGDAVHNFA DGLAVGAAFA SSWKTGLATS LAVFCHELPH    540
ELGDFAALLH AGLSVRQALL LNLASALTAF AGLYVALAVG VSEESEAWIL AVATGLFLYV    600
ALCDMLPAML KVRDPRPWLL FLLHNVGLLG GWTVLLLLSL YEDDITF                 647

SEQ ID NO: 5            moltype = AA   length = 5
FEATURE                 Location/Qualifiers
source                  1..5
                        mol_type = protein
                        note = 51B12 CDR-H1
                        organism = synthetic construct
SEQUENCE: 5
DYGMH                                                                 5

SEQ ID NO: 6            moltype = AA   length = 17
FEATURE                 Location/Qualifiers
source                  1..17
                        mol_type = protein
                        note = 51B12 CDR-H2
                        organism = synthetic construct
SEQUENCE: 6
YISSGGTTIY YADTVKG                                                   17

SEQ ID NO: 7            moltype = AA   length = 9
FEATURE                 Location/Qualifiers
source                  1..9
                        mol_type = protein
                        note = 51B12 CDR-H3
                        organism = synthetic construct
SEQUENCE: 7
WTNLYAMDY                                                             9

SEQ ID NO: 8            moltype = AA   length = 15
FEATURE                 Location/Qualifiers
source                  1..15
                        mol_type = protein
                        note = 51B12 CDR-L1
                        organism = synthetic construct
SEQUENCE: 8
RASKSVSTSG YSYMH                                                     15

SEQ ID NO: 9            moltype = AA   length = 7
FEATURE                 Location/Qualifiers
source                  1..7
                        mol_type = protein
                        note = 51B12 CDR-L2
                        organism = synthetic construct
SEQUENCE: 9
LASNLES                                                               7

SEQ ID NO: 10           moltype = AA   length = 9
FEATURE                 Location/Qualifiers
source                  1..9
                        mol_type = protein
                        note = 51B12 CDR-L3
                        organism = synthetic construct
SEQUENCE: 10
QHSREVPYT                                                             9

SEQ ID NO: 11           moltype = AA   length = 118
FEATURE                 Location/Qualifiers
source                  1..118
                        mol_type = protein
                        note = 51B12 VH
                        organism = synthetic construct
SEQUENCE: 11
QVQLVESGGG VVQPGRSLRL SCAASGFTFS DYGMHWVRQA PGKGLEWVAY ISSGGTTIYY     60
ADTVKGRFTI SRDNSKNTLY LQMNSLRAED TAVYYCARWT NLYAMDYWGQ GTTVTVSS     118

SEQ ID NO: 12           moltype = AA   length = 112
FEATURE                 Location/Qualifiers
source                  1..112
                        mol_type = protein
                        note = 51B12 VL
                        organism = synthetic construct
SEQUENCE: 12
```

```
DIVLTQSPDS LAVSLGERAT INCRASKSVS TSGYSYMHWY QQKPGQPPKF LIYLASNLES    60
GVPDRFSGSG SGTDFTLTIS SLQAEDVAVY YCQHSREVPY TFGGGTKVEI KR           112

SEQ ID NO: 13           moltype = AA   length = 5
FEATURE                 Location/Qualifiers
source                  1..5
                        mol_type = protein
                        note = H3_W99H_L1 CDR-H1
                        organism = synthetic construct
SEQUENCE: 13
DYGMH                                                                5

SEQ ID NO: 14           moltype = AA   length = 17
FEATURE                 Location/Qualifiers
source                  1..17
                        mol_type = protein
                        note = H3_W99H_L1 CDR-H2
                        organism = synthetic construct
SEQUENCE: 14
YISSGGTTIY YADTVKG                                                  17

SEQ ID NO: 15           moltype = AA   length = 9
FEATURE                 Location/Qualifiers
source                  1..9
                        mol_type = protein
                        note = H3_W99H_L1 CDR-H3
                        organism = synthetic construct
SEQUENCE: 15
HTNLYAMDY                                                            9

SEQ ID NO: 16           moltype = AA   length = 15
FEATURE                 Location/Qualifiers
source                  1..15
                        mol_type = protein
                        note = H3_W99H_L1 CDR-L1
                        organism = synthetic construct
SEQUENCE: 16
RASKSVSTQG YSYMH                                                    15

SEQ ID NO: 17           moltype = AA   length = 7
FEATURE                 Location/Qualifiers
source                  1..7
                        mol_type = protein
                        note = H3_W99H_L1 CDR-L2
                        organism = synthetic construct
SEQUENCE: 17
LASNLES                                                              7

SEQ ID NO: 18           moltype = AA   length = 9
FEATURE                 Location/Qualifiers
source                  1..9
                        mol_type = protein
                        note = H3_W99H_L1 CDR-L3
                        organism = synthetic construct
SEQUENCE: 18
QHSREVPYT                                                            9

SEQ ID NO: 19           moltype = AA   length = 118
FEATURE                 Location/Qualifiers
source                  1..118
                        mol_type = protein
                        note = H3_W99H_L1 VH
                        organism = synthetic construct
SEQUENCE: 19
QVQLVESGGG VVQPGRSLRL SCAASGFTFS DYGMHWVRQA PGKGLEWVAY ISSGGTTIYY    60
ADTVKGRFTI SRDNSKNTLY LQMNSLRAED TAVYYCARHT NLYAMDYWGQ GTTVTVSS    118

SEQ ID NO: 20           moltype = AA   length = 112
FEATURE                 Location/Qualifiers
source                  1..112
                        mol_type = protein
                        note = H3_W99H_L1 VL
                        organism = synthetic construct
SEQUENCE: 20
DIVLTQSPDS LAVSLGERAT INCRASKSVS TQGYSYMHWY QQKPGQPPKF LIYLASNLES    60
GVPDRFSGSG SGTDFTLTIS SLQAEDVAVY YCQHSREVPY TFGGGTKVEI KR           112

SEQ ID NO: 21           moltype = AA   length = 5
FEATURE                 Location/Qualifiers
```

| | | |
|---|---|---|
| source | 1..5<br>mol_type = protein<br>note = H3_W99H_L2 CDR-H1<br>organism = synthetic construct | |
| SEQUENCE: 21<br>DYGMH | | 5 |
| SEQ ID NO: 22<br>FEATURE<br>source | moltype = AA  length = 17<br>Location/Qualifiers<br>1..17<br>mol_type = protein<br>note = H3_W99H_L2 CDR-H2<br>organism = synthetic construct | |
| SEQUENCE: 22<br>YISSGGTTIY YADTVKG | | 17 |
| SEQ ID NO: 23<br>FEATURE<br>source | moltype = AA  length = 9<br>Location/Qualifiers<br>1..9<br>mol_type = protein<br>note = H3_W99H_L2 CDR-H3<br>organism = synthetic construct | |
| SEQUENCE: 23<br>HTNLYAMDY | | 9 |
| SEQ ID NO: 24<br>FEATURE<br>source | moltype = AA  length = 15<br>Location/Qualifiers<br>1..15<br>mol_type = protein<br>note = H3_W99H_L2 CDR-L1<br>organism = synthetic construct | |
| SEQUENCE: 24<br>RASKSVSTSG YSYMH | | 15 |
| SEQ ID NO: 25<br>FEATURE<br>source | moltype = AA  length = 7<br>Location/Qualifiers<br>1..7<br>mol_type = protein<br>note = H3_W99H_L2 CDR-L2<br>organism = synthetic construct | |
| SEQUENCE: 25<br>LASNKES | | 7 |
| SEQ ID NO: 26<br>FEATURE<br>source | moltype = AA  length = 9<br>Location/Qualifiers<br>1..9<br>mol_type = protein<br>note = H3_W99H_L2 CDR-L3<br>organism = synthetic construct | |
| SEQUENCE: 26<br>QHSREVPYT | | 9 |
| SEQ ID NO: 27<br>FEATURE<br>source | moltype = AA  length = 118<br>Location/Qualifiers<br>1..118<br>mol_type = protein<br>note = H3_W99H_L2 VH<br>organism = synthetic construct | |
| SEQUENCE: 27<br>QVQLVESGGG VVQPGRSLRL SCAASGFTFS DYGMHWVRQA PGKGLEWVAY ISSGGTTIYY<br>ADTVKGRFTI SRDNSKNTLY LQMNSLRAED TAVYYCARHT NLYAMDYWGQ GTTVTVSS | | 60<br>118 |
| SEQ ID NO: 28<br>FEATURE<br>source | moltype = AA  length = 112<br>Location/Qualifiers<br>1..112<br>mol_type = protein<br>note = H3_W99H_L2 VL<br>organism = synthetic construct | |
| SEQUENCE: 28<br>DIVLTQSPDS LAVSLGERAT INCRASKSVS TSGYSYMHWY QQKPGQPPKF LIYLASNKES<br>GVPDRFSGSG SGTDFTLTIS SLQAEDVAVY YCQHSREVPY TFGGGTKVEI KR | | 60<br>112 |
| SEQ ID NO: 29<br>FEATURE<br>source | moltype = AA  length = 5<br>Location/Qualifiers<br>1..5<br>mol_type = protein<br>note = H3_W99H_VL-par CDR-H1<br>organism = synthetic construct | |
| SEQUENCE: 29 | | |

DYGMH                                                                      5

SEQ ID NO: 30           moltype = AA  length = 17
FEATURE                 Location/Qualifiers
source                  1..17
                        mol_type = protein
                        note = H3_W99H_VL-par CDR-H2
                        organism = synthetic construct
SEQUENCE: 30
YISSGGTTIY YADTVKG                                                         17

SEQ ID NO: 31           moltype = AA  length = 9
FEATURE                 Location/Qualifiers
source                  1..9
                        mol_type = protein
                        note = H3_W99H_VL-par CDR-H3
                        organism = synthetic construct
SEQUENCE: 31
HTNLYAMDY                                                                  9

SEQ ID NO: 32           moltype = AA  length = 15
FEATURE                 Location/Qualifiers
source                  1..15
                        mol_type = protein
                        note = H3_W99H_VL-par CDR-L1
                        organism = synthetic construct
SEQUENCE: 32
RASKSVSTSG YSYMH                                                           15

SEQ ID NO: 33           moltype = AA  length = 7
FEATURE                 Location/Qualifiers
source                  1..7
                        mol_type = protein
                        note = H3_W99H_VL-par CDR-L2
                        organism = synthetic construct
SEQUENCE: 33
LASNLES                                                                    7

SEQ ID NO: 34           moltype = AA  length = 9
FEATURE                 Location/Qualifiers
source                  1..9
                        mol_type = protein
                        note = H3_W99H_VL-par CDR-L3
                        organism = synthetic construct
SEQUENCE: 34
QHSREVPYT                                                                  9

SEQ ID NO: 35           moltype = AA  length = 118
FEATURE                 Location/Qualifiers
source                  1..118
                        mol_type = protein
                        note = H3_W99H_VL-par VH
                        organism = synthetic construct
SEQUENCE: 35
QVQLVESGGG VVQPGRSLRL SCAASGFTFS DYGMHWVRQA PGKGLEWVAY ISSGGTTIYY           60
ADTVKGRFTI SRDNSKNTLY LQMNSLRAED TAVYYCARHT NLYAMDYWGQ GTTVTVSS            118

SEQ ID NO: 36           moltype = AA  length = 112
FEATURE                 Location/Qualifiers
source                  1..112
                        mol_type = protein
                        note = H3_W99H_VL-par VL
                        organism = synthetic construct
SEQUENCE: 36
DIVLTQSPDS LAVSLGERAT INCRASKSVS TSGYSYMHWY QQKPGQPPKF LIYLASNLES          60
GVPDRFSGSG SGTDFTLTIS SLQAEDVAVY YCQHSREVPY TFGGGTKVEI KR                  112

SEQ ID NO: 37           moltype = AA  length = 5
FEATURE                 Location/Qualifiers
source                  1..5
                        mol_type = protein
                        note = H2_T56H_L1 CDR-H1
                        organism = synthetic construct
SEQUENCE: 37
DYGMH                                                                      5

SEQ ID NO: 38           moltype = AA  length = 17
FEATURE                 Location/Qualifiers
source                  1..17

```
                              mol_type = protein
                              note = H2_T56H_L1 CDR-H2
                              organism = synthetic construct
SEQUENCE: 38
YISSGGHTIY YADTVKG                                                              17

SEQ ID NO: 39                 moltype = AA   length = 9
FEATURE                       Location/Qualifiers
source                        1..9
                              mol_type = protein
                              note = H2_T56H_L1 CDR-H3
                              organism = synthetic construct
SEQUENCE: 39
WTNLYAMDY                                                                       9

SEQ ID NO: 40                 moltype = AA   length = 15
FEATURE                       Location/Qualifiers
source                        1..15
                              mol_type = protein
                              note = H2_T56H_L1 CDR-L1
                              organism = Synthetic construct
SEQUENCE: 40
RASKSVSTQG YSYMH                                                                15

SEQ ID NO: 41                 moltype = AA   length = 7
FEATURE                       Location/Qualifiers
source                        1..7
                              mol_type = protein
                              note = H2_T56H_L1 CDR-L2
                              organism = synthetic construct
SEQUENCE: 41
LASNLES                                                                         7

SEQ ID NO: 42                 moltype = AA   length = 9
FEATURE                       Location/Qualifiers
source                        1..9
                              mol_type = protein
                              note = H2_T56_L1 CDR-L3
                              organism = synthetic construct
SEQUENCE: 42
QHSREVPYT                                                                       9

SEQ ID NO: 43                 moltype = AA   length = 118
FEATURE                       Location/Qualifiers
source                        1..118
                              mol_type = protein
                              note = H2_T56H_L1 VH
                              organism = synthetic construct
SEQUENCE: 43
QVQLVESGGG VVQPGRSLRL SCAASGFTFS DYGMHWVRQA PGKGLEWVAY ISSGGHTIYY                60
ADTVKGRFTI SRDNSKNTLY LQMNSLRAED TAVYYCARWT NLYAMDYWGQ GTTVTVSS                 118

SEQ ID NO: 44                 moltype = AA   length = 112
FEATURE                       Location/Qualifiers
source                        1..112
                              mol_type = protein
                              note = H2_T56H_L1 VL
                              organism = synthetic construct
SEQUENCE: 44
DIVLTQSPDS LAVSLGERAT INCRASKSVS TQGYSYMHWY QQKPGQPPKF LIYLASNLES                60
GVPDRFSGSG SGTDFTLTIS SLQAEDVAVY YCQHSREVPY TFGGGTKVEI KR                       112

SEQ ID NO: 45                 moltype = AA   length = 5
FEATURE                       Location/Qualifiers
source                        1..5
                              mol_type = protein
                              note = H2_T57H_L1 CDR-H1
                              organism = synthetic construct
SEQUENCE: 45
DYGMH                                                                           5

SEQ ID NO: 46                 moltype = AA   length = 17
FEATURE                       Location/Qualifiers
source                        1..17
                              mol_type = protein
                              note = H2_T57H_L1 CDR-H2
                              organism = synthetic construct
SEQUENCE: 46
YISSGGTHIY YADTVKG                                                              17
```

```
SEQ ID NO: 47              moltype = AA   length = 9
FEATURE                    Location/Qualifiers
source                     1..9
                           mol_type = protein
                           note = H2_T57H_L1 CDR-H3
                           organism = synthetic construct
SEQUENCE: 47
WTNLYAMDY                                                                    9

SEQ ID NO: 48              moltype = AA   length = 15
FEATURE                    Location/Qualifiers
source                     1..15
                           mol_type = protein
                           note = H2_T57H_L1 CDR-L1
                           organism = synthetic construct
SEQUENCE: 48
RASKSVSTQG YSYMH                                                            15

SEQ ID NO: 49              moltype = AA   length = 7
FEATURE                    Location/Qualifiers
source                     1..7
                           mol_type = protein
                           note = H2_T57H_L1 CDR-H2
                           organism = synthetic construct
SEQUENCE: 49
LASNLES                                                                      7

SEQ ID NO: 50              moltype = AA   length = 9
FEATURE                    Location/Qualifiers
source                     1..9
                           mol_type = protein
                           note = H2_T57H_L1 CDR-L3
                           organism = synthetic construct
SEQUENCE: 50
QHSREVPYT                                                                    9

SEQ ID NO: 51              moltype = AA   length = 118
FEATURE                    Location/Qualifiers
source                     1..118
                           mol_type = protein
                           note = H2_T57H_L1 VH
                           organism = synthetic construct
SEQUENCE: 51
QVQLVESGGG VVQPGRSLRL SCAASGFTFS DYGMHWVRQA PGKGLEWVAY ISSGGTHIYY            60
ADTVKGRFTI SRDNSKNTLY LQMNSLRAED TAVYYCARWT NLYAMDYWGQ GTTVTVSS            118

SEQ ID NO: 52              moltype = AA   length = 112
FEATURE                    Location/Qualifiers
source                     1..112
                           mol_type = protein
                           note = H2_T57H_L1 VL
                           organism = synthetic construct
SEQUENCE: 52
DIVLTQSPDS LAVSLGERAT INCRASKSVS TQGYSYMHWY QQKPGQPPKF LIYLASNLES            60
GVPDRFSGSG SGTDFTLTIS SLQAEDVAVY YCQHSREVPY TFGGGTKVEI KR                  112

SEQ ID NO: 53              moltype = AA   length = 5
FEATURE                    Location/Qualifiers
source                     1..5
                           mol_type = protein
                           note = H2_Y60K_L1 CDR-H1
                           organism = synthetic construct
SEQUENCE: 53
DYGMH                                                                        5

SEQ ID NO: 54              moltype = AA   length = 17
FEATURE                    Location/Qualifiers
source                     1..17
                           mol_type = protein
                           note = H2_Y60K_L1 CDR-H2
                           organism = synthetic construct
SEQUENCE: 54
YISSGGTTIY KADTVKG                                                          17

SEQ ID NO: 55              moltype = AA   length = 9
FEATURE                    Location/Qualifiers
source                     1..9
                           mol_type = protein
```

```
                            note = H2_Y60K_L1 CDR-H3
                            organism = synthetic construct
SEQUENCE: 55
WTNLYAMDY                                                                    9

SEQ ID NO: 56               moltype = AA   length = 15
FEATURE                     Location/Qualifiers
source                      1..15
                            mol_type = protein
                            note = H2_Y60K_L1 CDR-L1
                            organism = synthetic construct
SEQUENCE: 56
RASKSVSTQG YSYMH                                                            15

SEQ ID NO: 57               moltype = AA   length = 7
FEATURE                     Location/Qualifiers
source                      1..7
                            mol_type = protein
                            note = H2_Y60K_L1 CDR-L2
                            organism = synthetic construct
SEQUENCE: 57
LASNLES                                                                      7

SEQ ID NO: 58               moltype = AA   length = 9
FEATURE                     Location/Qualifiers
source                      1..9
                            mol_type = protein
                            note = H2_Y60K_L1 CDR-L3
                            organism = synthetic construct
SEQUENCE: 58
QHSREVPYT                                                                    9

SEQ ID NO: 59               moltype = AA   length = 118
FEATURE                     Location/Qualifiers
source                      1..118
                            mol_type = protein
                            note = H2_Y60K_L1 VH
                            organism = synthetic construct
SEQUENCE: 59
QVQLVESGGG VVQPGRSLRL SCAASGFTFS DYGMHWVRQA PGKGLEWVAY ISSGGTTIYK            60
ADTVKGRFTI SRDNSKNTLY LQMNSLRAED TAVYYCARWT NLYAMDYWGQ GTTVTVSS            118

SEQ ID NO: 60               moltype = AA   length = 112
FEATURE                     Location/Qualifiers
source                      1..112
                            mol_type = protein
                            note = H2_Y60K_L1 VL
                            organism = synthetic construct
SEQUENCE: 60
DIVLTQSPDS LAVSLGERAT INCRASKSVS TQGYSYMHWY QQKPGQPPKF LIYLASNLES            60
GVPDRFSGSG SGTDFTLTIS SLQAEDVAVY YCQHSREVPY TFGGGTKVEI KR                  112

SEQ ID NO: 61               moltype = AA   length = 5
FEATURE                     Location/Qualifiers
source                      1..5
                            mol_type = protein
                            note = H2_T63Y_L1 CDR-H1
                            organism = synthetic construct
SEQUENCE: 61
DYGMH                                                                        5

SEQ ID NO: 62               moltype = AA   length = 17
FEATURE                     Location/Qualifiers
source                      1..17
                            mol_type = protein
                            note = H2_T63Y_L1 CDR-H2
                            organism = synthetic construct
SEQUENCE: 62
YISSGGTTIY YADYVKG                                                          17

SEQ ID NO: 63               moltype = AA   length = 9
FEATURE                     Location/Qualifiers
source                      1..9
                            mol_type = protein
                            note = H2_T63Y_L1 CDR-H3
                            organism = synthetic construct
SEQUENCE: 63
WTNLYAMDY                                                                    9
```

```
SEQ ID NO: 64            moltype = AA    length = 15
FEATURE                  Location/Qualifiers
source                   1..15
                         mol_type = protein
                         note = H2_T63Y_L1 CDR-L1
                         organism = synthetic construct
SEQUENCE: 64
RASKSVSTQG YSYMH                                                         15

SEQ ID NO: 65            moltype = AA    length = 7
FEATURE                  Location/Qualifiers
source                   1..7
                         mol_type = protein
                         note = H2_T63Y_L1 CDR-L2
                         organism = synthetic construct
SEQUENCE: 65
LASNLES                                                                   7

SEQ ID NO: 66            moltype = AA    length = 9
FEATURE                  Location/Qualifiers
source                   1..9
                         mol_type = protein
                         note = H2_T63Y_L1 CDR-L3
                         organism = synthetic construct
SEQUENCE: 66
QHSREVPYT                                                                 9

SEQ ID NO: 67            moltype = AA    length = 118
FEATURE                  Location/Qualifiers
source                   1..118
                         mol_type = protein
                         note = H2_T63Y_L1 VH
                         organism = synthetic construct
SEQUENCE: 67
QVQLVESGGG VVQPGRSLRL SCAASGFTFS DYGMHWVRQA PGKGLEWVAY ISSGGTTIYY         60
ADYVKGRFTI SRDNSKNTLY LQMNSLRAED TAVYYCARWT NLYAMDYWGQ GTTVTVSS          118

SEQ ID NO: 68            moltype = AA    length = 112
FEATURE                  Location/Qualifiers
source                   1..112
                         mol_type = protein
                         note = H2_T63Y_L1 VL
                         organism = synthetic construct
SEQUENCE: 68
DIVLTQSPDS LAVSLGERAT INCRASKSVS TQGYSYMHWY QQKPGQPPKF LIYLASNLES         60
GVPDRFSGSG SGTDFTLTIS SLQAEDVAVY YCQHSREVPY TFGGGTKVEI KR                112

SEQ ID NO: 69            moltype = AA    length = 5
FEATURE                  Location/Qualifiers
source                   1..5
                         mol_type = protein
                         note = H2_K65P_L1 CDR-H1
                         organism = synthetic construct
SEQUENCE: 69
DYGMH                                                                     5

SEQ ID NO: 70            moltype = AA    length = 17
FEATURE                  Location/Qualifiers
source                   1..17
                         mol_type = protein
                         note = H2_K65P_L1 CDR-H2
                         organism = synthetic construct
SEQUENCE: 70
YISSGGTTIY YADTVPG                                                       17

SEQ ID NO: 71            moltype = AA    length = 9
FEATURE                  Location/Qualifiers
source                   1..9
                         mol_type = protein
                         note = H2_K65P_L1 CDR-H3
                         organism = synthetic construct
SEQUENCE: 71
WTNLYAMDY                                                                 9

SEQ ID NO: 72            moltype = AA    length = 15
FEATURE                  Location/Qualifiers
source                   1..15
                         mol_type = protein
                         note = H2_K65P_L1 CDR-L1
```

-continued

```
SEQUENCE: 72
RASKSVSTQG YSYMH                                              15

SEQ ID NO: 73            moltype = AA   length = 7
FEATURE                  Location/Qualifiers
source                   1..7
                         mol_type = protein
                         note = H2_K65P_L1 CDR-L2
                         organism = synthetic construct
SEQUENCE: 73
LASNLES                                                        7

SEQ ID NO: 74            moltype = AA   length = 9
FEATURE                  Location/Qualifiers
source                   1..9
                         mol_type = protein
                         note = H2_K65P_L1 CDR-L3
                         organism = synthetic construct
SEQUENCE: 74
QHSREVPYT                                                      9

SEQ ID NO: 75            moltype = AA   length = 118
FEATURE                  Location/Qualifiers
source                   1..118
                         mol_type = protein
                         note = H2_K65P_L1 VH
                         organism = synthetic construct
SEQUENCE: 75
QVQLVESGGG VVQPGRSLRL SCAASGFTFS DYGMHWVRQA PGKGLEWVAY ISSGGTTIYY    60
ADTVPGRFTI SRDNSKNTLY LQMNSLRAED TAVYYCARWT NLYAMDYWGQ GTTVTVSS    118

SEQ ID NO: 76            moltype = AA   length = 112
FEATURE                  Location/Qualifiers
source                   1..112
                         mol_type = protein
                         note = H2_K65P_L1 VL
                         organism = synthetic construct
SEQUENCE: 76
DIVLTQSPDS LAVSLGERAT INCRASKSVS TQGYSYMHWY QQKPGQPPKF LIYLASNLES    60
GVPDRFSGSG SGTDFTLTIS SLQAEDVAVY YCQHSREVPY TFGGGTKVEI KR          112

SEQ ID NO: 77            moltype = AA   length = 5
FEATURE                  Location/Qualifiers
source                   1..5
                         mol_type = protein
                         note = H2_G66Q_L1 CDR-H1
                         organism = synthetic construct
SEQUENCE: 77
DYGMH                                                          5

SEQ ID NO: 78            moltype = AA   length = 17
FEATURE                  Location/Qualifiers
source                   1..17
                         mol_type = protein
                         note = H2_G66Q_L1 CDR-H2
                         organism = synthetic construct
SEQUENCE: 78
YISSGGTTIY YADTVKQ                                             17

SEQ ID NO: 79            moltype = AA   length = 9
FEATURE                  Location/Qualifiers
source                   1..9
                         mol_type = protein
                         note = H2_G66Q_L1 CDR-H3
                         organism = synthetic construct
SEQUENCE: 79
WTNLYAMDY                                                      9

SEQ ID NO: 80            moltype = AA   length = 15
FEATURE                  Location/Qualifiers
source                   1..15
                         mol_type = protein
                         note = H2_G66Q_L1 CDR-L1
                         organism = synthetic construct
SEQUENCE: 80
RASKSVSTQG YSYMH                                              15

SEQ ID NO: 81            moltype = AA   length = 7
```

```
FEATURE                 Location/Qualifiers
source                  1..7
                        mol_type = protein
                        note = H2_G66Q_L1 CDR-L2
                        organism = synthetic construct
SEQUENCE: 81
LASNLES                                                                     7

SEQ ID NO: 82           moltype = AA   length = 9
FEATURE                 Location/Qualifiers
source                  1..9
                        mol_type = protein
                        note = H2_G66Q_L1 CDR-L3
                        organism = synthetic construct
SEQUENCE: 82
QHSREVPYT                                                                   9

SEQ ID NO: 83           moltype = AA   length = 118
FEATURE                 Location/Qualifiers
source                  1..118
                        mol_type = protein
                        note = H2_G66Q_L1 VH
                        organism = synthetic construct
SEQUENCE: 83
QVQLVESGGG VVQPGRSLRL SCAASGFTFS DYGMHWVRQA PGKGLEWVAY ISSGGTTIYY            60
ADTVKQRFTI SRDNSKNTLY LQMNSLRAED TAVYYCARWT NLYAMDYWGQ GTTVTVSS             118

SEQ ID NO: 84           moltype = AA   length = 112
FEATURE                 Location/Qualifiers
source                  1..112
                        mol_type = protein
                        note = H2_G66Q_L1 VL
                        organism = synthetic construct
SEQUENCE: 84
DIVLTQSPDS LAVSLGERAT INCRASKSVS TQGYSYMHWY QQKPGQPPKF LIYLASNLES           60
GVPDRFSGSG SGTDFTLTIS SLQAEDVAVY YCQHSREVPY TFGGGTKVEI KR                   112

SEQ ID NO: 85           moltype = AA   length = 5
FEATURE                 Location/Qualifiers
source                  1..5
                        mol_type = protein
                        note = H3_M105P_L1 CDR-H1
                        organism = synthetic construct
SEQUENCE: 85
DYGMH                                                                       5

SEQ ID NO: 86           moltype = AA   length = 17
FEATURE                 Location/Qualifiers
source                  1..17
                        mol_type = protein
                        note = H3_M105P_L1 CDR-H2
                        organism = synthetic construct
SEQUENCE: 86
YISSGGTTIY YADTVKG                                                          17

SEQ ID NO: 87           moltype = AA   length = 9
FEATURE                 Location/Qualifiers
source                  1..9
                        mol_type = protein
                        note = H3_M105P_L1 CDR-H3
                        organism = synthetic construct
SEQUENCE: 87
WTNLYAPDY                                                                   9

SEQ ID NO: 88           moltype = AA   length = 15
FEATURE                 Location/Qualifiers
source                  1..15
                        mol_type = protein
                        note = H3_M105P_L1 CDR-L1
                        organism = synthetic construct
SEQUENCE: 88
RASKSVSTQG YSYMH                                                            15

SEQ ID NO: 89           moltype = AA   length = 7
FEATURE                 Location/Qualifiers
source                  1..7
                        mol_type = protein
                        note = H3_M105P_L1 CDR-L2
                        organism = synthetic construct
```

```
SEQUENCE: 89
LASNLES                                                                        7

SEQ ID NO: 90          moltype = AA  length = 9
FEATURE                Location/Qualifiers
source                 1..9
                       mol_type = protein
                       note = H3_M105P_L1 CDR-L3
                       organism = synthetic construct
SEQUENCE: 90
QHSREVPYT                                                                      9

SEQ ID NO: 91          moltype = AA  length = 118
FEATURE                Location/Qualifiers
source                 1..118
                       mol_type = protein
                       note = H3_M105P_L1 VH
                       organism = synthetic construct
SEQUENCE: 91
QVQLVESGGG VVQPGRSLRL SCAASGFTFS DYGMHWVRQA PGKGLEWVAY ISSGGTTIYY              60
ADTVKGRFTI SRDNSKNTLY LQMNSLRAED TAVYYCARWT NLYAPDYWGQ GTTVTVSS               118

SEQ ID NO: 92          moltype = AA  length = 112
FEATURE                Location/Qualifiers
source                 1..112
                       mol_type = protein
                       note = H3_M105P_L1 VL
                       organism = synthetic construct
SEQUENCE: 92
DIVLTQSPDS LAVSLGERAT INCRASKSVS TQGYSYMHWY QQKPGQPPKF LIYLASNLES              60
GVPDRFSGSG SGTDFTLTIS SLQAEDVAVY YCQHSREVPY TFGGGTKVEI KR                    112

SEQ ID NO: 93          moltype = AA  length = 5
FEATURE                Location/Qualifiers
source                 1..5
                       mol_type = protein
                       note = 51B12_VH_L1 CDR-H1
                       organism = synthetic construct
SEQUENCE: 93
DYGMH                                                                          5

SEQ ID NO: 94          moltype = AA  length = 17
FEATURE                Location/Qualifiers
source                 1..17
                       mol_type = protein
                       note = 51B12_VH_L1 CDR-H2
                       organism = synthetic construct
SEQUENCE: 94
YISSGGTTIY YADTVKG                                                            17

SEQ ID NO: 95          moltype = AA  length = 9
FEATURE                Location/Qualifiers
source                 1..9
                       mol_type = protein
                       note = 51B12_VH_L1 CDR-H3
                       organism = synthetic construct
SEQUENCE: 95
WTNLYAMDY                                                                      9

SEQ ID NO: 96          moltype = AA  length = 15
FEATURE                Location/Qualifiers
source                 1..15
                       mol_type = protein
                       note = 51B12_VH_L1 CDR-L1
                       organism = synthetic construct
SEQUENCE: 96
RASKSVSTQG YSYMH                                                              15

SEQ ID NO: 97          moltype = AA  length = 7
FEATURE                Location/Qualifiers
source                 1..7
                       mol_type = protein
                       note = 51B12_VH_L1 CDR-L2
                       organism = synthetic construct
SEQUENCE: 97
LASNLES                                                                        7

SEQ ID NO: 98          moltype = AA  length = 9
FEATURE                Location/Qualifiers
```

```
source                          1..9
                                mol_type = protein
                                note = 51B12_VH_L1 CDR-L3
                                organism = synthetic construct
SEQUENCE: 98
QHSREVPYT                                                                    9

SEQ ID NO: 99                   moltype = AA   length = 118
FEATURE                         Location/Qualifiers
source                          1..118
                                mol_type = protein
                                note = 51B12_VH_L1 VH
                                organism = synthetic construct
SEQUENCE: 99
QVQLVESGGG VVQPGRSLRL SCAASGFTFS DYGMHWVRQA PGKGLEWVAY ISSGGTTIYY            60
ADTVKGRFTI SRDNSKNTLY LQMNSLRAED TAVYYCARWT NLYAMDYWGQ GTTVTVSS             118

SEQ ID NO: 100                  moltype = AA   length = 112
FEATURE                         Location/Qualifiers
source                          1..112
                                mol_type = protein
                                note = 51B12_VH_L1 VL
                                organism = synthetic construct
SEQUENCE: 100
DIVLTQSPDS LAVSLGERAT INCRASKSVS TQGYSYMHWY QQKPGQPPKF LIYLASNLES            60
GVPDRFSGSG SGTDFTLTIS SLQAEDVAVY YCQHSREVPY TFGGGTKVEI KR                  112

SEQ ID NO: 101                  moltype = AA   length = 5
FEATURE                         Location/Qualifiers
source                          1..5
                                mol_type = protein
                                note = H2_T56H_L2 CDR-H1
                                organism = synthetic construct
SEQUENCE: 101
DYGMH                                                                        5

SEQ ID NO: 102                  moltype = AA   length = 17
FEATURE                         Location/Qualifiers
source                          1..17
                                mol_type = protein
                                note = H2_T56H_L2 CDR-H2
                                organism = synthetic construct
SEQUENCE: 102
YISSGGHTIY YADTVKG                                                          17

SEQ ID NO: 103                  moltype = AA   length = 9
FEATURE                         Location/Qualifiers
source                          1..9
                                mol_type = protein
                                note = H2_T56H_L2 CDR-H3
                                organism = synthetic construct
SEQUENCE: 103
WTNLYAMDY                                                                    9

SEQ ID NO: 104                  moltype = AA   length = 15
FEATURE                         Location/Qualifiers
source                          1..15
                                mol_type = protein
                                note = H2_T56H_L2 CDR-L1
                                organism = synthetic construct
SEQUENCE: 104
RASKSVSTSG YSYMH                                                            15

SEQ ID NO: 105                  moltype = AA   length = 7
FEATURE                         Location/Qualifiers
source                          1..7
                                mol_type = protein
                                note = H2_T56H_L2 CDR-L2
                                organism = synthetic construct
SEQUENCE: 105
LASNKES                                                                      7

SEQ ID NO: 106                  moltype = AA   length = 9
FEATURE                         Location/Qualifiers
source                          1..9
                                mol_type = protein
                                note = H2_T56H_L2 CDR-L3
                                organism = synthetic construct
SEQUENCE: 106
```

```
QHSREVPYT                                                                         9

SEQ ID NO: 107          moltype = AA  length = 118
FEATURE                 Location/Qualifiers
source                  1..118
                        mol_type = protein
                        note = H2_T56H_L2 VH
                        organism = synthetic construct
SEQUENCE: 107
QVQLVESGGG VVQPGRSLRL SCAASGFTFS DYGMHWVRQA PGKGLEWVAY ISSGGHTIYY      60
ADTVKGRFTI SRDNSKNTLY LQMNSLRAED TAVYYCARWT NLYAMDYWGQ GTTVTVSS       118

SEQ ID NO: 108          moltype = AA  length = 112
FEATURE                 Location/Qualifiers
source                  1..112
                        mol_type = protein
                        note = H2_T56H_L2 VL
                        organism = synthetic construct
SEQUENCE: 108
DIVLTQSPDS LAVSLGERAT INCRASKSVS TSGYSYMHWY QQKPGQPPKF LIYLASNKES      60
GVPDRFSGSG SGTDFTLTIS SLQAEDVAVY YCQHSREVPY TFGGGTKVEI KR             112

SEQ ID NO: 109          moltype = AA  length = 5
FEATURE                 Location/Qualifiers
source                  1..5
                        mol_type = protein
                        note = H2_T57H_L2 CDR-H1
                        organism = synthetic construct
SEQUENCE: 109
DYGMH                                                                             5

SEQ ID NO: 110          moltype = AA  length = 17
FEATURE                 Location/Qualifiers
source                  1..17
                        mol_type = protein
                        note = H2_T57H_L2 CDR-H2
                        organism = synthetic construct
SEQUENCE: 110
YISSGGTHIY YADTVKG                                                               17

SEQ ID NO: 111          moltype = AA  length = 9
FEATURE                 Location/Qualifiers
source                  1..9
                        mol_type = protein
                        note = H2_T57H_L2 CDR-H3
                        organism = synthetic construct
SEQUENCE: 111
WTNLYAMDY                                                                         9

SEQ ID NO: 112          moltype = AA  length = 15
FEATURE                 Location/Qualifiers
source                  1..15
                        mol_type = protein
                        note = H2_T57H_L2 CDR-L1
                        organism = synthetic construct
SEQUENCE: 112
RASKSVSTSG YSYMH                                                                 15

SEQ ID NO: 113          moltype = AA  length = 7
FEATURE                 Location/Qualifiers
source                  1..7
                        mol_type = protein
                        note = H2_T57H_L2 CDR-L2
                        organism = synthetic construct
SEQUENCE: 113
LASNKES                                                                           7

SEQ ID NO: 114          moltype = AA  length = 9
FEATURE                 Location/Qualifiers
source                  1..9
                        mol_type = protein
                        note = H2_T57H_L2 CDR-L3
                        organism = synthetic construct
SEQUENCE: 114
QHSREVPYT                                                                         9

SEQ ID NO: 115          moltype = AA  length = 118
FEATURE                 Location/Qualifiers
source                  1..118
```

```
                        mol_type = protein
                        note = H2_T57H_L2 VH
                        organism = synthetic construct
SEQUENCE: 115
QVQLVESGGG VVQPGRSLRL SCAASGFTFS DYGMHWVRQA PGKGLEWVAY ISSGGTHIYY    60
ADTVKGRFTI SRDNSKNTLY LQMNSLRAED TAVYYCARWT NLYAMDYWGQ GTTVTVSS    118

SEQ ID NO: 116          moltype = AA   length = 112
FEATURE                 Location/Qualifiers
source                  1..112
                        mol_type = protein
                        note = H2_T57H_L2 VL
                        organism = synthetic construct
SEQUENCE: 116
DIVLTQSPDS LAVSLGERAT INCRASKSVS TSGYSMHWY QQKPGQPPKF LIYLASNKES    60
GVPDRFSGSG SGTDFTLTIS SLQAEDVAVY YCQHSREVPY TFGGGTKVEI KR          112

SEQ ID NO: 117          moltype = AA   length = 5
FEATURE                 Location/Qualifiers
source                  1..5
                        mol_type = protein
                        note = H2_Y60K_L2 CDR-H1
                        organism = synthetic construct
SEQUENCE: 117
DYGMH                                                               5

SEQ ID NO: 118          moltype = AA   length = 17
FEATURE                 Location/Qualifiers
source                  1..17
                        mol_type = protein
                        note = H2_Y60K_L2 CDR-H2
                        organism = synthetic construct
SEQUENCE: 118
YISSGGTTIY KADTVKG                                                  17

SEQ ID NO: 119          moltype = AA   length = 9
FEATURE                 Location/Qualifiers
source                  1..9
                        mol_type = protein
                        note = H2_Y60K_L2 CDR-H3
                        organism = synthetic construct
SEQUENCE: 119
WTNLYAMDY                                                           9

SEQ ID NO: 120          moltype = AA   length = 15
FEATURE                 Location/Qualifiers
source                  1..15
                        mol_type = protein
                        note = H2_Y60K_L2 CDR-L1
                        organism = synthetic construct
SEQUENCE: 120
RASKSVSTSG YSYMH                                                    15

SEQ ID NO: 121          moltype = AA   length = 7
FEATURE                 Location/Qualifiers
source                  1..7
                        mol_type = protein
                        note = H2_Y60K_L2 CDR-L2
                        organism = synthetic construct
SEQUENCE: 121
LASNKES                                                             7

SEQ ID NO: 122          moltype = AA   length = 9
FEATURE                 Location/Qualifiers
source                  1..9
                        mol_type = protein
                        note = H2_Y60K_L2 CDR-L3
                        organism = synthetic construct
SEQUENCE: 122
QHSREVPYT                                                           9

SEQ ID NO: 123          moltype = AA   length = 118
FEATURE                 Location/Qualifiers
source                  1..118
                        mol_type = protein
                        note = H2_Y60K_L2 VH
                        organism = synthetic construct
SEQUENCE: 123
QVQLVESGGG VVQPGRSLRL SCAASGFTFS DYGMHWVRQA PGKGLEWVAY ISSGGTTIYK    60
```

```
ADTVKGRFTI SRDNSKNTLY LQMNSLRAED TAVYYCARWT NLYAMDYWGQ GTTVTVSS      118

SEQ ID NO: 124           moltype = AA   length = 112
FEATURE                  Location/Qualifiers
source                   1..112
                         mol_type = protein
                         note = H2_Y60K_L2 VL
                         organism = synthetic construct
SEQUENCE: 124
DIVLTQSPDS LAVSLGERAT INCRASKSVS TSGYSYMHWY QQKPGQPPKF LIYLASNKES    60
GVPDRFSGSG SGTDFTLTIS SLQAEDVAVY YCQHSREVPY TFGGGTKVEI KR            112

SEQ ID NO: 125           moltype = AA   length = 5
FEATURE                  Location/Qualifiers
source                   1..5
                         mol_type = protein
                         note = H2_T63Y_L2 CDR-H1
                         organism = synthetic construct
SEQUENCE: 125
DYGMH                                                                5

SEQ ID NO: 126           moltype = AA   length = 17
FEATURE                  Location/Qualifiers
source                   1..17
                         mol_type = protein
                         note = H2_T63Y_L2 CDR-H2
                         organism = synthetic construct
SEQUENCE: 126
YISSGGTTIY YADYVKG                                                   17

SEQ ID NO: 127           moltype = AA   length = 9
FEATURE                  Location/Qualifiers
source                   1..9
                         mol_type = protein
                         note = H2_T63Y_L2 CDR-H3
                         organism = synthetic construct
SEQUENCE: 127
WTNLYAMDY                                                            9

SEQ ID NO: 128           moltype = AA   length = 15
FEATURE                  Location/Qualifiers
source                   1..15
                         mol_type = protein
                         note = H2_T63Y_L2 CDR-L1
                         organism = synthetic construct
SEQUENCE: 128
RASKSVSTSG YSYMH                                                     15

SEQ ID NO: 129           moltype = AA   length = 7
FEATURE                  Location/Qualifiers
source                   1..7
                         mol_type = protein
                         note = H2_T63Y_L2 CDR-L2
                         organism = synthetic construct
SEQUENCE: 129
LASNKES                                                              7

SEQ ID NO: 130           moltype = AA   length = 9
FEATURE                  Location/Qualifiers
source                   1..9
                         mol_type = protein
                         note = H2_T63Y_L2 CDR-L3
                         organism = synthetic construct
SEQUENCE: 130
QHSREVPYT                                                            9

SEQ ID NO: 131           moltype = AA   length = 118
FEATURE                  Location/Qualifiers
source                   1..118
                         mol_type = protein
                         note = H2_T63Y_L2 VH
                         organism = synthetic construct
SEQUENCE: 131
QVQLVESGGG VVQPGRSLRL SCAASGFTFS DYGMHWVRQA PGKGLEWVAY ISSGGTTIYY    60
ADYVKGRFTI SRDNSKNTLY LQMNSLRAED TAVYYCARWT NLYAMDYWGQ GTTVTVSS      118

SEQ ID NO: 132           moltype = AA   length = 112
FEATURE                  Location/Qualifiers
source                   1..112
```

```
                            mol_type = protein
                            note = H2_T63Y_L2 VL
                            organism = synthetic construct
SEQUENCE: 132
DIVLTQSPDS LAVSLGERAT INCRASKSVS TSGYSYMHWY QQKPGQPPKF LIYLASNKES   60
GVPDRFSGSG SGTDFTLTIS SLQAEDVAVY YCQHSREVPY TFGGGTKVEI KR          112

SEQ ID NO: 133          moltype = AA   length = 5
FEATURE                 Location/Qualifiers
source                  1..5
                        mol_type = protein
                        note = H3_M105P_VL-par CDR-H1
                        organism = synthetic construct
SEQUENCE: 133
DYGMH                                                                5

SEQ ID NO: 134          moltype = AA   length = 17
FEATURE                 Location/Qualifiers
source                  1..17
                        mol_type = protein
                        note = H3_M105P_VL-par CDR-H2
                        organism = synthetic construct
SEQUENCE: 134
YISSGGTTIY YADTVKG                                                  17

SEQ ID NO: 135          moltype = AA   length = 9
FEATURE                 Location/Qualifiers
source                  1..9
                        mol_type = protein
                        note = H3_M105P_VL-par CDR-H3
                        organism = synthetic construct
SEQUENCE: 135
WTNLYAPDY                                                            9

SEQ ID NO: 136          moltype = AA   length = 15
FEATURE                 Location/Qualifiers
source                  1..15
                        mol_type = protein
                        note = H3_M105P_VL-par CDR-L1
                        organism = synthetic construct
SEQUENCE: 136
RASKSVSTSG YSYMH                                                    15

SEQ ID NO: 137          moltype = AA   length = 7
FEATURE                 Location/Qualifiers
source                  1..7
                        mol_type = protein
                        note = H3_M105P_VL-par CDR-L2
                        organism = synthetic construct
SEQUENCE: 137
LASNLES                                                              7

SEQ ID NO: 138          moltype = AA   length = 9
FEATURE                 Location/Qualifiers
source                  1..9
                        mol_type = protein
                        note = H3_M105P_VL-par CDR-L3
                        organism = synthetic construct
SEQUENCE: 138
QHSREVPYT                                                            9

SEQ ID NO: 139          moltype = AA   length = 118
FEATURE                 Location/Qualifiers
source                  1..118
                        mol_type = protein
                        note = H3_M105P_VL-par VH
                        organism = synthetic construct
SEQUENCE: 139
QVQLVESGGG VVQPGRSLRL SCAASGFTFS DYGMHWVRQA PGKGLEWVAY ISSGGTTIYY    60
ADTVKGRFTI SRDNSKNTLY LQMNSLRAED TAVYYCARWT NLYAPDYWGQ GTTVTVSS    118

SEQ ID NO: 140          moltype = AA   length = 112
FEATURE                 Location/Qualifiers
source                  1..112
                        mol_type = protein
                        note = H3_M105P_VL-par VL
                        organism = synthetic construct
SEQUENCE: 140
DIVLTQSPDS LAVSLGERAT INCRASKSVS TSGYSYMHWY QQKPGQPPKF LIYLASNLES    60
```

```
GVPDRFSGSG SGTDFTLTIS SLQAEDVAVY YCQHSREVPY TFGGGTKVEI KR            112

SEQ ID NO: 141              moltype = AA   length = 5
FEATURE                     Location/Qualifiers
source                      1..5
                            mol_type = protein
                            note = H2_K65P_L2 CDR-H1
                            organism = synthetic construct
SEQUENCE: 141
DYGMH                                                                5

SEQ ID NO: 142              moltype = AA   length = 17
FEATURE                     Location/Qualifiers
source                      1..17
                            mol_type = protein
                            note = H2_K65P_L2 CDR-H2
                            organism = synthetic construct
SEQUENCE: 142
YISSGGTTIY YADTVPG                                                   17

SEQ ID NO: 143              moltype = AA   length = 9
FEATURE                     Location/Qualifiers
source                      1..9
                            mol_type = protein
                            note = H2_K65P_L2 CDR-H3
                            organism = synthetic construct
SEQUENCE: 143
WTNLYAMDY                                                            9

SEQ ID NO: 144              moltype = AA   length = 15
FEATURE                     Location/Qualifiers
source                      1..15
                            mol_type = protein
                            organism = synthetic construct
SEQUENCE: 144
RASKSVSTSG YSYMH                                                     15

SEQ ID NO: 145              moltype = AA   length = 7
FEATURE                     Location/Qualifiers
source                      1..7
                            mol_type = protein
                            note = H2_K65P_L2 CDR-L2
                            organism = synthetic construct
SEQUENCE: 145
LASNKES                                                              7

SEQ ID NO: 146              moltype = AA   length = 9
FEATURE                     Location/Qualifiers
source                      1..9
                            mol_type = protein
                            note = H2_K65P_L2 CDR-L3
                            organism = synthetic construct
SEQUENCE: 146
QHSREVPYT                                                            9

SEQ ID NO: 147              moltype = AA   length = 118
FEATURE                     Location/Qualifiers
source                      1..118
                            mol_type = protein
                            note = H2_K65P_L2 VH
                            organism = synthetic construct
SEQUENCE: 147
QVQLVESGGG VVQPGRSLRL SCAASGFTFS DYGMHWVRQA PGKGLEWVAY ISSGGTTIYY     60
ADTVPGRFTI SRDNSKNTLY LQMNSLRAED TAVYYCARWT NLYAMDYWGQ GTTVTVSS      118

SEQ ID NO: 148              moltype = AA   length = 112
FEATURE                     Location/Qualifiers
source                      1..112
                            mol_type = protein
                            note = H2_K65P_L2 VL
                            organism = synthetic construct
SEQUENCE: 148
DIVLTQSPDS LAVSLGERAT INCRASKSVS TSGYSYMHWY QQKPGQPPKF LIYLASNKES     60
GVPDRFSGSG SGTDFTLTIS SLQAEDVAVY YCQHSREVPY TFGGGTKVEI KR            112

SEQ ID NO: 149              moltype = AA   length = 5
FEATURE                     Location/Qualifiers
source                      1..5
                            mol_type = protein
```

```
                        note = H2_G66Q_L2 CDR-H1
                        organism = synthetic construct
SEQUENCE: 149
DYGMH                                                                       5

SEQ ID NO: 150          moltype = AA  length = 17
FEATURE                 Location/Qualifiers
source                  1..17
                        mol_type = protein
                        note = H2_G66Q_L2 CDR-H2
                        organism = synthetic construct
SEQUENCE: 150
YISSGGTTIY YADTVKQ                                                         17

SEQ ID NO: 151          moltype = AA  length = 9
FEATURE                 Location/Qualifiers
source                  1..9
                        mol_type = protein
                        note = H2_G66Q_L2 CDR-H3
                        organism = synthetic construct
SEQUENCE: 151
WTNLYAMDY                                                                   9

SEQ ID NO: 152          moltype = AA  length = 15
FEATURE                 Location/Qualifiers
source                  1..15
                        mol_type = protein
                        note = H2_G66Q_L2 CDR-L1
                        organism = synthetic construct
SEQUENCE: 152
RASKSVSTSG YSYMH                                                           15

SEQ ID NO: 153          moltype = AA  length = 7
FEATURE                 Location/Qualifiers
source                  1..7
                        mol_type = protein
                        note = H2_G66Q_L2 CDR-L2
                        organism = synthetic construct
SEQUENCE: 153
LASNKES                                                                     7

SEQ ID NO: 154          moltype = AA  length = 9
FEATURE                 Location/Qualifiers
source                  1..9
                        mol_type = protein
                        note = H2_G66Q_L2 CDR-L3
                        organism = synthetic construct
SEQUENCE: 154
QHSREVPYT                                                                   9

SEQ ID NO: 155          moltype = AA  length = 118
FEATURE                 Location/Qualifiers
source                  1..118
                        mol_type = protein
                        note = H2_G66Q_L2 VH
                        organism = synthetic construct
SEQUENCE: 155
QVQLVESGGG VVQPGRSLRL SCAASGFTFS DYGMHWVRQA PGKGLEWVAY ISSGGTTIYY           60
ADTVKQRFTI SRDNSKNTLY LQMNSLRAED TAVYYCARWT NLYAMDYWGQ GTTVTVSS            118

SEQ ID NO: 156          moltype = AA  length = 112
FEATURE                 Location/Qualifiers
source                  1..112
                        mol_type = protein
                        note = H2_G66Q_L2 VL
                        organism = synthetic construct
SEQUENCE: 156
DIVLTQSPDS LAVSLGERAT INCRASKSVS TSGYSYMHWY QQKPGQPPKF LIYLASNKES           60
GVPDRFSGSG SGTDFTLTIS SLQAEDVAVY YCQHSREVPY TFGGGTKVEI KR                 112

SEQ ID NO: 157          moltype = AA  length = 5
FEATURE                 Location/Qualifiers
source                  1..5
                        mol_type = protein
                        note = H3_M105P_L2 CDR-H1
                        organism = synthetic construct
SEQUENCE: 157
DYGMH                                                                       5
```

| SEQ ID NO: 158 | moltype = AA length = 17 |
| --- | --- |
| FEATURE | Location/Qualifiers |
| source | 1..17 |
| | mol_type = protein |
| | note = H3_M105P_L2 CDR-H2 |
| | organism = synthetic construct |

SEQUENCE: 158
YISSGGTTIY YADTVKG 17

| SEQ ID NO: 159 | moltype = AA length = 9 |
| --- | --- |
| FEATURE | Location/Qualifiers |
| source | 1..9 |
| | mol_type = protein |
| | note = H3_M105P_L2 CDR-H3 |
| | organism = synthetic construct |

SEQUENCE: 159
WTNLYAPDY 9

| SEQ ID NO: 160 | moltype = AA length = 15 |
| --- | --- |
| FEATURE | Location/Qualifiers |
| source | 1..15 |
| | mol_type = protein |
| | note = H3_M105P_L2 CDR-L1 |
| | organism = synthetic construct |

SEQUENCE: 160
RASKSVSTSG YSYMH 15

| SEQ ID NO: 161 | moltype = AA length = 7 |
| --- | --- |
| FEATURE | Location/Qualifiers |
| source | 1..7 |
| | mol_type = protein |
| | note = H3_M105P_L2 CDR-L2 |
| | organism = synthetic construct |

SEQUENCE: 161
LASNKES 7

| SEQ ID NO: 162 | moltype = AA length = 9 |
| --- | --- |
| FEATURE | Location/Qualifiers |
| source | 1..9 |
| | mol_type = protein |
| | note = H3_M105P_L2 CDR-L3 |
| | organism = synthetic construct |

SEQUENCE: 162
QHSREVPYT 9

| SEQ ID NO: 163 | moltype = AA length = 118 |
| --- | --- |
| FEATURE | Location/Qualifiers |
| source | 1..118 |
| | mol_type = protein |
| | note = H3_M105P_L2 VH |
| | organism = synthetic construct |

SEQUENCE: 163
QVQLVESGGG VVQPGRSLRL SCAASGFTFS DYGMHWVRQA PGKGLEWVAY ISSGGTTIYY 60
ADTVKGRFTI SRDNSKNTLY LQMNSLRAED TAVYYCARWT NLYAPDYWGQ GTTVTVSS 118

| SEQ ID NO: 164 | moltype = AA length = 112 |
| --- | --- |
| FEATURE | Location/Qualifiers |
| source | 1..112 |
| | mol_type = protein |
| | note = H3_M105P_L2 VL |
| | organism = synthetic construct |

SEQUENCE: 164
DIVLTQSPDS LAVSLGERAT INCRASKSVS TSGYSYMHWY QQKPGQPPKF LIYLASNKES 60
GVPDRFSGSG SGTDFTLTIS SLQAEDVAVY YCQHSREVPY TFGGGTKVEI KR 112

| SEQ ID NO: 165 | moltype = AA length = 5 |
| --- | --- |
| FEATURE | Location/Qualifiers |
| source | 1..5 |
| | mol_type = protein |
| | note = 51B12_VH_L2 CDR-H1 |
| | organism = synthetic construct |

SEQUENCE: 165
DYGMH 5

| SEQ ID NO: 166 | moltype = AA length = 17 |
| --- | --- |
| FEATURE | Location/Qualifiers |
| source | 1..17 |
| | mol_type = protein |
| | note = 51B12_VH_L2 CDR-H2 |

```
                         -continued organism = synthetic construct
SEQUENCE: 166
YISSGGTTIY YADTVKG                                                      17

SEQ ID NO: 167          moltype = AA  length = 9
FEATURE                 Location/Qualifiers
source                  1..9
                        mol_type = protein
                        note = 51B12_VH_L2 CDR-H3
                        organism = synthetic construct
SEQUENCE: 167
WTNLYAMDY                                                                9

SEQ ID NO: 168          moltype = AA  length = 15
FEATURE                 Location/Qualifiers
source                  1..15
                        mol_type = protein
                        note = 51B12_VH_L2 CDR-L1
                        organism = synthetic construct
SEQUENCE: 168
RASKSVSTSG YSYMH                                                        15

SEQ ID NO: 169          moltype = AA  length = 7
FEATURE                 Location/Qualifiers
source                  1..7
                        mol_type = protein
                        note = 51B12_VH_L2 CDR-L2
                        organism = synthetic construct
SEQUENCE: 169
LASNKES                                                                  7

SEQ ID NO: 170          moltype = AA  length = 9
FEATURE                 Location/Qualifiers
source                  1..9
                        mol_type = protein
                        note = 51B12_VH_L2 CDR-L3
                        organism = synthetic construct
SEQUENCE: 170
QHSREVPYT                                                                9

SEQ ID NO: 171          moltype = AA  length = 118
FEATURE                 Location/Qualifiers
source                  1..118
                        mol_type = protein
                        note = 51B12_VH_L2 VH
                        organism = synthetic construct
SEQUENCE: 171
QVQLVESGGG VVQPGRSLRL SCAASGFTFS DYGMHWVRQA PGKGLEWVAY ISSGGTTIYY        60
ADTVKGRFTI SRDNSKNTLY LQMNSLRAED TAVYYCARWT NLYAMDYWGQ GTTVTVSS        118

SEQ ID NO: 172          moltype = AA  length = 112
FEATURE                 Location/Qualifiers
source                  1..112
                        mol_type = protein
                        note = 51B12_VH_L2 VL
                        organism = synthetic construct
SEQUENCE: 172
DIVLTQSPDS LAVSLGERAT INCRASKSVS TSGYSYMHWY QQKPGQPPKF LIYLASNKES        60
GVPDRFSGSG SGTDFTLTIS SLQAEDVAVY YCQHSREVPY TFGGGTKVEI KR               112

SEQ ID NO: 173          moltype = AA  length = 5
FEATURE                 Location/Qualifiers
source                  1..5
                        mol_type = protein
                        note = H2_T56H_VL-par CDR-H1
                        organism = synthetic construct
SEQUENCE: 173
DYGMH                                                                    5

SEQ ID NO: 174          moltype = AA  length = 17
FEATURE                 Location/Qualifiers
source                  1..17
                        mol_type = protein
                        note = H2_T56H_VL-par CDR-H2
                        organism = synthetic construct
SEQUENCE: 174
YISSGGHTIY YADTVKG                                                      17

SEQ ID NO: 175          moltype = AA  length = 9
```

```
FEATURE                 Location/Qualifiers
source                  1..9
                        mol_type = protein
                        note = H2_T56H_VL-par CDR-H3
                        organism = synthetic construct
SEQUENCE: 175
WTNLYAMDY                                                                   9

SEQ ID NO: 176          moltype = AA  length = 15
FEATURE                 Location/Qualifiers
source                  1..15
                        mol_type = protein
                        note = H2_T56H_VL-par CDR-L1
                        organism = synthetic construct
SEQUENCE: 176
RASKSVSTSG YSYMH                                                           15

SEQ ID NO: 177          moltype = AA  length = 7
FEATURE                 Location/Qualifiers
source                  1..7
                        mol_type = protein
                        note = H2_T56H_VL-par CDR-L2
                        organism = synthetic construct
SEQUENCE: 177
LASNLES                                                                     7

SEQ ID NO: 178          moltype = AA  length = 9
FEATURE                 Location/Qualifiers
source                  1..9
                        mol_type = protein
                        note = H2_T56H_VL-par CDR-L3
                        organism = synthetic construct
SEQUENCE: 178
QHSREVPYT                                                                   9

SEQ ID NO: 179          moltype = AA  length = 118
FEATURE                 Location/Qualifiers
source                  1..118
                        mol_type = protein
                        note = H2_T56H_VL-par VH
                        organism = synthetic construct
SEQUENCE: 179
QVQLVESGGG VVQPGRSLRL SCAASGFTFS DYGMHWVRQA PGKGLEWVAY ISSGGHTIYY           60
ADTVKGRFTI SRDNSKNTLY LQMNSLRAED TAVYYCARWT NLYAMDYWGQ GTTVTVSS           118

SEQ ID NO: 180          moltype = AA  length = 112
FEATURE                 Location/Qualifiers
source                  1..112
                        mol_type = protein
                        note = H2_T56H_VL-par VL
                        organism = synthetic construct
SEQUENCE: 180
DIVLTQSPDS LAVSLGERAT INCRASKSVS TSGYSYMHWY QQKPGQPPKF LIYLASNLES           60
GVPDRFSGSG SGTDFTLTIS SLQAEDVAVY YCQHSREVPY TFGGGTKVEI KR                 112

SEQ ID NO: 181          moltype = AA  length = 5
FEATURE                 Location/Qualifiers
source                  1..5
                        mol_type = protein
                        note = H2_T57H_VL-par CDR-H1
                        organism = synthetic construct
SEQUENCE: 181
DYGMH                                                                       5

SEQ ID NO: 182          moltype = AA  length = 17
FEATURE                 Location/Qualifiers
source                  1..17
                        mol_type = protein
                        note = H2_T57H_VL-par CDR-H2
                        organism = synthetic construct
SEQUENCE: 182
YISSGGTHIY YADTVKG                                                         17

SEQ ID NO: 183          moltype = AA  length = 9
FEATURE                 Location/Qualifiers
source                  1..9
                        mol_type = protein
                        note = H2_T57H_VL-par CDR-H3
                        organism = synthetic construct
```

```
SEQUENCE: 183
WTNLYAMDY                                                                9

SEQ ID NO: 184          moltype = AA   length = 15
FEATURE                 Location/Qualifiers
source                  1..15
                        mol_type = protein
                        note = H2_T57H_VL-par CDR-L1
                        organism = synthetic construct
SEQUENCE: 184
RASKSVSTSG YSYMH                                                        15

SEQ ID NO: 185          moltype = AA   length = 7
FEATURE                 Location/Qualifiers
source                  1..7
                        mol_type = protein
                        note = H2_T57H_VL-par CDR-L2
                        organism = synthetic construct
SEQUENCE: 185
LASNLES                                                                  7

SEQ ID NO: 186          moltype = AA   length = 9
FEATURE                 Location/Qualifiers
source                  1..9
                        mol_type = protein
                        note = H2_T57H_VL-par CDR-L3
                        organism = synthetic construct
SEQUENCE: 186
QHSREVPYT                                                                9

SEQ ID NO: 187          moltype = AA   length = 118
FEATURE                 Location/Qualifiers
source                  1..118
                        mol_type = protein
                        note = H2_T57H_VL-par VH
                        organism = synthetic construct
SEQUENCE: 187
QVQLVESGGG VVQPGRSLRL SCAASGFTFS DYGMHWVRQA PGKGLEWVAY ISSGGTHIYY        60
ADTVKGRFTI SRDNSKNTLY LQMNSLRAED TAVYYCARWT NLYAMDYWGQ GTTVTVSS        118

SEQ ID NO: 188          moltype = AA   length = 112
FEATURE                 Location/Qualifiers
source                  1..112
                        mol_type = protein
                        note = H2_T57H_VL-par VL
                        organism = synthetic construct
SEQUENCE: 188
DIVLTQSPDS LAVSLGERAT INCRASKSVS TSGYSYMHWY QQKPGQPPKF LIYLASNLES        60
GVPDRFSGSG SGTDFTLTIS SLQAEDVAVY YCQHSREVPY TFGGGTKVEI KR              112

SEQ ID NO: 189          moltype = AA   length = 5
FEATURE                 Location/Qualifiers
source                  1..5
                        mol_type = protein
                        note = H2_Y60K_VL-par
                        organism = synthetic construct
SEQUENCE: 189
DYGMH                                                                    5

SEQ ID NO: 190          moltype = AA   length = 17
FEATURE                 Location/Qualifiers
source                  1..17
                        mol_type = protein
                        note = H2_Y60K_VL-par CDR-H2
                        organism = synthetic construct
SEQUENCE: 190
YISSGGTTIY KADTVKG                                                      17

SEQ ID NO: 191          moltype = AA   length = 9
FEATURE                 Location/Qualifiers
source                  1..9
                        mol_type = protein
                        note = H2_Y60K_VL-par CDR-H3
                        organism = synthetic construct
SEQUENCE: 191
WTNLYAMDY                                                                9

SEQ ID NO: 192          moltype = AA   length = 15
FEATURE                 Location/Qualifiers
```

| | | |
|---|---|---|
| source | 1..15<br>mol_type = protein<br>note = H2_Y60K_VL-par CDR-L1<br>organism = synthetic construct | |
| SEQUENCE: 192<br>RASKSVSTSG YSYMH | | 15 |
| SEQ ID NO: 193<br>FEATURE<br>source | moltype = AA   length = 7<br>Location/Qualifiers<br>1..7<br>mol_type = protein<br>note = H2_Y60K_VL-par CDR-L2<br>organism = synthetic construct | |
| SEQUENCE: 193<br>LASNLES | | 7 |
| SEQ ID NO: 194<br>FEATURE<br>source | moltype = AA   length = 9<br>Location/Qualifiers<br>1..9<br>mol_type = protein<br>note = H2_Y60K_VL-par CDR-L3<br>organism = synthetic construct | |
| SEQUENCE: 194<br>QHSREVPYT | | 9 |
| SEQ ID NO: 195<br>FEATURE<br>source | moltype = AA   length = 118<br>Location/Qualifiers<br>1..118<br>mol_type = protein<br>note = H2_Y60K_VL-par VH<br>organism = synthetic construct | |
| SEQUENCE: 195<br>QVQLVESGGG VVQPGRSLRL SCAASGFTFS DYGMHWVRQA PGKGLEWVAY ISSGGTTIYK<br>ADTVKGRFTI SRDNSKNTLY LQMNSLRAED TAVYYCARWT NLYAMDYWGQ GTTVTVSS | | 60<br>118 |
| SEQ ID NO: 196<br>FEATURE<br>source | moltype = AA   length = 112<br>Location/Qualifiers<br>1..112<br>mol_type = protein<br>note = H2_Y60K_VL-par VL<br>organism = synthetic construct | |
| SEQUENCE: 196<br>DIVLTQSPDS LAVSLGERAT INCRASKSVS TSGYSYMHWY QQKPGQPPKF LIYLASNLES<br>GVPDRFSGSG SGTDFTLTIS SLQAEDVAVY YCQHSREVPY TFGGGTKVEI KR | | 60<br>112 |
| SEQ ID NO: 197<br>FEATURE<br>source | moltype = AA   length = 5<br>Location/Qualifiers<br>1..5<br>mol_type = protein<br>note = H2_T63Y_VL-par CDR-H1<br>organism = synthetic construct | |
| SEQUENCE: 197<br>DYGMH | | 5 |
| SEQ ID NO: 198<br>FEATURE<br>source | moltype = AA   length = 17<br>Location/Qualifiers<br>1..17<br>mol_type = protein<br>note = H2_T63Y_VL-par CDR-H2<br>organism = synthetic construct | |
| SEQUENCE: 198<br>YISSGGTTIY YADYVKG | | 17 |
| SEQ ID NO: 199<br>FEATURE<br>source | moltype = AA   length = 9<br>Location/Qualifiers<br>1..9<br>mol_type = protein<br>note = H2_T63Y_VL-par CDR-H3<br>organism = synthetic construct | |
| SEQUENCE: 199<br>WTNLYAMDY | | 9 |
| SEQ ID NO: 200<br>FEATURE<br>source | moltype = AA   length = 15<br>Location/Qualifiers<br>1..15<br>mol_type = protein<br>note = H2_T63Y_VL-par CDR-L1<br>organism = synthetic construct | |
| SEQUENCE: 200 | | |

```
RASKSVSTSG YSYMH                                                       15

SEQ ID NO: 201          moltype = AA  length = 7
FEATURE                 Location/Qualifiers
source                  1..7
                        mol_type = protein
                        note = H2_T63Y_VL-par CDR-L2
                        organism = synthetic construct
SEQUENCE: 201
LASNLES                                                                7

SEQ ID NO: 202          moltype = AA  length = 9
FEATURE                 Location/Qualifiers
source                  1..9
                        mol_type = protein
                        note = H2_T63Y_VL-par CDR-L3
                        organism = synthetic construct
SEQUENCE: 202
QHSREVPYT                                                              9

SEQ ID NO: 203          moltype = AA  length = 118
FEATURE                 Location/Qualifiers
source                  1..118
                        mol_type = protein
                        note = H2_T63Y_VL-par VH
                        organism = synthetic construct
SEQUENCE: 203
QVQLVESGGG VVQPGRSLRL SCAASGFTFS DYGMHWVRQA PGKGLEWVAY ISSGGTTIYY       60
ADYVKGRFTI SRDNSKNTLY LQMNSLRAED TAVYYCARWT NLYAMDYWGQ GTTVTVSS        118

SEQ ID NO: 204          moltype = AA  length = 112
FEATURE                 Location/Qualifiers
source                  1..112
                        mol_type = protein
                        note = H2_T63Y_VL-par VL
                        organism = synthetic construct
SEQUENCE: 204
DIVLTQSPDS LAVSLGERAT INCRASKSVS TSGYSYMHWY QQKPGQPPKF LIYLASNLES       60
GVPDRFSGSG SGTDFTLTIS SLQAEDVAVY YCQHSREVPY TFGGGTKVEI KR              112

SEQ ID NO: 205          moltype = AA  length = 5
FEATURE                 Location/Qualifiers
source                  1..5
                        mol_type = protein
                        note = H2_K65P_VL-par CDR-H1
                        organism = synthetic construct
SEQUENCE: 205
DYGMH                                                                  5

SEQ ID NO: 206          moltype = AA  length = 17
FEATURE                 Location/Qualifiers
source                  1..17
                        mol_type = protein
                        note = H2_K65P_VL-par CDR-H2
                        organism = synthetic construct
SEQUENCE: 206
YISSGGTTIY YADTVPG                                                     17

SEQ ID NO: 207          moltype = AA  length = 9
FEATURE                 Location/Qualifiers
source                  1..9
                        mol_type = protein
                        note = H2_K65P_VL-par CDR-H3
                        organism = synthetic construct
SEQUENCE: 207
WTNLYAMDY                                                              9

SEQ ID NO: 208          moltype = AA  length = 15
FEATURE                 Location/Qualifiers
source                  1..15
                        mol_type = protein
                        note = H2_K65P_VL-par CDR-L1
                        organism = synthetic construct
SEQUENCE: 208
RASKSVSTSG YSYMH                                                       15

SEQ ID NO: 209          moltype = AA  length = 7
FEATURE                 Location/Qualifiers
source                  1..7
```

```
                        mol_type = protein
                        note = H2_K65P_VL-par CDR-L2
                        organism = synthetic construct
SEQUENCE: 209
LASNLES                                                                    7

SEQ ID NO: 210          moltype = AA   length = 9
FEATURE                 Location/Qualifiers
source                  1..9
                        mol_type = protein
                        note = H2_K65P_VL-par CDR-L3
                        organism = synthetic construct
SEQUENCE: 210
QHSREVPYT                                                                  9

SEQ ID NO: 211          moltype = AA   length = 118
FEATURE                 Location/Qualifiers
source                  1..118
                        mol_type = protein
                        note = H2_K65P_VL-par VH
                        organism = synthetic construct
SEQUENCE: 211
QVQLVESGGG VVQPGRSLRL SCAASGFTFS DYGMHWVRQA PGKGLEWVAY ISSGGTTIYY          60
ADTVPGRFTI SRDNSKNTLY LQMNSLRAED TAVYYCARWT NLYAMDYWGQ GTTVTVSS           118

SEQ ID NO: 212          moltype = AA   length = 112
FEATURE                 Location/Qualifiers
source                  1..112
                        mol_type = protein
                        note = H2_K65P_VL-par VL
                        organism = synthetic construct
SEQUENCE: 212
DIVLTQSPDS LAVSLGERAT INCRASKSVS TSGYSMHWY QQKPGQPPKF LIYLASNLES          60
GVPDRFSGSG SGTDFTLTIS SLQAEDVAVY YCQHSREVPY TFGGGTKVEI KR                 112

SEQ ID NO: 213          moltype = AA   length = 5
FEATURE                 Location/Qualifiers
source                  1..5
                        mol_type = protein
                        note = H2_G66Q_VL-par CDR-H1
                        organism = synthetic construct
SEQUENCE: 213
DYGMH                                                                      5

SEQ ID NO: 214          moltype = AA   length = 17
FEATURE                 Location/Qualifiers
source                  1..17
                        mol_type = protein
                        note = H2_G66Q_VL-par CDR-H2
                        organism = synthetic construct
SEQUENCE: 214
YISSGGTTIY YADTVKQ                                                        17

SEQ ID NO: 215          moltype = AA   length = 9
FEATURE                 Location/Qualifiers
source                  1..9
                        mol_type = protein
                        note = H2_G66Q_VL-par CDR-H3
                        organism = synthetic construct
SEQUENCE: 215
WTNLYAMDY                                                                  9

SEQ ID NO: 216          moltype = AA   length = 15
FEATURE                 Location/Qualifiers
source                  1..15
                        mol_type = protein
                        note = H2_G66Q_VL-par CDR-L1
                        organism = synthetic construct
SEQUENCE: 216
RASKSVSTSG YSYMH                                                          15

SEQ ID NO: 217          moltype = AA   length = 7
FEATURE                 Location/Qualifiers
source                  1..7
                        mol_type = protein
                        note = H2_G66Q_VL-par CDR-L2
                        organism = synthetic construct
SEQUENCE: 217
LASNLES                                                                    7
```

| | | |
|---|---|---|
| SEQ ID NO: 218 | moltype = AA length = 9 | |
| FEATURE | Location/Qualifiers | |
| source | 1..9 | |
| | mol_type = protein | |
| | note = H2_G66Q_VL-par CDR-L3 | |
| | organism = synthetic construct | |
| SEQUENCE: 218 | | |
| QHSREVPYT | | 9 |
| | | |
| SEQ ID NO: 219 | moltype = AA length = 118 | |
| FEATURE | Location/Qualifiers | |
| source | 1..118 | |
| | mol_type = protein | |
| | note = H2_G66Q_VL-par VH | |
| | organism = synthetic construct | |
| SEQUENCE: 219 | | |
| QVQLVESGGG VVQPGRSLRL SCAASGFTFS DYGMHWVRQA PGKGLEWVAY ISSGGTTIYY | | 60 |
| ADTVKQRFTI SRDNSKNTLY LQMNSLRAED TAVYYCARWT NLYAMDYWGQ GTTVTVSS | | 118 |
| | | |
| SEQ ID NO: 220 | moltype = AA length = 112 | |
| FEATURE | Location/Qualifiers | |
| source | 1..112 | |
| | mol_type = protein | |
| | note = H2_G66Q_VL-par VL | |
| | organism = synthetic construct | |
| SEQUENCE: 220 | | |
| DIVLTQSPDS LAVSLGERAT INCRASKSVS TSGYSYMHWY QQKPGQPPKF LIYLASNLES | | 60 |
| GVPDRFSGSG SGTDFTLTIS SLQAEDVAVY YCQHSREVPY TFGGGTKVEI KR | | 112 |
| | | |
| SEQ ID NO: 221 | moltype = AA length = 10 | |
| FEATURE | Location/Qualifiers | |
| source | 1..10 | |
| | mol_type = protein | |
| | note = LIN10 construct | |
| | organism = synthetic construct | |
| SEQUENCE: 221 | | |
| LLLYYIIHQE | | 10 |
| | | |
| SEQ ID NO: 222 | moltype = AA length = 10 | |
| FEATURE | Location/Qualifiers | |
| source | 1..10 | |
| | mol_type = protein | |
| | note = LIN10 construct | |
| | organism = synthetic construct | |
| SEQUENCE: 222 | | |
| LLYYIIHQEE | | 10 |
| | | |
| SEQ ID NO: 223 | moltype = AA length = 15 | |
| FEATURE | Location/Qualifiers | |
| source | 1..15 | |
| | mol_type = protein | |
| | note = LIN15 construct | |
| | organism = synthetic construct | |
| SEQUENCE: 223 | | |
| SRSRGSSGQP ADLLQ | | 15 |
| | | |
| SEQ ID NO: 224 | moltype = AA length = 15 | |
| FEATURE | Location/Qualifiers | |
| source | 1..15 | |
| | mol_type = protein | |
| | note = LIN15 construct | |
| | organism = synthetic construct | |
| SEQUENCE: 224 | | |
| RSRGSSGQPA DLLQV | | 15 |
| | | |
| SEQ ID NO: 225 | moltype = AA length = 15 | |
| FEATURE | Location/Qualifiers | |
| source | 1..15 | |
| | mol_type = protein | |
| | note = LIN15 construct | |
| | organism = synthetic construct | |
| SEQUENCE: 225 | | |
| SRGSSGQPAD LLQVL | | 15 |
| | | |
| SEQ ID NO: 226 | moltype = AA length = 15 | |
| FEATURE | Location/Qualifiers | |
| source | 1..15 | |
| | mol_type = protein | |

```
                              note = LIN15 construct
                              organism = synthetic construct
SEQUENCE: 226
RGSSGQPADL LQVLS                                                        15

SEQ ID NO: 227                moltype = AA  length = 15
FEATURE                       Location/Qualifiers
source                        1..15
                              mol_type = protein
                              note = LIN15 construct
                              organism = synthetic construct
SEQUENCE: 227
FEPDALLLIA GGNFE                                                        15

SEQ ID NO: 228                moltype = AA  length = 15
FEATURE                       Location/Qualifiers
source                        1..15
                              mol_type = protein
                              note = LIN15 construct
                              organism = synthetic construct
SEQUENCE: 228
EPDALLLIAG GNFED                                                        15

SEQ ID NO: 229                moltype = AA  length = 15
FEATURE                       Location/Qualifiers
source                        1..15
                              mol_type = protein
                              note = LIN15 construct
                              organism = synthetic construct
SEQUENCE: 229
PDALLLIAGG NFEDQ                                                        15

SEQ ID NO: 230                moltype = AA  length = 15
FEATURE                       Location/Qualifiers
source                        1..15
                              mol_type = protein
                              note = LIN15 construct
                              organism = synthetic construct
SEQUENCE: 230
DALLLIAGGN FEDQL                                                        15

SEQ ID NO: 231                moltype = AA  length = 15
FEATURE                       Location/Qualifiers
source                        1..15
                              mol_type = protein
                              note = LIN15 construct
                              organism = synthetic construct
SEQUENCE: 231
RVSLLLLYYI IHQEE                                                        15

SEQ ID NO: 232                moltype = AA  length = 15
FEATURE                       Location/Qualifiers
source                        1..15
                              mol_type = protein
                              note = LIN15 construct
                              organism = synthetic construct
SEQUENCE: 232
VSLLLLYYII HQEEI                                                        15

SEQ ID NO: 233                moltype = AA  length = 15
FEATURE                       Location/Qualifiers
source                        1..15
                              mol_type = protein
                              note = LIN15 construct
                              organism = synthetic construct
SEQUENCE: 233
EDSSFLSQNE TEDIL                                                        15

SEQ ID NO: 234                moltype = AA  length = 15
FEATURE                       Location/Qualifiers
source                        1..15
                              mol_type = protein
                              note = LIN15 construct
                              organism = synthetic construct
SEQUENCE: 234
DSSFLSQNET EDILA                                                        15

SEQ ID NO: 235                moltype = AA  length = 10
FEATURE                       Location/Qualifiers
```

```
source                        1..10
                              mol_type = protein
                              note = LOOP10 construct
                              organism = synthetic construct
SEQUENCE: 235
CQPADLLQVC                                                                        10

SEQ ID NO: 236                moltype = AA  length = 10
FEATURE                       Location/Qualifiers
source                        1..10
                              mol_type = protein
                              note = LOOP10 construct
                              organism = synthetic construct
SEQUENCE: 236
CPADLLQVLC                                                                        10

SEQ ID NO: 237                moltype = AA  length = 10
FEATURE                       Location/Qualifiers
source                        1..10
                              mol_type = protein
                              note = LOOP10 construct
                              organism = synthetic construct
SEQUENCE: 237
CADLLQVLSC                                                                        10

SEQ ID NO: 238                moltype = AA  length = 15
FEATURE                       Location/Qualifiers
source                        1..15
                              mol_type = protein
                              note = LOOP15 construct
                              organism = synthetic construct
SEQUENCE: 238
CSRGSSGQP ADLLC                                                                   15

SEQ ID NO: 239                moltype = AA  length = 15
FEATURE                       Location/Qualifiers
source                        1..15
                              mol_type = protein
                              note = LOOP15 construct
                              organism = synthetic construct
SEQUENCE: 239
CSRGSSGQPA DLLQC                                                                  15

SEQ ID NO: 240                moltype = AA  length = 15
FEATURE                       Location/Qualifiers
source                        1..15
                              mol_type = protein
                              note = LOOP15 construct
                              organism = synthetic construct
SEQUENCE: 240
CRGSSGQPAD LLQVC                                                                  15

SEQ ID NO: 241                moltype = AA  length = 19
FEATURE                       Location/Qualifiers
source                        1..19
                              mol_type = protein
                              note = HEL19 construct
                              organism = synthetic construct
SEQUENCE: 241
CAQDCRSRGS SGQPADLLQ                                                              19

SEQ ID NO: 242                moltype = AA  length = 19
FEATURE                       Location/Qualifiers
source                        1..19
                              mol_type = protein
                              note = HEL19 construct
                              organism = synthetic construct
SEQUENCE: 242
CQDSCSRGSS GQPADLLQV                                                              19

SEQ ID NO: 243                moltype = AA  length = 19
FEATURE                       Location/Qualifiers
source                        1..19
                              mol_type = protein
                              note = HEL19 construct
                              organism = synthetic construct
SEQUENCE: 243
CDSRCRGSSG QPADLLQVL                                                              19
```

```
SEQ ID NO: 244          moltype = AA   length = 19
FEATURE                 Location/Qualifiers
source                  1..19
                        mol_type = protein
                        note = HEL19 construct
                        organism = synthetic construct
SEQUENCE: 244
CRGSCGQPAD LLQVLSAGD                                                      19

SEQ ID NO: 245          moltype = AA   length = 19
FEATURE                 Location/Qualifiers
source                  1..19
                        mol_type = protein
                        note = HEL19 construct
                        organism = synthetic construct
SEQUENCE: 245
CGSSCQPADL LQVLSAGDH                                                      19

SEQ ID NO: 246          moltype = AA   length = 22
FEATURE                 Location/Qualifiers
source                  1..22
                        mol_type = protein
                        note = HEL19 construct
                        organism = synthetic construct
SEQUENCE: 246
CLFLLLSRVF PGETDKPSAQ DC                                                  22

SEQ ID NO: 247          moltype = AA   length = 22
FEATURE                 Location/Qualifiers
source                  1..22
                        mol_type = protein
                        note = HEL19 construct
                        organism = synthetic construct
SEQUENCE: 247
CFLLLSRVFS PGTDKPSAQD SC                                                  22

SEQ ID NO: 248          moltype = AA   length = 22
FEATURE                 Location/Qualifiers
source                  1..22
                        mol_type = protein
                        note = BETA22 construct
                        organism = synthetic construct
SEQUENCE: 248
CAQDSRSRGS PGQPADLLQV LC                                                  22

SEQ ID NO: 249          moltype = AA   length = 22
FEATURE                 Location/Qualifiers
source                  1..22
                        mol_type = protein
                        note = BETA22 construct
                        organism = synthetic construct
SEQUENCE: 249
CQDSRSRGSS PGPADLLQVL SC                                                  22

SEQ ID NO: 250          moltype = AA   length = 22
FEATURE                 Location/Qualifiers
source                  1..22
                        mol_type = protein
                        note = BETA22 construct
                        organism = synthetic construct
SEQUENCE: 250
CDCNLCFEPD PGLLIAGGNF EC                                                  22

SEQ ID NO: 251          moltype = AA   length = 22
FEATURE                 Location/Qualifiers
source                  1..22
                        mol_type = protein
                        note = BETA22 construct
                        organism = synthetic construct
SEQUENCE: 251
CCNLCFEPDA PGLIAGGNFE DC                                                  22

SEQ ID NO: 252          moltype = AA   length = 20
FEATURE                 Location/Qualifiers
source                  1..20
                        mol_type = protein
                        organism = Homo sapiens
SEQUENCE: 252
ADLLQVLSAG DHPPHNHSRS                                                     20
```

```
SEQ ID NO: 253         moltype = AA  length = 5
FEATURE                Location/Qualifiers
source                 1..5
                       mol_type = protein
                       organism = Homo sapiens
SEQUENCE: 253
ADLLQ                                                                        5
```

The invention claimed is:

1. An antibody or antigen-binding fragment thereof, wherein the antibody or antigen-binding fragment thereof specifically binds ZIP12, and comprises a CDR-H1 domain comprising or consisting of SEQ ID No: 13, a CDR-H2 domain comprising or consisting of SEQ ID No: 14, a CDR-H3 domain comprising or consisting of SEQ ID No: 15, a CDR-L1 domain comprising or consisting of SEQ ID No: 16, a CDR-L2 domain comprising or consisting of SEQ ID No: 17, and a CDR-L3 domain comprising or consisting of SEQ ID No: 18.

2. The antibody or antigen-binding fragment thereof according to claim 1, wherein the antibody or antigen-binding fragment thereof comprises: a heavy chain variable region comprising or consisting of SEQ ID No: 19 and a light chain variable region comprising or consisting of SEQ ID No: 20.

3. A pharmaceutical composition comprising an antibody or antigen-binding fragment thereof according to claim 1, and optionally a pharmaceutically acceptable vehicle.

4. A polynucleotide sequence encoding the antibody or antigen binding fragment thereof as defined in claim 1.

5. An expression cassette, a recombinant vector or a host cell comprising a polynucleotide sequence according to claim 4.

6. A kit comprising an antibody or antigen-binding fragment thereof according to claim 1.

* * * * *